April 28, 1970     AN WANG ET AL     3,509,329
CALCULATOR

Filed Oct. 24, 1966     47 Sheets-Sheet 1

April 28, 1970  AN WANG ET AL  3,509,329
CALCULATOR

Filed Oct. 24, 1966  47 Sheets-Sheet 5

FIRST DIGIT ½ LOG$_e$ 10 = 7(1+2+4)

SECOND DIGIT ½ LOG$_e$ 10 = 9(8+1)

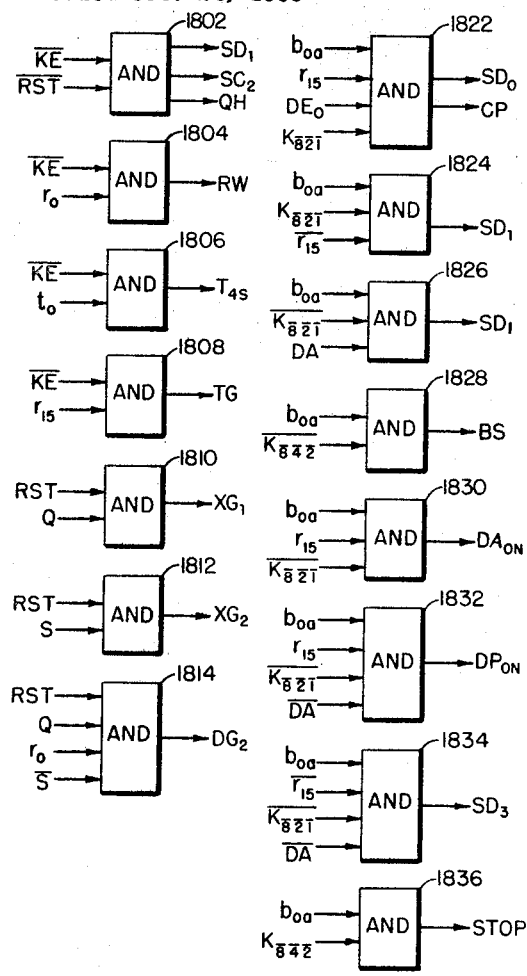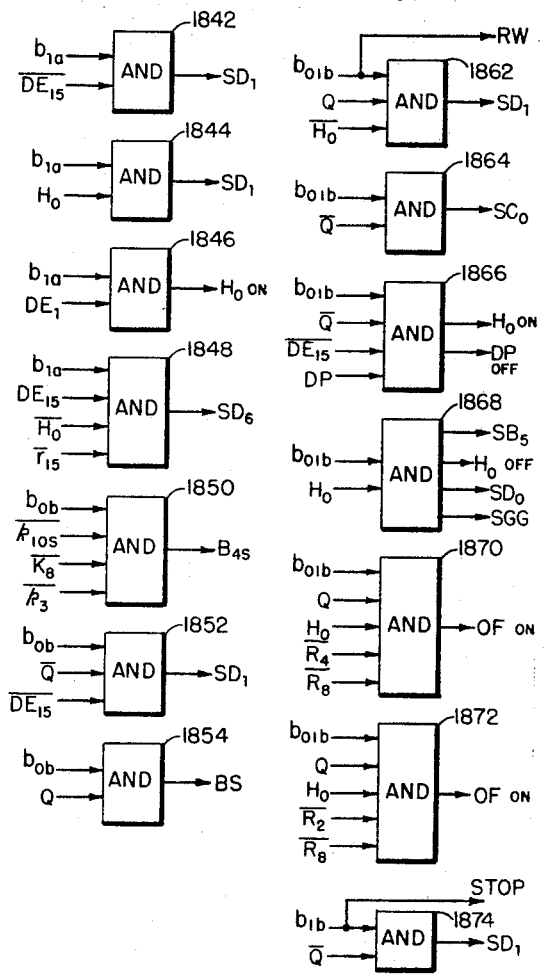
FIG 18

DISPLAY MODE

CLEAR ALL

NOTE:

| Q | S | $XG_1$ | $XG_2$ | |
|---|---|---|---|---|
| 0 | 0 | 0 | 0 | W |
| 1 | 0 | 1 | 0 | L |
| 0 | 1 | 0 | 1 | $A_0$ |
| 1 | 1 | 1 | 1 | $A_1$ |

CLEAR DISPLAY

ENTER DECIMAL POINT

April 28, 1970  AN WANG ET AL  3,509,329
CALCULATOR
Filed Oct. 24, 1966  47 Sheets-Sheet 24

CHANGE SIGN

DATA ENTRY

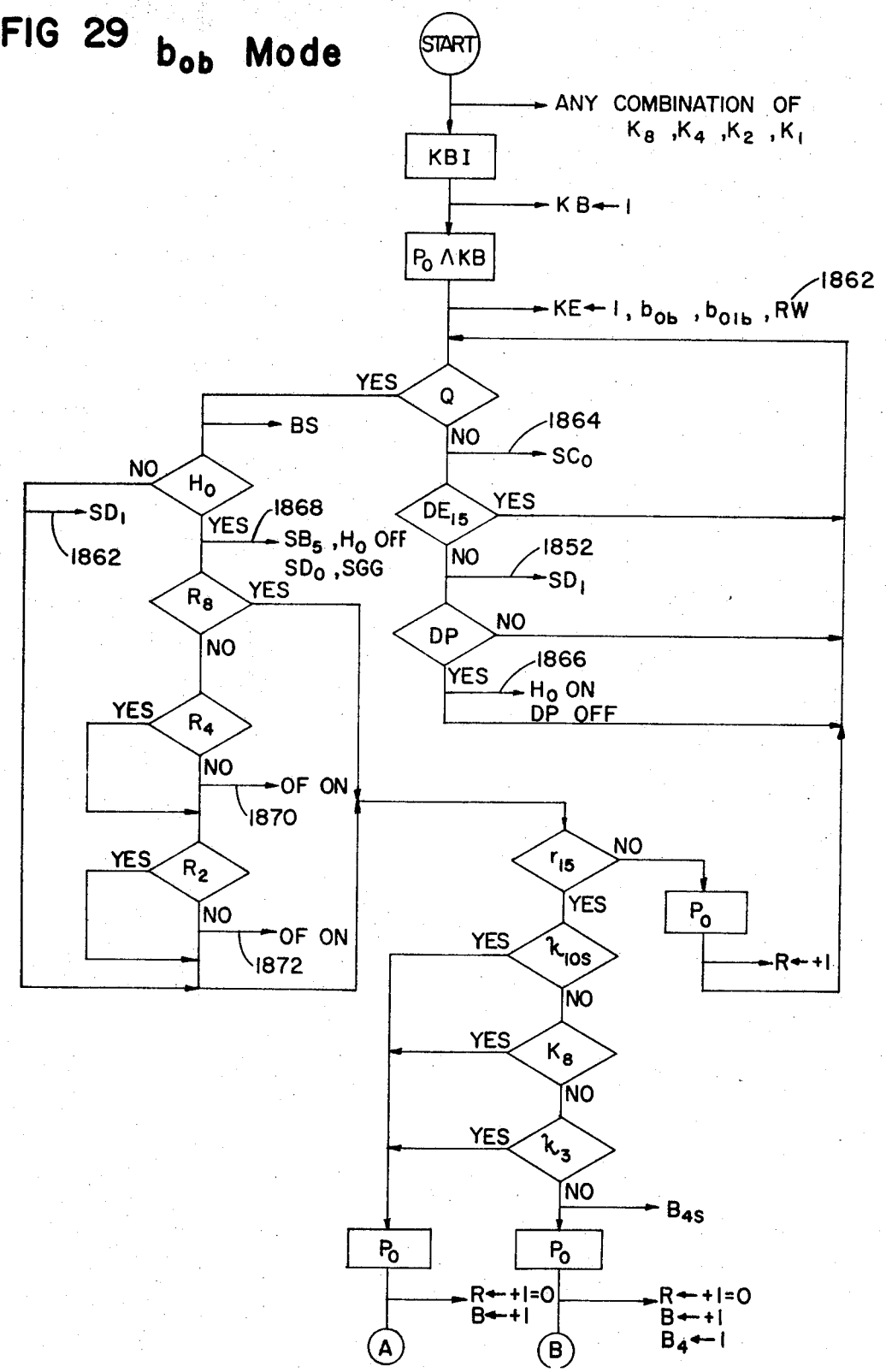
FIG 29 $b_{ob}$ Mode

FIG 30a $b_{1c}$ Mode
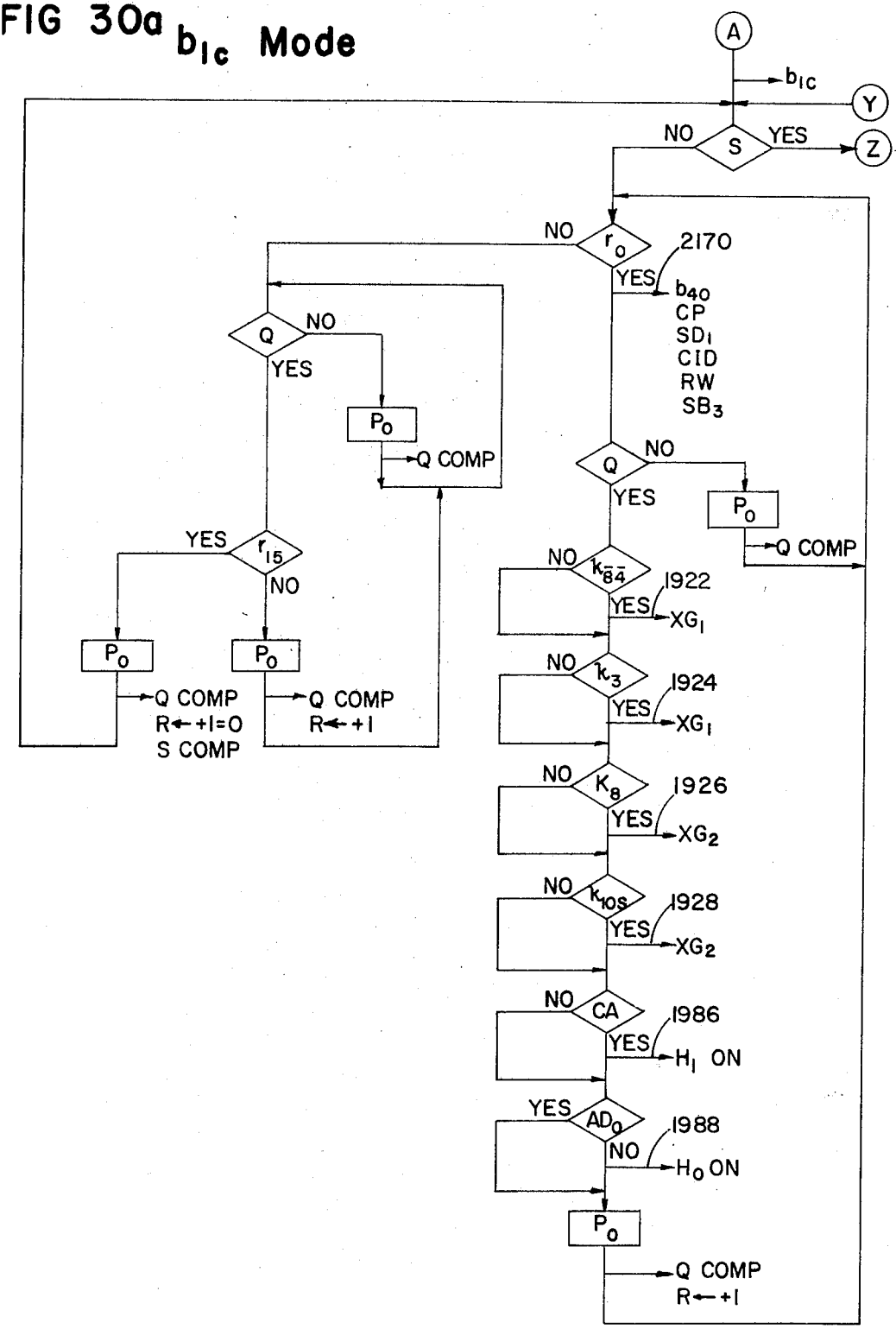

FIG 30b $b_{1c}$ Mode
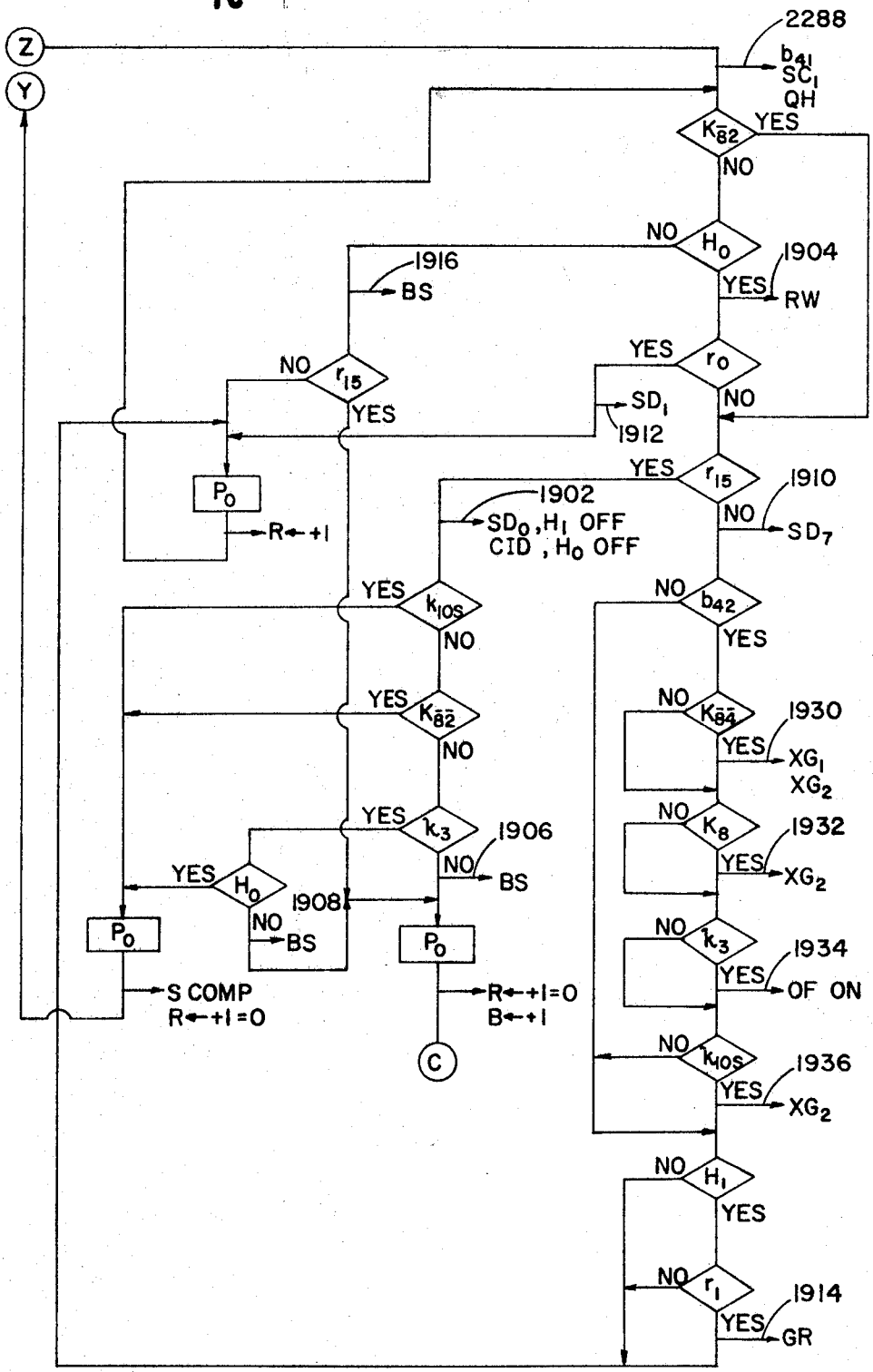

FIG 31a $b_2$ Mode
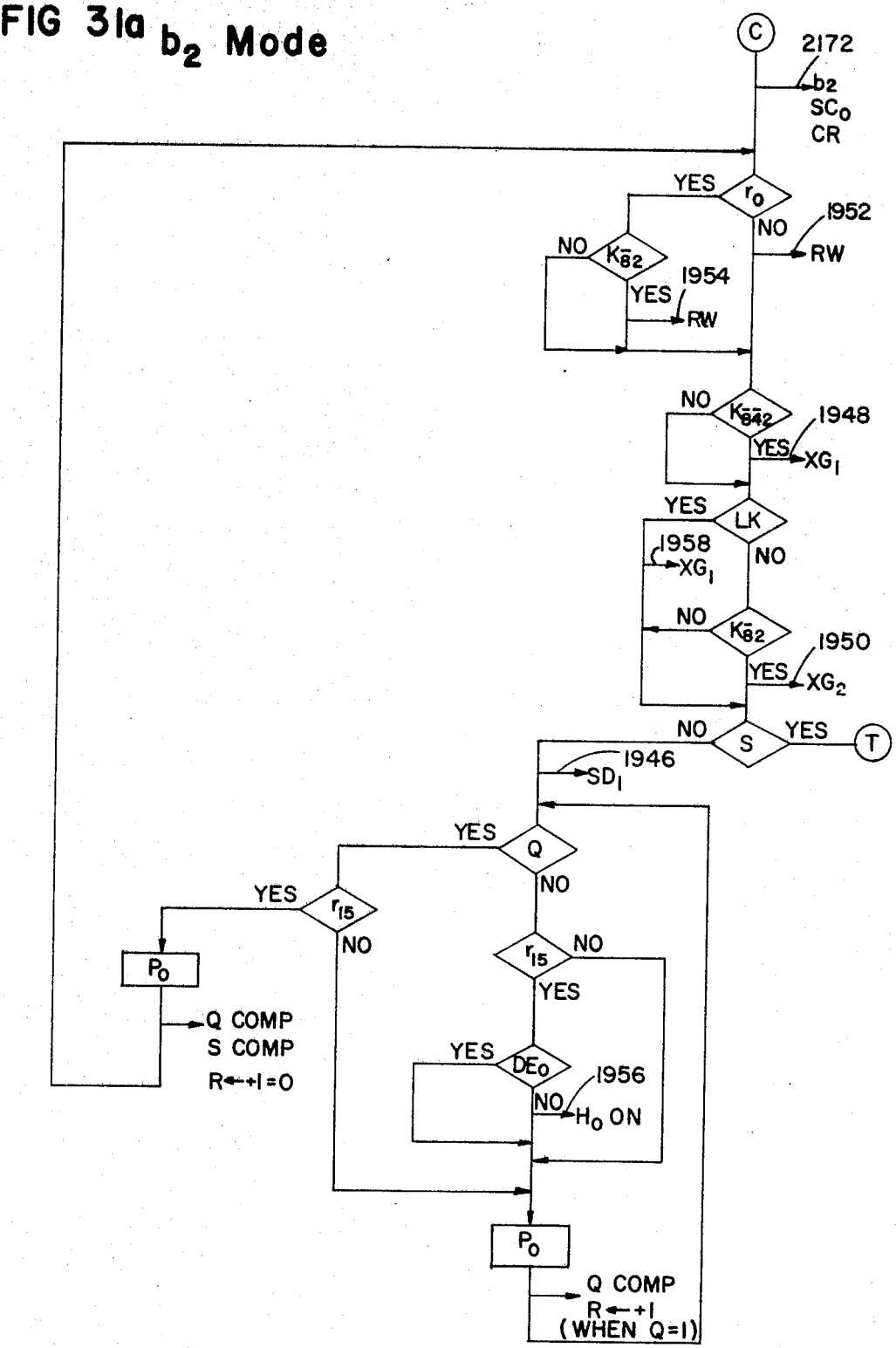

FIG 31b $b_2$ Mode
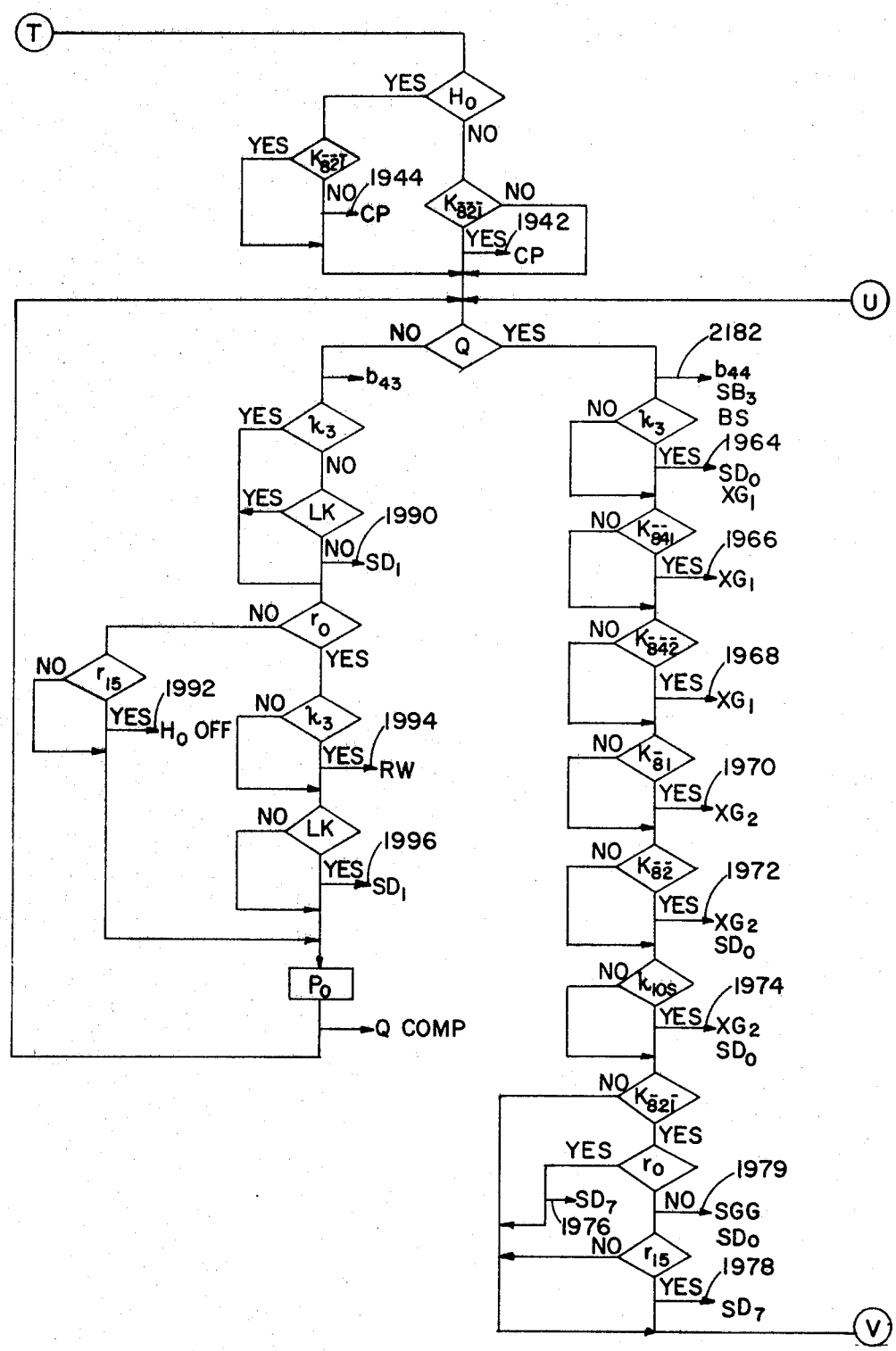

FIG 31c  $b_2$ Mode
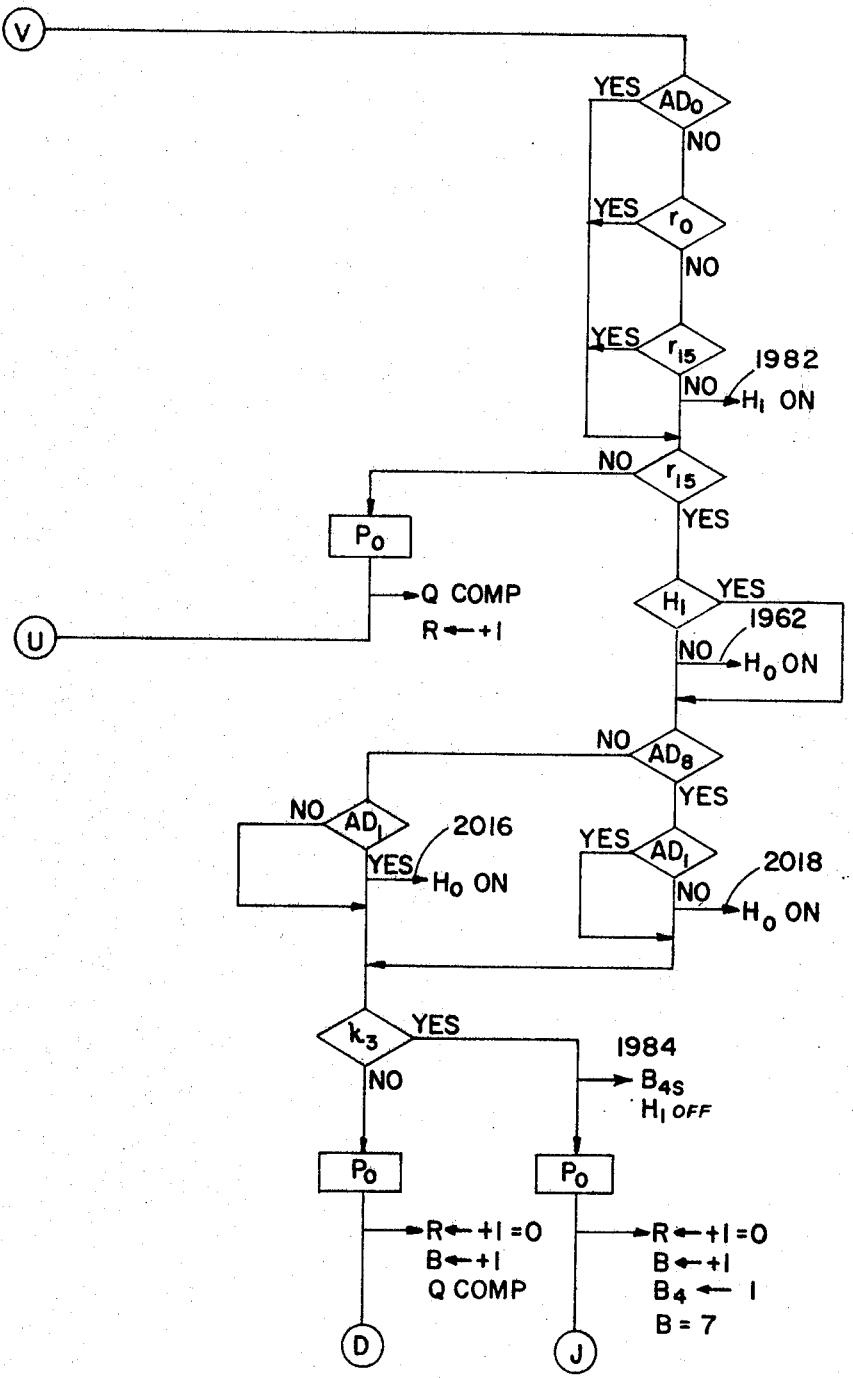

FIG 32  $b_3$ Mode
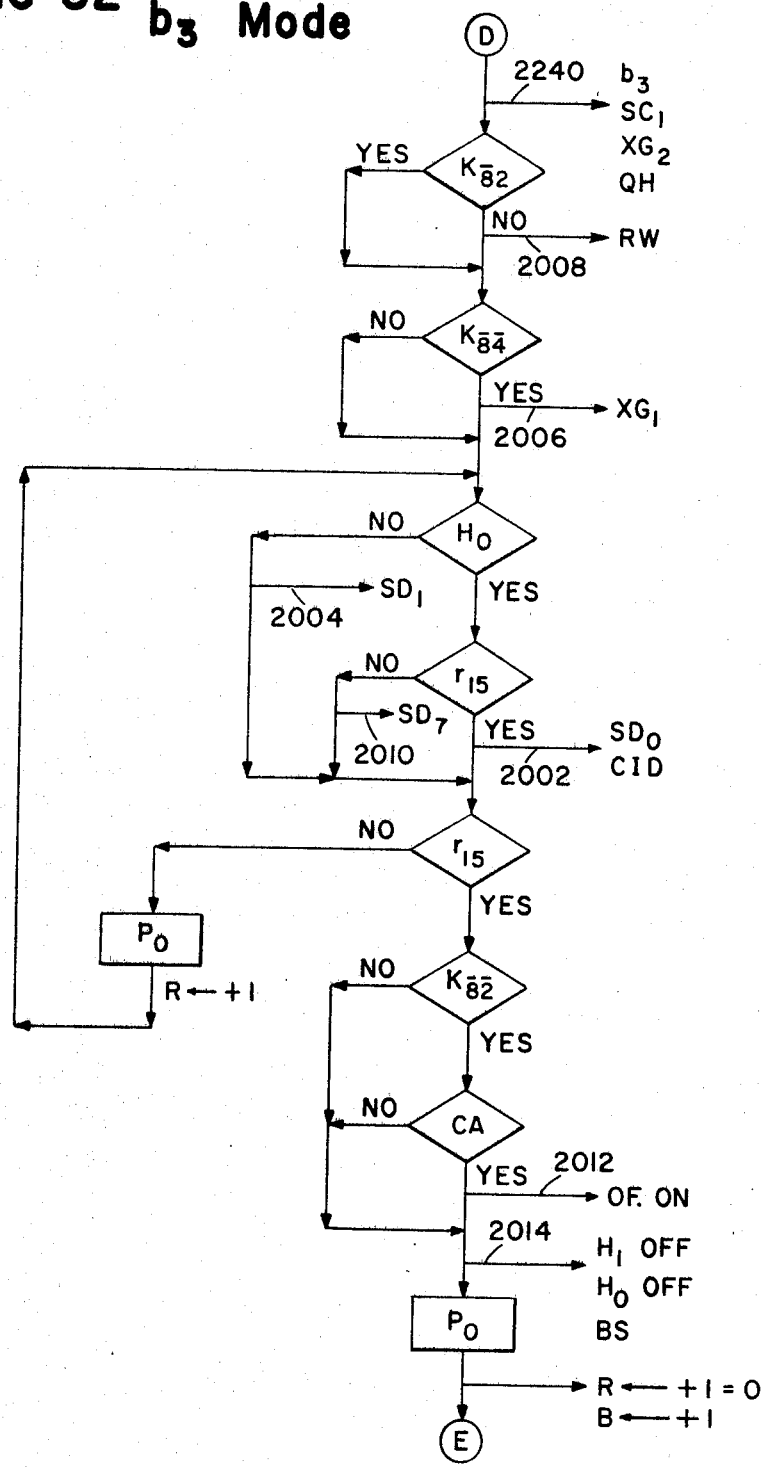

FIG 33a $b_4$ Mode
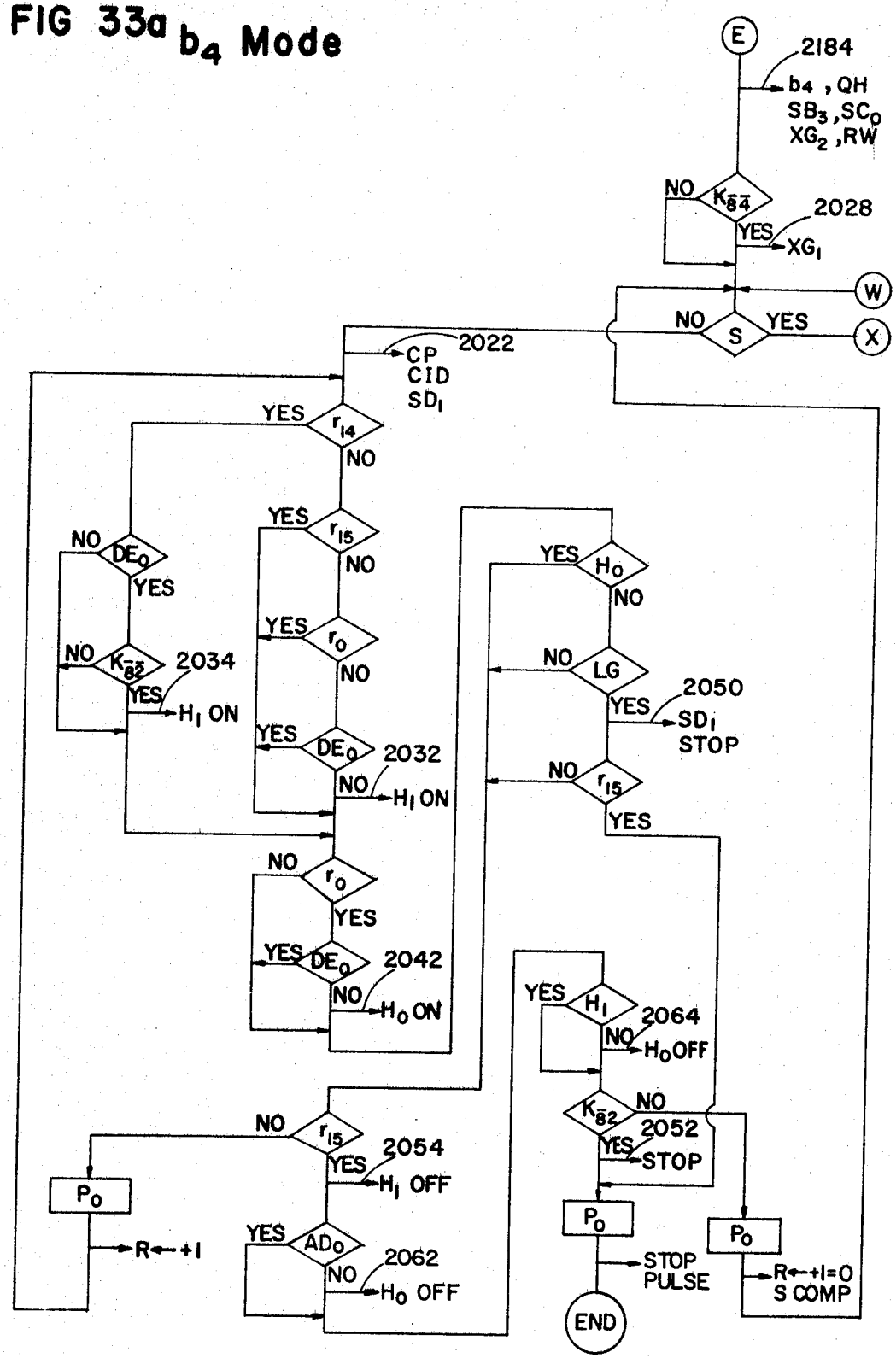

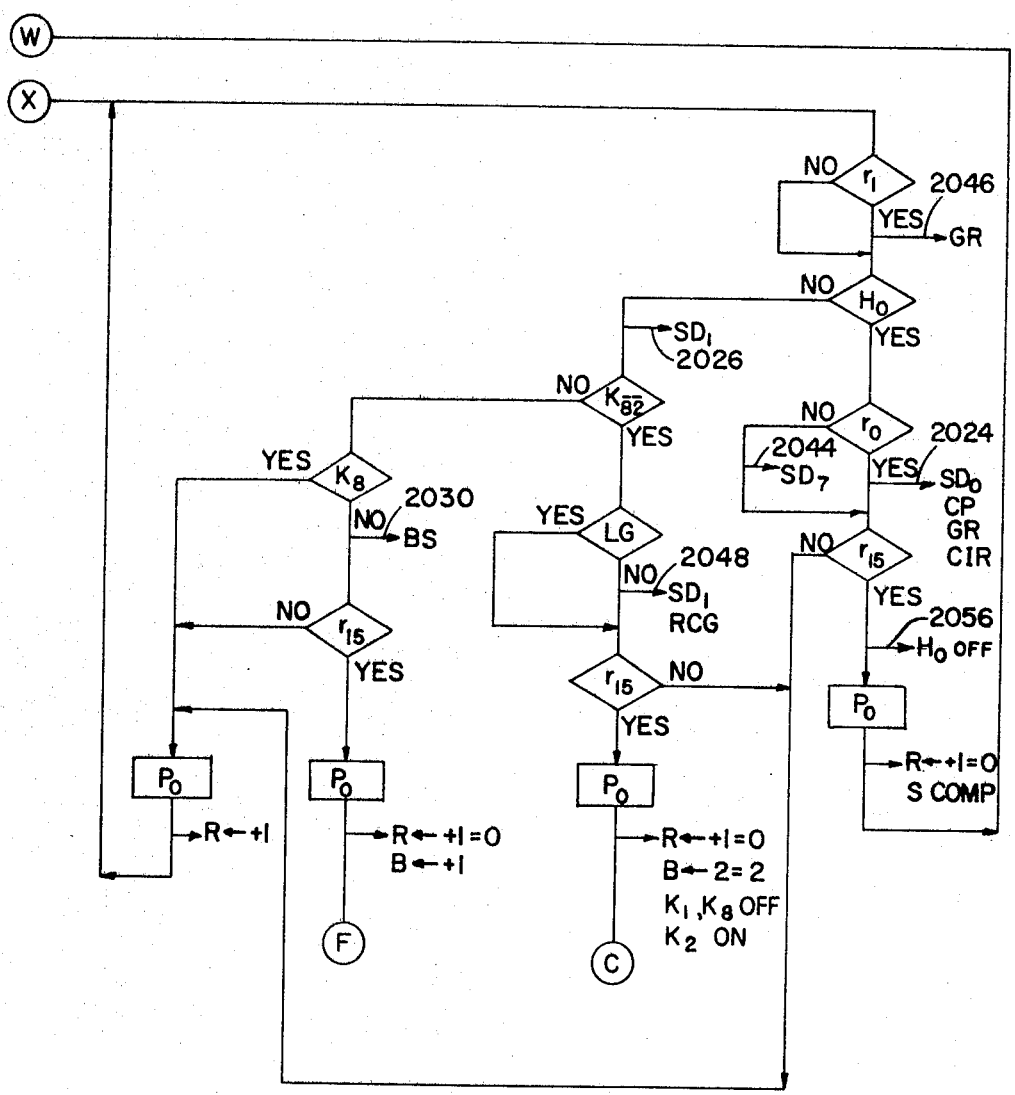
FIG 33b $b_4$ Mode

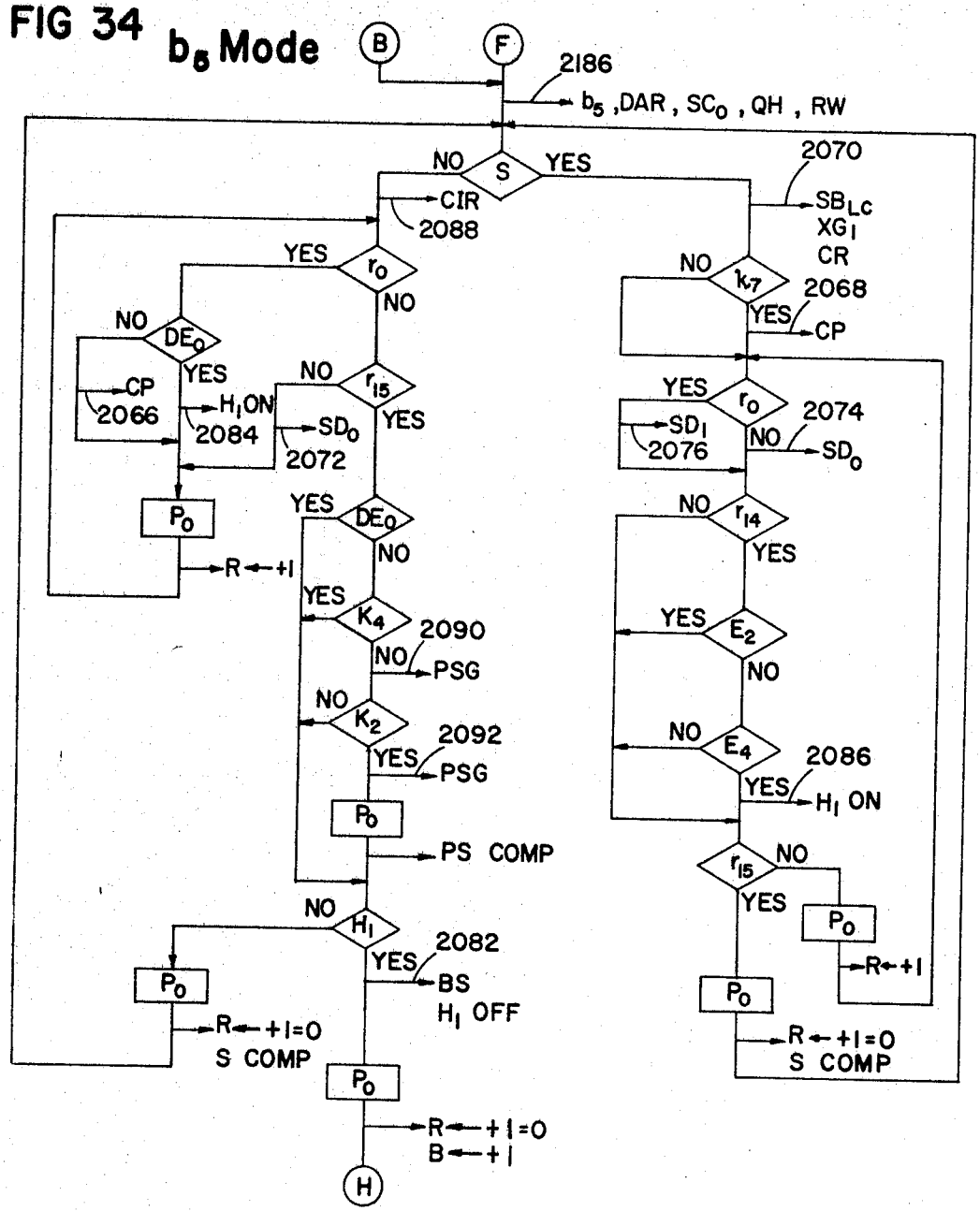
FIG 34 $b_5$ Mode $b_6, b_9, b_{50}$ Modes b₆, b₉, b₅₀ Modes

FIG 36 b₇ Mode
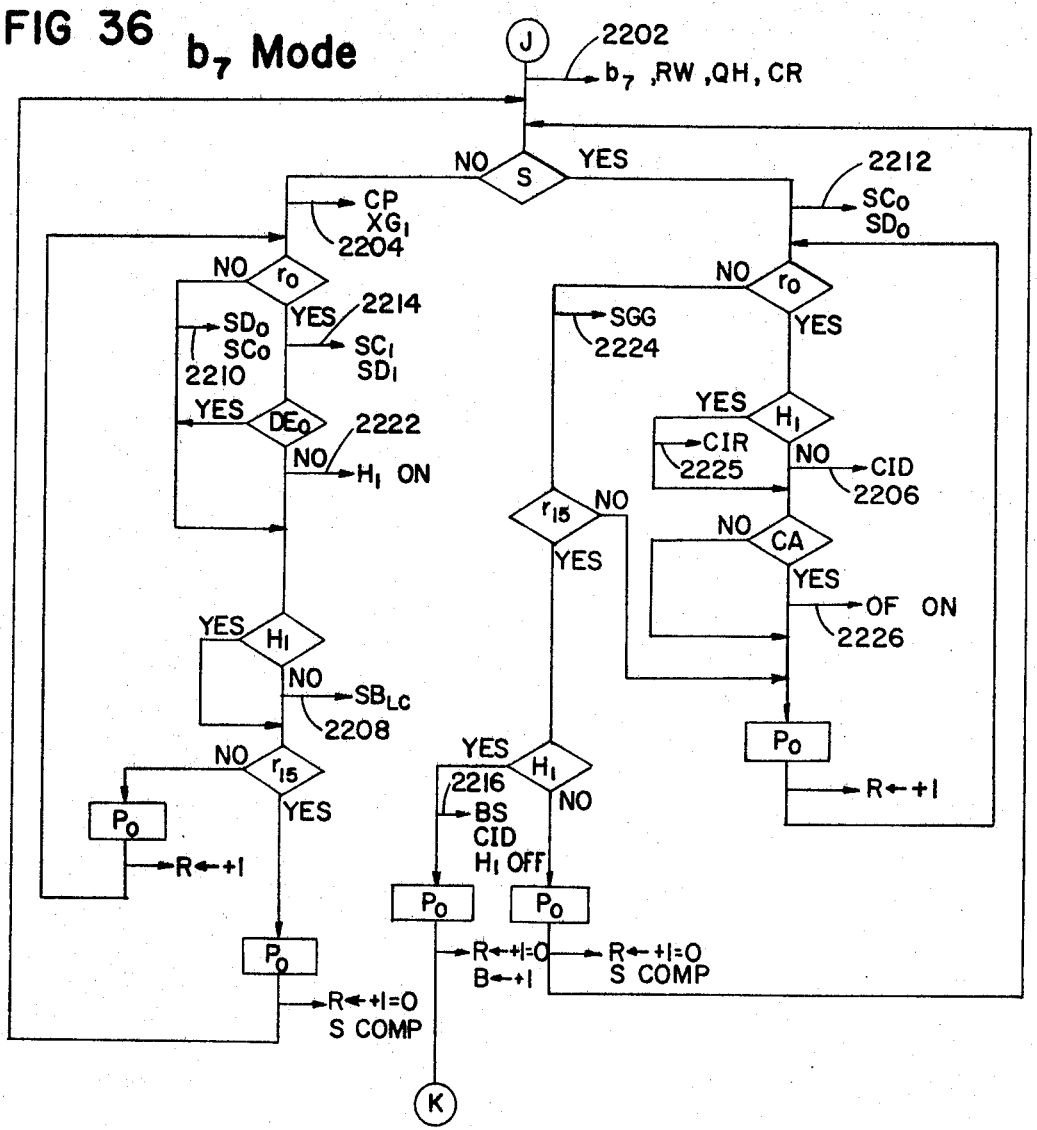

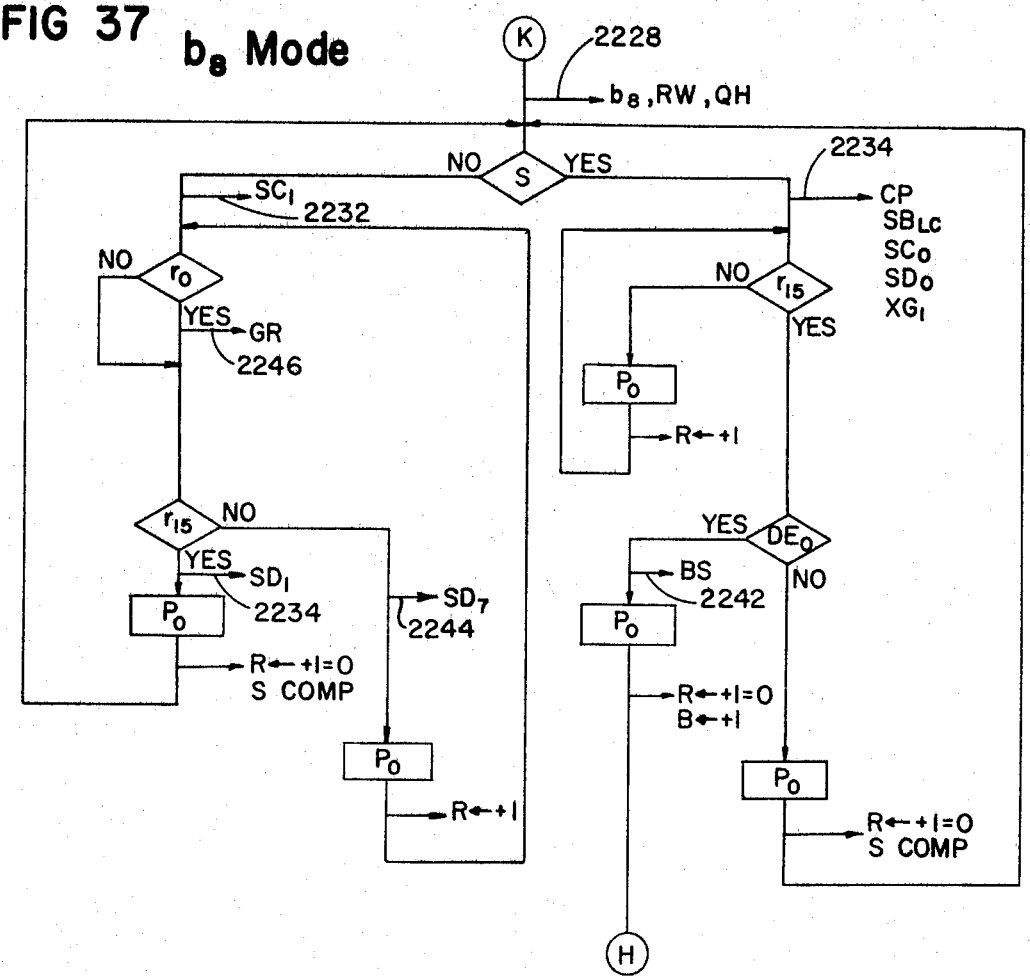
FIG 37 $b_8$ Mode

April 28, 1970 AN WANG ET AL 3,509,329
CALCULATOR
Filed Oct. 24, 1966 47 Sheets-Sheet 40
FIG 38 $b_{10}$ Mode
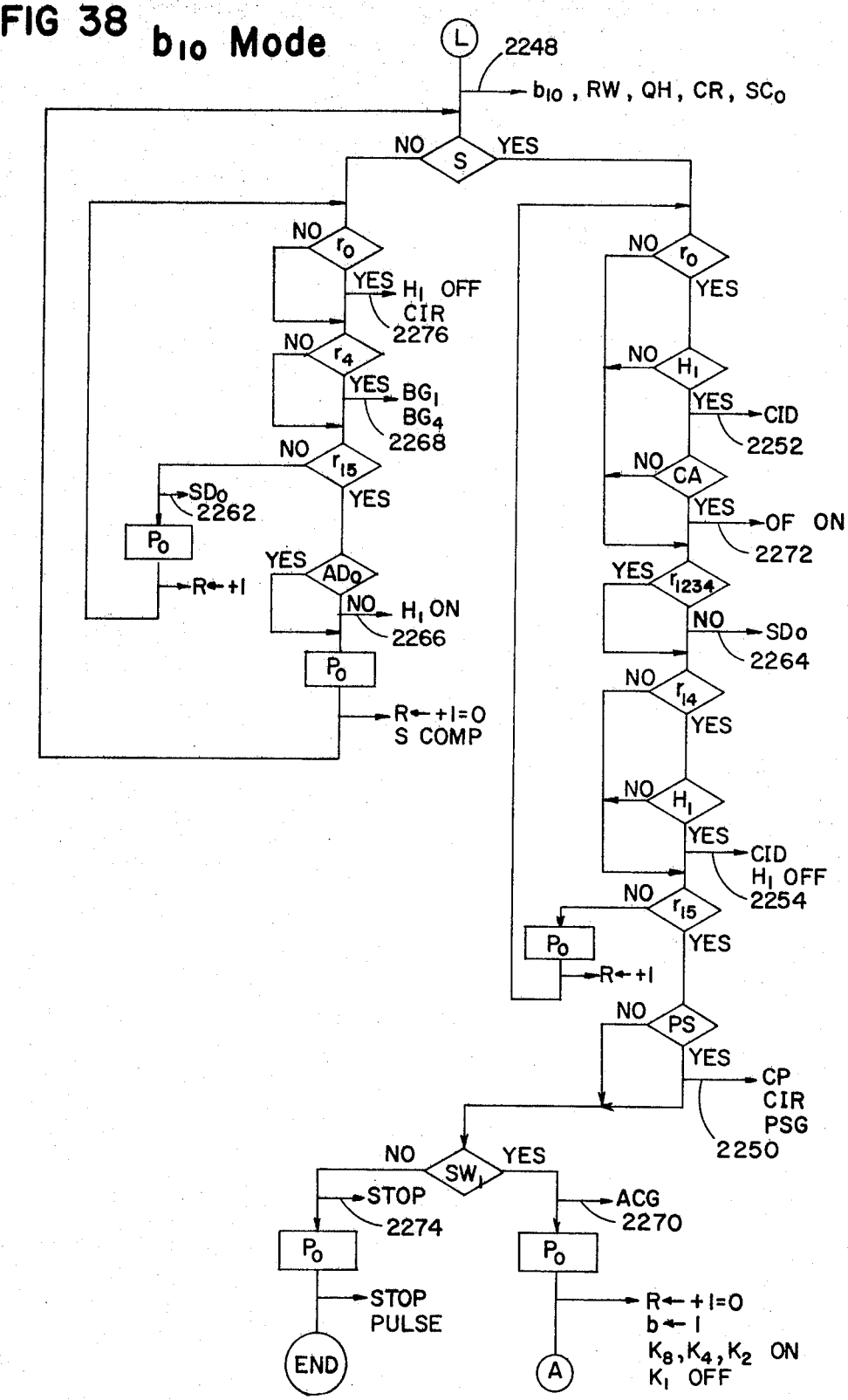

April 28, 1970 AN WANG ET AL 3,509,329
CALCULATOR
Filed Oct. 24, 1966 47 Sheets-Sheet 41
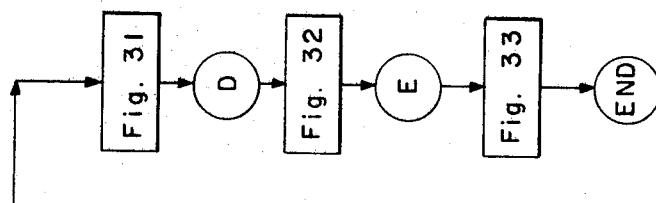
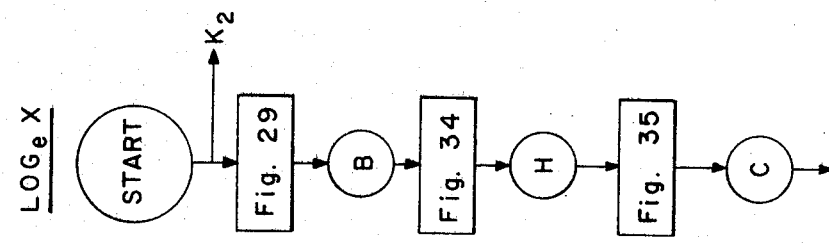
FIG 40 $LOG_e X$
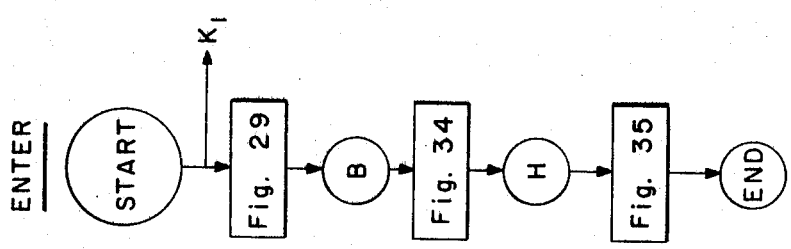
FIG 39 ENTER

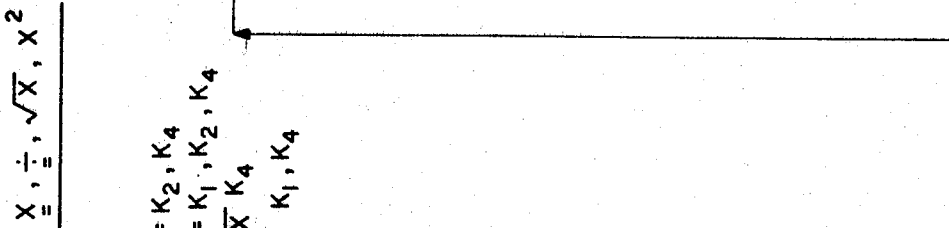
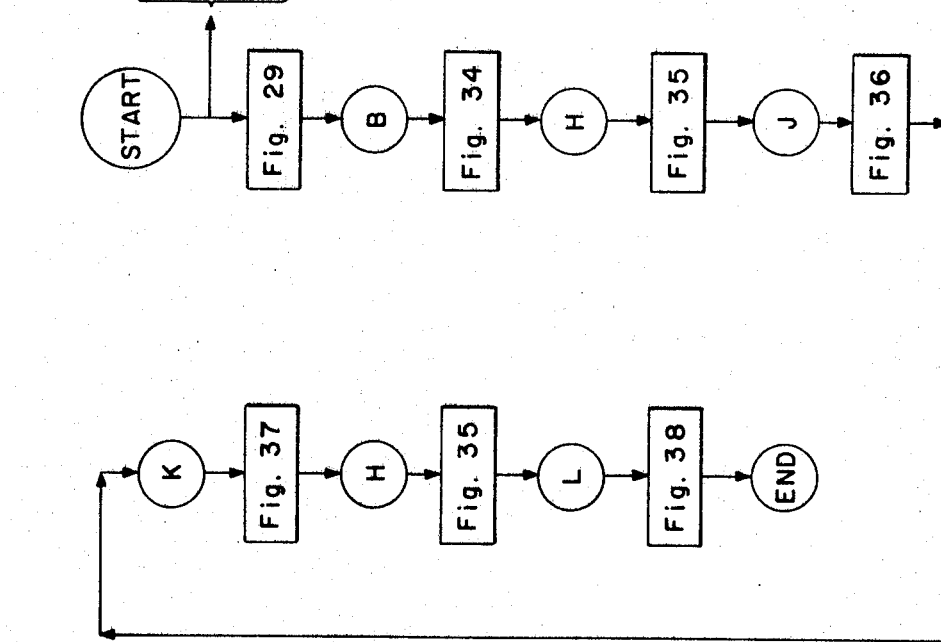
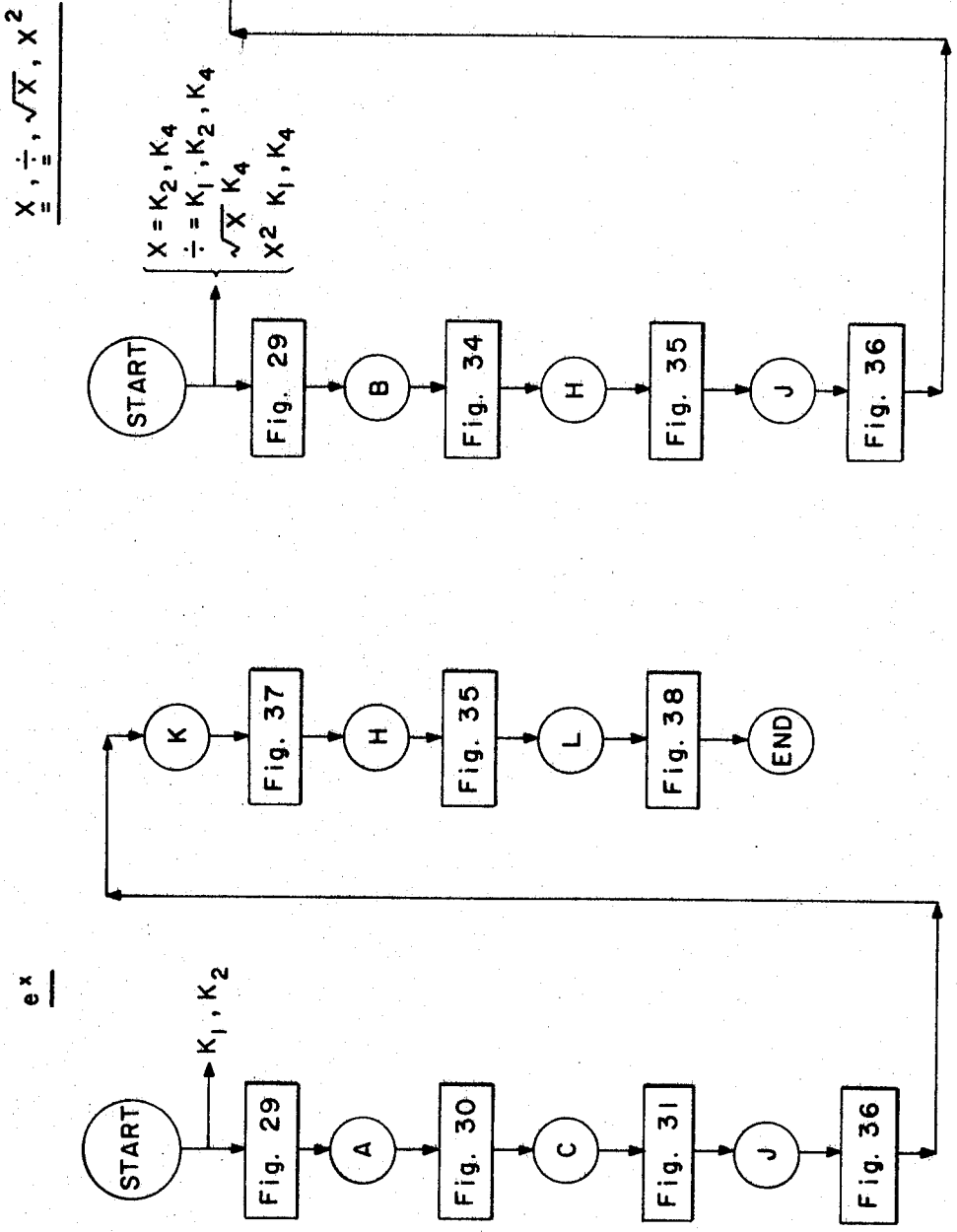

April 28, 1970    AN WANG ET AL    3,509,329

CALCULATOR

Filed Oct. 24, 1966

ENTRY ACCUMULATON

ENTER–$K_1$; ENTRY ACCUMULATOR SWITCH ON

ADD AND SUBTRACT

CLEAR AND RECALL

United States Patent Office 3,509,329
Patented Apr. 28, 1970

3,509,329
CALCULATOR
An Wang, Lincoln, Mass., and Prentice Irving Robinson, Hudson, N.H., assignors to Wang Laboratories, Inc., Tewksbury, Mass., a corporation of Massachusetts
Filed Oct. 24, 1966, Ser. No. 588,863
Int. Cl. G06f 15/02
U.S. Cl. 235—156
37 Claims

ABSTRACT OF THE DISCLOSURE

An electronic calculator includes two independently controllable accumulators permitting simultaneous accumulation of products or quotients from successive multiplications or divisions in one accumulator and accumulation of operands in the other accumulator. A store of logarithmic constant values is utilized to permit single-keystroke generation of logarithms and antilogarithms.

---

This invention relates to calculating apparatus of the type which do not employ large data storage capabilities.

Current commercial and scientific procedures demand that increasingly large masses of data be processed, and such processing frequently involves or is an integral part of mathematical analyses. Such mathematical analyses encompass in addition to addition, subtraction, multiplication, and division even more complex manipulations, e.g. those employing exponential values. While digital computers of conventional logic organization can perform such manipulations the techniques that are employed frequently involve complex, circuitous and time-consuming operations to obtain the desired results or solutions to specific problems.

The calculator provides the basic logic arrangement for performing mathematical manipulations. It is an object of this invention to provide novel and improved arrangements for controlling a calculator. Another object of the invention is to provide novel and improved arrangements enabling logarithmic manipulations to be performed in a calculator logic organization.

Still another object of the invention is to provide novel and improved calculator control arrangements that are compact, relatively inexpensive, and which can be maintained with relative ease.

Another object of the invention is to provide a novel and improved calculator organization capable of accumulating, on a selective basis, the results of a plurality of a series of data manipulations.

Still another object of the invention is to provide novel and improved data entry control arrangements for use in electronic calculators.

A further object of the invention is to provide novel and improved calculator logic organizations which enables the efficient and rapid performance of a wide variety of data manipulations.

Another object of the invention is to provide novel and improved data entry and decimal point control arrangements.

A further object of the invention is to provide simplified control logic arrangements in a calculator which increase the number and power of subordinate logic operations without increasing the amount of hardware necessary to perform those logic operations.

In accordance with the invention there is provided a calculator having an arithmetic unit that includes added circuitry for performing basic data manipulation operations such as addition and subtraction. In the preferred embodiment disclosed herein, the calculator further includes a log register which is coupled through accumulating logic to a store of log constants. The preferred embodiment also includes a display or work register, two accumulator registers, and logic which permits duplex accumulation of the results of a series of mathematical manipulations performed by the calculator. Data entry to the work register is provided through a manually operable keyboard.

The control logic provided in this calculator includes a first control register settable to a plurality of states, a first state responsive to data entry signals and controlling the entry of data into the calculator; a second state controlling basic arithmetic manipulations; and further states controlling other data manipulations performed by the calculator. A subsidiary control register, operable in conjunction with data entry signals and signals indicative of the state of the first control register controls, among other things, the entry of data into the calculator from the keyboard. A subsidiary feature of the invention, relating to data entry, is the circuitry controlling the entry of a decimal point in a register. The calculator control, in response to the first data digit stored in the register places unique indications in the subsequent stages of the register and in response to the next entered signal, serially senses the stages of the register and enters the appropriate indication in the first stage that is sensed to store the unique "no data" indication. Other subsidiary control elements are utilized in conjunction with the first control register outputs, to control the alignment of decimal points, the basic arithmetic operations of addition or subtraction, more complex mathematical manipulations involving the generation of logarithms and/or antilogarithms, the selection of one of the two accumulator registers for accumulation of the results of series of mathematical operations; and the display of the results of the many operations of which the calculator is capable. The outputs of the control registers and control signals are applied through comprehensive logic arrangements, which in the preferred embodiment, are diode AND circuit logic arranged on five removable cards which facilitate maintenance of the calculator, to combine and channel control signals necessary for the operation of the calculator.

The calculator constructed in accordance with the invention is a compact, easy to operate and versatile device, featuring coordinated control logic arrangements.

Other objects, features and advantages of the invention will be seen as the following description of a particular embodiment progresses in conjunction with the drawings, in which:

FIGS. 18, 19, 20, 21 and 22 show a plurality of logical ANDs making up the bulk of the calculator control logic which in the preferred embodiment are diode networks;

Figure 1:
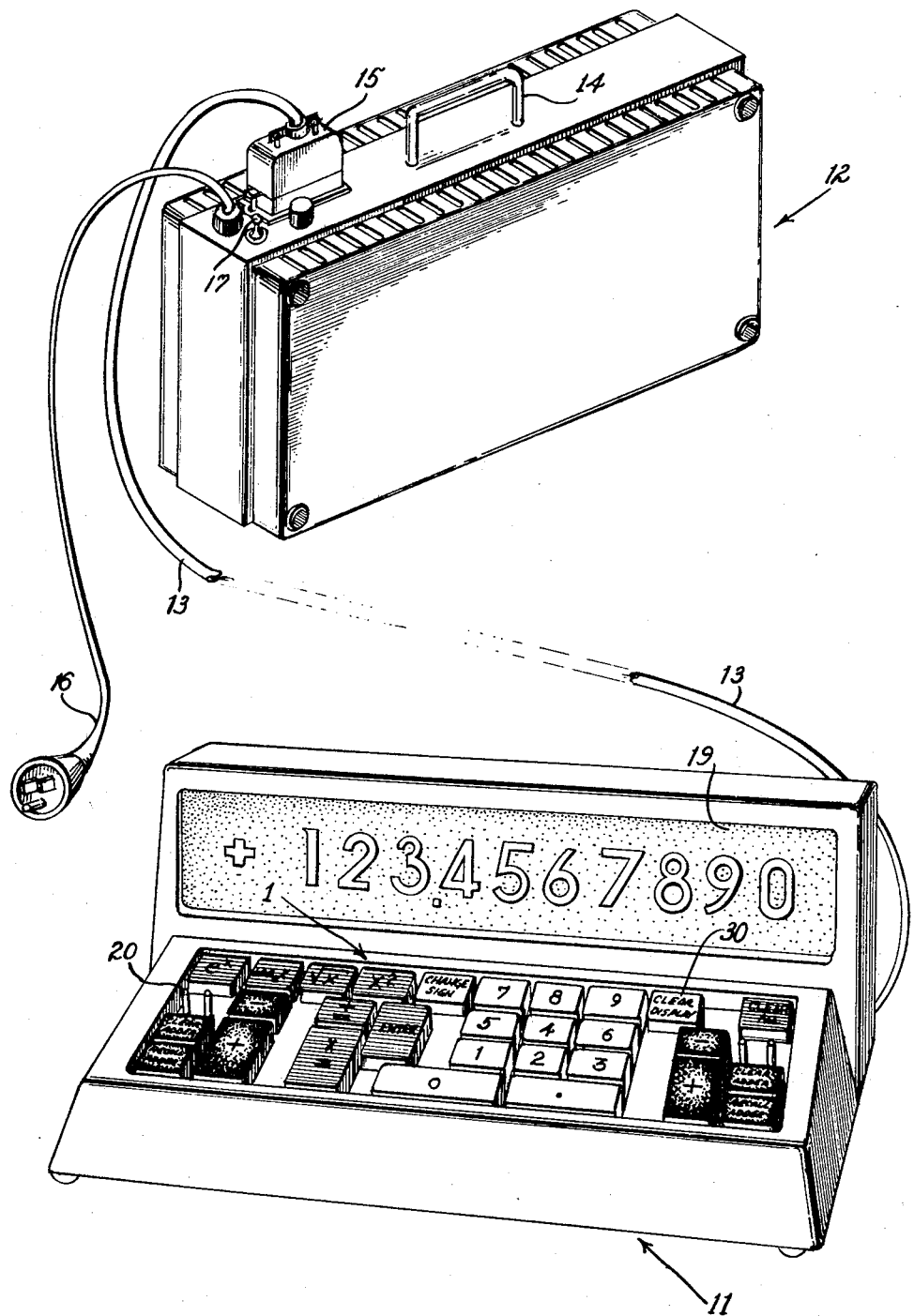
FIG. 1 is a pictorial view of the calculator of the invention.

FIGS. 23 through 28 each show flow charts of one of the more simple calculator operations;

FIGS. 29 through 38 show flow charts of the ten major system cycles of the calculator ("b modes"); and FIGS. 39 through 47 are simple "macro" flow charts showing the manner in which the calculator combines the "b modes" to produce more complex operations of the calculator that are built up from various combinations of these major system cycles.

This invention relates to a compact and relatively inexpensive electronic calculating apparatus capable of performing an unusually wide range of mathematical operations at electronic speeds. As appears in FIG. 1, the calculator consists of two major components, a desk-top keyboard console 11, and an electronics package 12. The electronic package utilizes solid-state circuits on readily replaceable plug-in modules, thus ensuring easy maintenance and quiet operation. The keyboard console is connected to the electronic package by a single compact (¼" diameter) cable 13. The electronic package may be plugged into a standard, grounded, 115 v. AC wall outlet.

The console weighs less than six pounds and measures approximately 10¼" x 8" x 4½". The electronic package weighs less than 14 pounds and measures about 16½" x 8" x 5½". The electronic package has a convenient carrying handle 14, and may be readily disconnected from the console cable at detachable plug 15. Both units may be moved about with ease. When the calculator is set up at a new location no complicated adjustments or calibrations are required. The console cable 13 is plugged into the electronic package at plug 15; power cable 16 is plugged into a wall outlet; the electronic package is turned on at switch 17 and the console is turned on at switch 20. The calculator is then ready to use.

Data and commands are entered into the calculator by actuating appropriate keys on the console keyboard 1. Each key is marked with a self-explanatory numeral or symbol. The size, grouping, and color coding of the keys are engineered for learning and efficient operation. Each key operates a sensitive microswitch. Operator fatigue is thus much less than in the case of electro-mechanical calculators which usually require longer key travel against greater mechanical resistance.

Input data and the results of computations are displayed in illuminated characters in a darkened display aperture 19 immediately above the keyboard. As a number is indexed on the keyboard, the display shows the number instantaneously. A glance at the display will confirm correct indexing. If a wrong number has been indexed, simple error correction is available. The Clear Display key 30 is pressed to remove the error; the correct number may then be indexed.

The calculator described herein readily performs all the normal arithmetic functions of existing electronic and electro-mechanical calculators; for example, it adds, subtracts, multiplies, and divides operands of up to ten decimal digits on single keystroke commands. However, one major innovation incorporated in said calculator is that besides the basic arithmetic operations described above it is capable of performing far more powerful mathematical functions. On single-keystroke command, the calculator extracts eight-place natural logarithms, generates inti-logarithms thereof, extracts square roots, or generates squares. These capabilities are not obtained by utilizing the basic arithmetic operations in slow and cumbersome algorithms. On the contrary, they are built into the basic system logic; and are used as a means of implementing the more basic arithmetic functions of multiplication (accomplished by addition of logarithms of the operands) and division (subtraction of logarithms).

Other features of the calculator greatly facilitate computations applicable to a wide range of business and scientific problems. Two independent adders have sets of keys operating independently to add, subtract, recall, or clear numbers. By setting of well marked control switches for duplex operations, the calculator affords automatic accumulation of products, multipliers, and other entries for various mathematical requirements. Successively accumulated running sub-totals can be recalled from the calculator's memory unit at any time to continue the calculation. Floating decimal point control is provided; the decimal point is keyed in naturally with the number. The calculator automatically positions the decimal point, and shows it correctly in the display. Reciprocals are generated by a single key stroke (there is no need to enter 1 and then divide it by the number). There is a key which converts the sign of a number from plus to minus, and vice versa. This gives additional flexibility to many calculations.

All of the operations described above are executed almost instantaneously. Even in the case of long multiplication and division operations, successive operations are executed faster than any human operator can actuate the keyboard. Consequently, unlike slower electro-mechanical devices, the calculator ensures that no operator time is wasted while waiting for the machine to complete intermediate computations.

Figure 2:
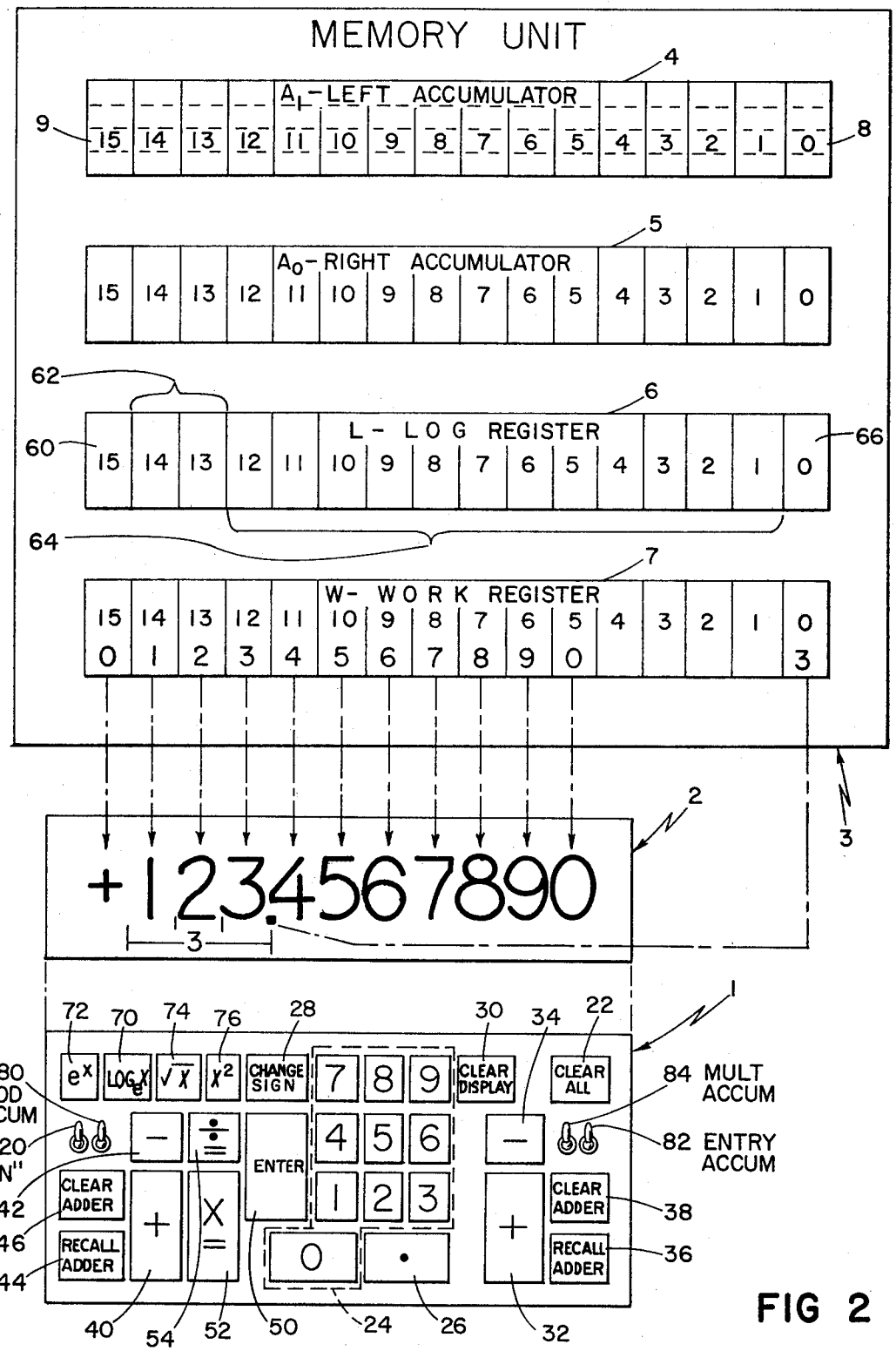
FIG. 2 is a diagrammatic view of the keyboard console operation controls and display and of the four magnetic core registers comprised by the calculator's memory unit.

FIG. 2 is a diagrammatic view of the keyboard console operating controls 1 and display 2, and of the four magnetic core registers comprised by the calculator's memory unit 3. These registers are the Left Accumulator 4, the Right Accumulator 5, the Log Register 6, and the Work (or display) Register 7.

Each of these four rapid-access core registers is composed of sixteen binary-coded decimal digits. Each digit is in turn composed of four magnetic cores which store the four binary bits required to code a single decimal digit. Thus each of the four registers is physically composed of a set of sixty-four magnetic cores. The least significant digit 8 of each register (in digit position 0) stores the decimal point position (modulo 10). The most significant digit 9 of each register (in digit position 15) stores the sign of the number stored therein. (A plus sign is coded "0," a minus sign is coded "9.") The intermediate digits in positions 1 through 14 store fourteen numerical digits. Although the calculator displays only the ten most significant digits of the Work Register 7 it operates upon an additional four digits, thus obtaining added accuracy.

The following table correlates the functions of the various keys and switches on keyboard 1 with their characters or designations.

TABLE I.—KEYBOARD CONTROLS

| | |
|---|---|
| BASIC CONTROLS | |
| ON (switch) | This switch 20 is turned on to energize the keyboard console. When turned off, the entire keyboard, with the single exception of the CLEAR ALL key 22, is disabled. |
| CLEAR ALL | This key 22 clears all register contents in one stroke even if the ON switch is turned off. |
| Numeral Keys Decimal Point Key. | Numeral Keys 24 and Decimal Point Key 26, when operated place their information in the Work Register 7. (The contents of the Work Register are always visible at display 2.) For example, to key in 3.45, press the keys [3] [.] [4] [5] |
| CHANGE SIGN | This key 28 changes the sign of the number in the Work Register 7. For example, to key in −3.45, press the keys: [3] [.] [4] [5] [Change Sign] |
| CLEAR DISPLAY | This key 30 clears the Work Register, but leaves the contents of the other three registers unchanged. |
| RIGHT ADDER CONTROLS | |
| + | This key 32 adds the contents of the Work Register to the contents of the Right Accumulator 5. The resulting sum is stored in both the Right Accumulator and the Work Register. Because the sum is in the Work Register, it is visible at display 2. |
| − | This key 34 subtracts the contents of the Work Register from the contents of the Right Accumulator and stores the difference in both the Right Accumulator and the Work Register. The difference is thus visible at display 2. |
| RECALL ADDER | This key 36 transfers the contents of the Right Accumulator into the Work Register for display while leaving the Right Accumulator itself unchanged. |
| CLEAR ADDER | This key 38 clears the Right Accumulator and does not preserve its contents. |
| LEFT ADDER CONTROLS | |
| +<br>−<br>RECALL ADDER<br>CLEAR ADDER | These four keys 40, 42, 44, and 46 perform the same functions with respect to the Left Accumulator 4 that their counterparts 32, 34, 36, and 38 respectively (described above) perform with respect to the Right Accumulator. |
| MULTIPLY AND DIVIDE CONTROLS | |
| ENTER | This key 50 stores the natural logarithm (logarithm to the base e) of the number in the Work Register 7 in the Log Register 6, and clears the Work Register. The most significant digit 60 of the Log Register then represents the sign of the logarithm, the next two digits 62 represent the characteristic of the logarithm, the next twelve digits 64 represent the actual mantissa of the logarithm, and the least significant digit 66 always contains 2, indicating that the decimal point is to be spaced over two places from the most significant end of the logarithm (to mark the division between the characteristic and the mantissa). If some logarithm is already stored in the Log Register when the ENTER key is operated, the logarithm of the number in the Work Register is added to the logarithm in the Log Register. This feature permits chain multiplication of a series of factors without the necessity of entering intermediate sub-products. For example, to multiply 2 x 3 x 4 x 5, press the keys: [2] [ENTER] [3] [ENTER] [4] [ENTER] [5] [X=]<br>The Work Register then displays the correct result, +120.0000000. |
| X= | This key 52 multiplies the number previously entered by the contents of the Work Register, and displays the result in the Work Register. The logarithm of the multiplier in the Work Register is added to the logarithm of the number previously entered (currently in the Log Register). This leaves the sum of the logarithms in the Log Register. The calculator then generates the anti-logarithm of this sum (which represents the product of the two numbers to be multiplied) and stores the result in the Work Register. The Log Register is cleared by the process of generating the anti-logarithm. |
| ÷= | This key 54 divides the number previously entered by the contents of the Work Register and displays the result in the Work Register. The logarithm of the divisor in the Work Register is subtracted from the logarithm of the number previously entered (currently in the Log Register). This leaves the difference of the logarithms in the Log Register. The |

TABLE I.—Continued

| | |
|---|---|
| ENTER | calculator then generates the anti-logarithm of this difference (which represents the quotient of the two numbers to be divided) and stores the result in the Work Register. The Log Register is cleared by the process of generating the anit-logrithm. If no number was previously entered, this key generates the reciprocal of the number in the Work Register and displays this reciprocal in the Work Register. (This follows from the fact that the Log Register initially contains 0, which is the natural logarithm of 1.) |
| LOGARITHMIC CONTROLS | |
| $\mathrm{LOG}_e X$ | This key 70 causes the natural logarithm of the number in the Work Register to be displayed in the Work Register. Although the logarithm is initially generated in the Log Register, the Log Register is cleared when the logarithm is displayed in the Work Register. |
| $e^x$ | This key 72 causes the number in the Work Register to be treated as a natural logarithm and displays the anti-logarithm thereof in the Work Register. Although the initial contents of the Work Register are transferred into the Log Register in order to generate the anti-logarithm, the Log Register is cleared when the anti-logarithm is displayed in the Work Register. |
| $\sqrt{X}$ | This key 74 causes the square root of the number in the Work Register to be displayed in the Work Register. One-half the logarithm of the number is initially generated in the Log Register, and then the anti-logarithm thereof is generated and displayed in the Work Register. The Log Resigter is left in a cleared condition. |
| $X^2$ | This key 76 causes the square of the number in the Work Register to be displayed in the Work Register. Twice the logarithm of the number is initially generated in the Log Register, and then the anti-logarithm thereof is generated and displayed in the Work Register. The Log Register is left in a cleared condition. |
| DUPLEX ACCUMULATION CONTROLS | |
| PROD ACCUM (switch). | This switch 80 causes the results of multiplications or divisions to be added automatically into the Left Accumulator. |
| ENTRY ACCUM (switch). | This switch 82 causes the automatic summation of the first numbers entered (multiplicand or dividend) for each of a series of multiplications or divisions. The resulting sum is stored in the Right Accumulator. |
| MULT ACCUM (switch). | This switch 84 causes the automatic summation of the second numbers keyed in for each of a series of multiplications or divisions (multiplier or divisor). The resulting sum is stored in the Right Accumulator. If both the ENTRY ACCUM switch 82 and the MULT ACCUM switch 84 are operated, the Right Accumulator stores the sum of all the operands used in the series of multiplications and divisions. (Both the first numbers entered and the second numbers keyed in.) |

Figure 3:
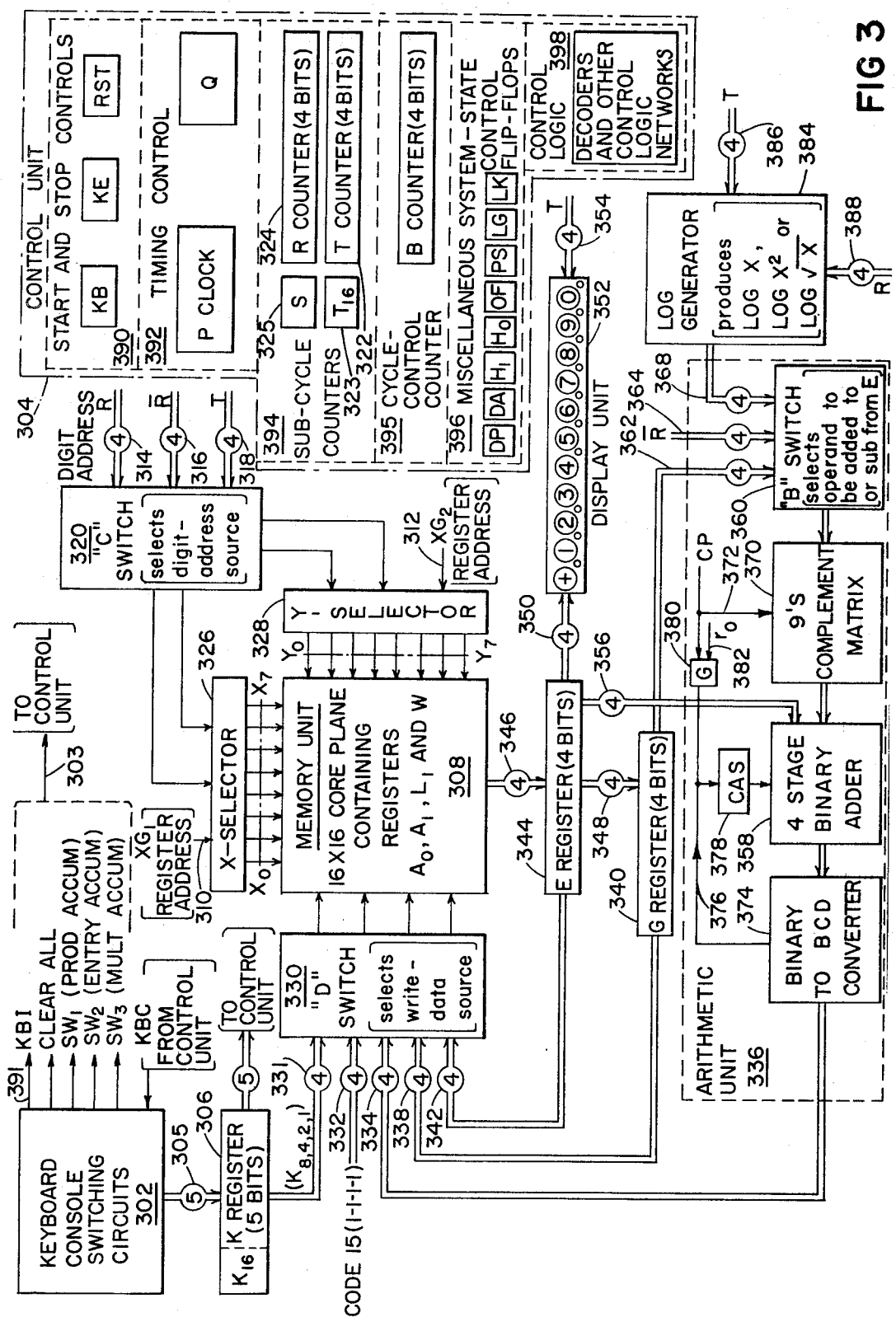
FIG. 3 is an overall block diagram of the system logic of the calculator.

FIG. 3 is an over-all block diagram of the system logic of the calculator. The input commands which determine the operations to be performed by the calculator and the numerical data to be operated upon are both entered into the calculator by means of switches at the keyboard consoled. The keyboard console switching circuits 302 generate output signals in accordance with the operation of said switches. Certain of these output signals are applied over lines 303 directly to the Control Unit 304; others on lines 305 are used to control the state of the K register 306, a five-bit input buffer.

The calculator Memory Unit 308 comprises a 16 x 16 core magnetic core plane which stores sixty-four individually addressable decimal digits, each such digit being stored in binary coded decimal form in four magnetic cores. These sixty-four digits make up four 16-digit core registers, designated respectively $A_0$ (Right Accumulator 5), $A_1$ (Left Accumulator 4), L (Log Register 6), and W (Work or Display Register 7).

Six bits of adress information are used to address any one of the sixty-four four-bit decimal digits in the Memory Unit. Two of these six bits, designated $XG_1$ and $XG_2$ (respectively line 310 and line 312) are register-address bits used to specify one of the four core registers in accordance with the coding shown in Table II.

TABLE II.—MEMORY REGISTER ADDRESS CODING

| $XG_1$ | $XG_2$ | Addresses |
|---|---|---|
| ) | 0 | W, Register 7 (Work or Display). |
| ) | 1 | $A_0$, Register 5 (Right Accumulator). |
| l | 0 | L, Register 6 (Log). |
| l | 1 | $A_1$, Register 4 (Left Accumulator). |

The remaining four bits of address information are digit-address bits used to specify one of the sixteen digits making up the addressed register. These four digit-address bits may be taken from the 1-side of the R counter flip-flops 314, the 0-side of the R counter flip-flops 316, or the 1-side of the four least significant T counter flip-flops $T_1$, $T_2$, $T_4$, and $T_8$ (lines 318). The choice is determined by the C switch 320. This switching arrangement permits the calculator to scan the four memory registers in three distinct modes of operation. When the 1-side of the T counter flip-flops are switched in by the C switch 320, the memory reads or writes the addressed register one digit at a time from right (least significant bit, bit 0) to left (most significant bit, bit 15) as the T counter 322 is counted up. Similiarly, when the 1-side of the R counter flip-flops are switched in, the memory reads or writes successive digits from right to left as the R counter 324 is counted up. Finally, when the 0-side (complement side) of the R counter is switched in, the memory reads or writes from left to right (from bit 15 to bit 0) as the R counter is counted up.

The two XG register-address bits (lines 310 and 312) and the four digit-address bits (the latter taken from the C switch output) are applied to X and Y selection networks 326 and 328, respectively. The $XG_1$ bit and two digit-address bits are applied to the X selection network; the $XG_2$ bit and the remaining two digit-address bits are applied to the Y selection network. The X and Y selection networks in turn generate sixteen select signals (eight X-select signals and eight Y-select signals) which energize appropriate X and Y drive lines within the core plane. Any given configuration of these sixteen selection signals selects four of the 256 cores in the 16 x 16 core plane. The four selected cores correspond to one of the sixty-four binary-coded decimal digits comprised by the Memory Unit core plane.

During write operations the specific information to be written into the four addressed cores making up the addressed digit is taken from one of five alternate four-bit data sources, the choice between these five data sources is determined by the D switch 330. The first of the five sources is the K register 306. Only the four least significant bits of this register $K_8$, $K_4$, $K_2$, and $K_1$ are used to hold numerical data that is to be written in memory (this data is brought into the D switch on lines 331). The second source of data (lines 332) is a fixed code 1–1–1–1 (code 15) which indicates that no numerical data is stored in the digit position so coded. The third source of data (lines 334) is the output of the Arithmetic Unit 336. The fourth source of data (lines 338) is the contents of the four-bit G register 340. The fifth and final source of data (lines 342) that may be written into the addressed memory digit is the contents of the four-bit E register 344.

When an addressed digit is read out of memory through lines 346 it is initially stored in the E register memory output buffer 344. From the E register the data read out from the addressed memory digit may be transferred along lines 348 to a second buffer register, the G register 340, it may be applied along lines 350 to the Display Unit 352, or it may be routed through lines 356 and thus used as one of the two operands that are applied to the four stage binary adder 358 in Arithmetic Unit 336. The display position at which a given digit of data appears is determined by the contents of the T counter 322; the contents of T are applied to the display through lines 354.

Arithmetic Unit 336 always takes the first of its two operands from the E register 344. The second operand is taken from one of three alternate sources; the choice between these three sources is determined by the B switch 360. The first of the three sources is the G register 340. The contents of G are applied to the B switch through lines 362. The second source is the R counter 324. The 1's complement of the R counter contents are applied to the B switch through lines 364. The third and final source is the log generator 384. The output of the log generator is applied to the B switch through lines 368.

Each digit received by the B switch is applied to 9's complement matrix 370. If a subtraction is to be performed, the 9's complement matrix is enabled by signal CP at 372; the 9's complement matrix then forms the 9's complement of the digit received from the B switch. If an addition is to be performed, rather than a subtraction, the CP signal is not asserted, and the 9's complement matrix passes the digit received from the B switch unchanged.

The output digit from the 9's complement matrix 370 is applied to 4-stage binary adder 358 where it is summed with the contents of E register 344 and the contents of the CAS carry flip-flops 378. The resulting sum is applied to binary to binary-coded-decimal converter 374 which generates the final output digit from the Arithmetic Unit, the digit representing the digit in the E register increased (for addition operations) or reduced (for subtraction) by the B switch output digit.

If the output from converter 374 is greater than nine, a carry signal is produced on line 376, and said carry is used to set CAS carry flip-flop 378 in preparation for the processing of the next digit. The calculator effects subtraction operations by adding the 10's complement of the subtrahend (the 9's complement augmented by 1) to the minuend. The 1 that converts the 9's complement to 10's complement is generated by setting the CAS carry flip-flop 378 before processing the initial digit of the subtraction operation. This is accomplished by passing the CP signal through gate 380 when the gate is enabled by the $r_0$ signal on line 382. The $r_0$ signal is asserted only when the R counter 324 contains 0, i.e. during the processing of the first (least significant) digit of the subtraction operation.

The log generator 384 is controlled by the contents of the T counter 322 and the R counter 324. The T counter contents (on lines 386) determine which of 12 different logarithms stored in the log generator is to be used. The R counter contents (in lines 388) determine which digit of the selected constant is to be generated at a given time.

The Control Unit 304 contains the control counters, flip-flops, and logic networks that produce the sequenced signals necessary to initiate and control the various commands that the calculator performs in response to keyboard input. The start and stop controls 390 control the starting and stopping of each key-initiated command. The KB and KE flip-flops form a synchronizing network that synchronizes the randomly timed operation of a keyboard key to the internal clock of the calculator. The RST flip-flop is set by the CLEAR ALL signal from the keyboard. When set, RST causes the generation of a plurality of reset pulses that return the system logic to an appropriate initial state and clear all registers.

The timing control logic 392 includes the system P clock logic as well as the Q flip-flop which determines when the R counter may be stepped.

The subcycle counters 394 include the R counter 324, an associated S flip-flop 325, and the T counter 322 and 323. These components govern the timing of the various operations making up each of the major system cycles.

The B counter 395 advances the calculator logic from one major system cycle to another in accordance with the requirements of the current command.

A plurality of control flip-flops 396 are used for storing control information during the progress of the various system commands.

The states of the control counters and flip-flops are logically combined with other control signals in a plurality of decoders and other control logic networks 398.

All of the foregoing logical elements are illustrated and described in greater detail in the remaining figures and associated text.

Figure 4:
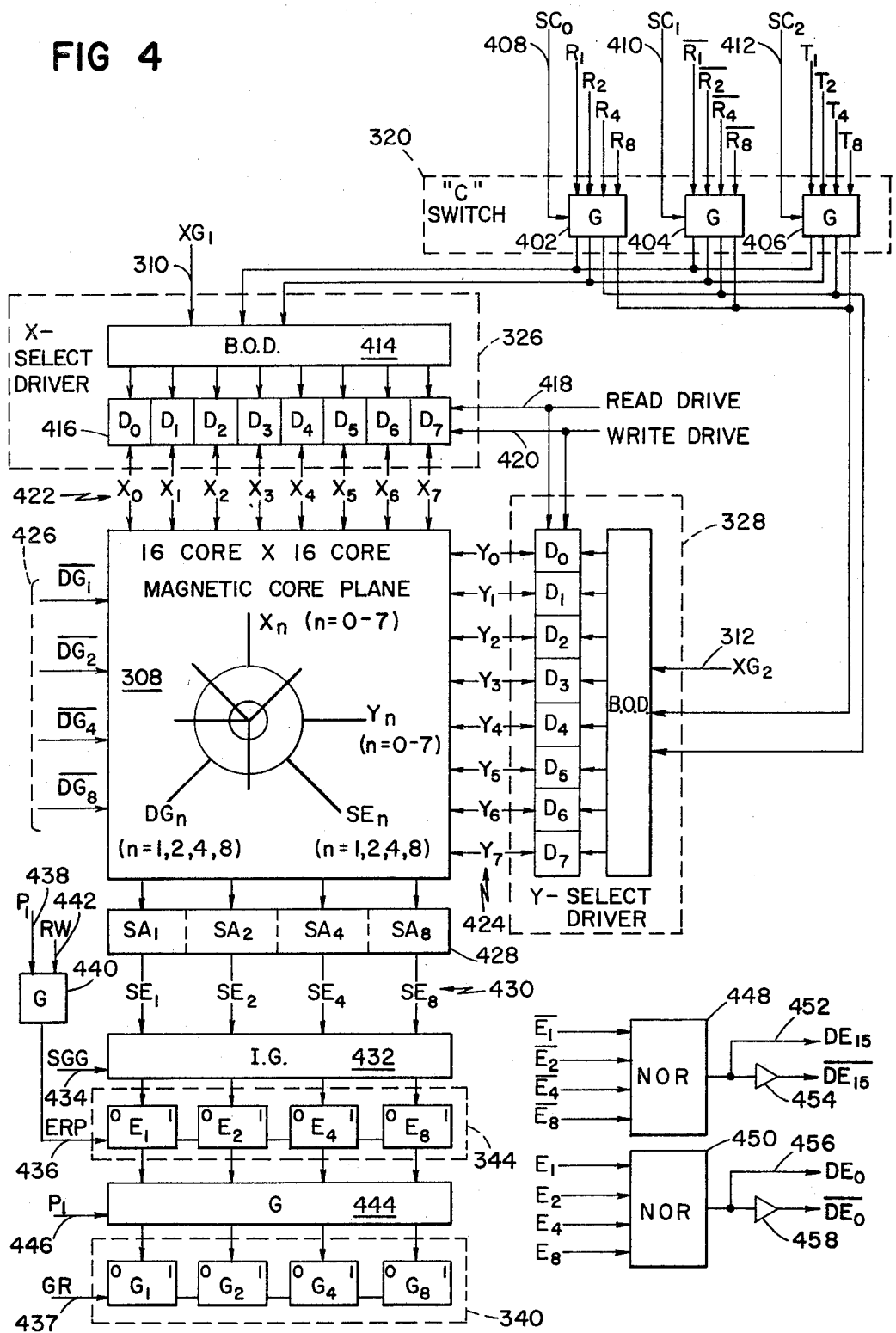
FIG. 4 is a block diagram of the calculator's Memory Unit with its associated input and output circuitry.

FIGURE 4 is a block diagram of the calculator's Memory Unit 308 with its associated input and output circuitry. The C switch 320 determines the source of the four digit-address bits. The C switch contains three gates 402, 404, and 406. When gate 402 is enabled by the assertion of $SC_0$ signal at input 408 the 1-side outputs of the four R counter (324) flip-flops ($R_1$, $R_2$, $R_4$, and $R_8$) are used as the digit-address. When gate 404 is enabled by the assertion of the $SC_1$ signal at input 410, the 0-side outputs of the four R counter flip-flops ($\overline{R_1}$, $\overline{R_2}$, $\overline{R_4}$ and $\overline{R_8}$) are used as the digit-address. When gate 406 is enabled by the assertion of the $SC_2$ signal at input 412, the 1-side outputs of the four T counter flip-flops ($T_1$, $T_2$, $T_4$ and $T_8$) are used as the digit-address. If none of the three signals $SC_0$, $SC_1$, or $SC_2$ are asserted, the digit address is 0 (decimal point position). The $XG_1$ signal (line 310) and the $XG_2$ signal (line 312) determine which of the four 16-digit core registers is to be addressed as indicated above.

The $XG_1$ signal and two of the four C switch outputs are applied to the X-select driver 326. The X-select driver contains a binary-to-octal decoder 414, and a set of eight bi-directional core-drivers $D_0$ through $D_7$ (416). For each of the eight possible configurations of the three input bits applied to the X-select driver 326 one of the eight outputs of binary-to-octal decoder 414 is asserted. The asserted output enables the associated core driver which is then turned on in one direction by the read-drive signal on line 418, and in the opposite direction by the write-drive signal on line 420. The resulting read and write drive pulses are applied to the core plane via the appropriate X-drive core-selection line 422. Each X-drive core-selection line threads eight sets of four cores, thereby half-selecting eight four-bit digits.

Similarly, the $XG_2$ signal and the remaining two of the four C switch outputs are applied to the Y-select driver 328. That driver functions in essentially the same manner as the X-select driver. Its output read and write drive pulses are applied to the core plane via the appropriate Y-drive core-selection line 424. Each Y-drive core-selection line also threads eight sets of four cores, thereby half-selecting eight four-bit digits. The intersection of the active X-drive core-selection line and the active Y-drive core-selection line uniquely addresses one set of four cores, namely that four-bit set of cores making up the single addressed digit. At the occurrence of the read-drive signal on line 418, data is read out from the addressed digit; at the occurrence of the write drive signal on line 420, data is written back into the addressed digit.

The four bits of data to be written into the addressed digit are determined by the four digit-inhibit signals on lines 426 ($\overline{DG_1}$, $\overline{DG_2}$, $\overline{DG_4}$, and $\overline{DG_8}$). When any one of these signals is asserted, a 0 is written into the corresponding core bit of the addressed digit at the write-drive signal. If a given digit-inhibit signal is not asserted, a 1 is written into the corresponding core bit of the addressed digit at the write-drive signal.

At the read-drive signal, the outputs generated by the four core bits of the addressed digit are applied to four sense amplifiers 428 ($SA_1$, $SA_2$, $SA_4$, and $SA_8$). The sense amplifiers corresponding to cores which contained 1's prior to the read-drive signal produce output signals on lines 430 ($SE_1$, $SE_2$, $SE_4$, and $SE_8$). Unless the SGG inhibit signal (line 434) is asserted, these SE output signals transfer the same data that was stored in the four cores of the addressed digit through inhibit gate 432 into the E register memory output buffer 344.

The E register 344 is cleared by the occurrence of ERP reset pulse (line 436). This pulse is initiated by the $P_1$ clock pulse (line 438) whenever the RW signal (line 442) is asserted and thereby enables gate 440. The same $P_1$ clock pulse is also applied to gate 444 over line 446, thereby advancing the contents of E register 344 into the G register 340. The G register is cleared by GR on line 437.

The contents of the E register are decoded by logical NOR gates 448 and 450 to determine whether or not E contains code 15 (1-1-1-1) and code 0 (0-0-0-0). If the E register contains 15, $DE_{15}$ is asserted on line 452. The output of NOR gate 448 is also applied to inverter 454 to produce the complement signal $\overline{DE_{15}}$ ("not" $DE_{15}$), which signal is asserted whenever the E register does not contain code 15. If the E register contains 0, $DE_0$ is asserted at line 456; if it does not contain 0, inverter 458 causes the assertion of $\overline{DE_0}$.

(In all figures of this specification the same triangular symbol designated by reference numerals 454 and 458 of FIG. 4 is used to signify means producing logical inversion or the equivalent thereof; and throughout the present description signal designations with superscribed lines are used to signify the logical complements of said signal designations absent the superscribed lines.)

Figure 5:
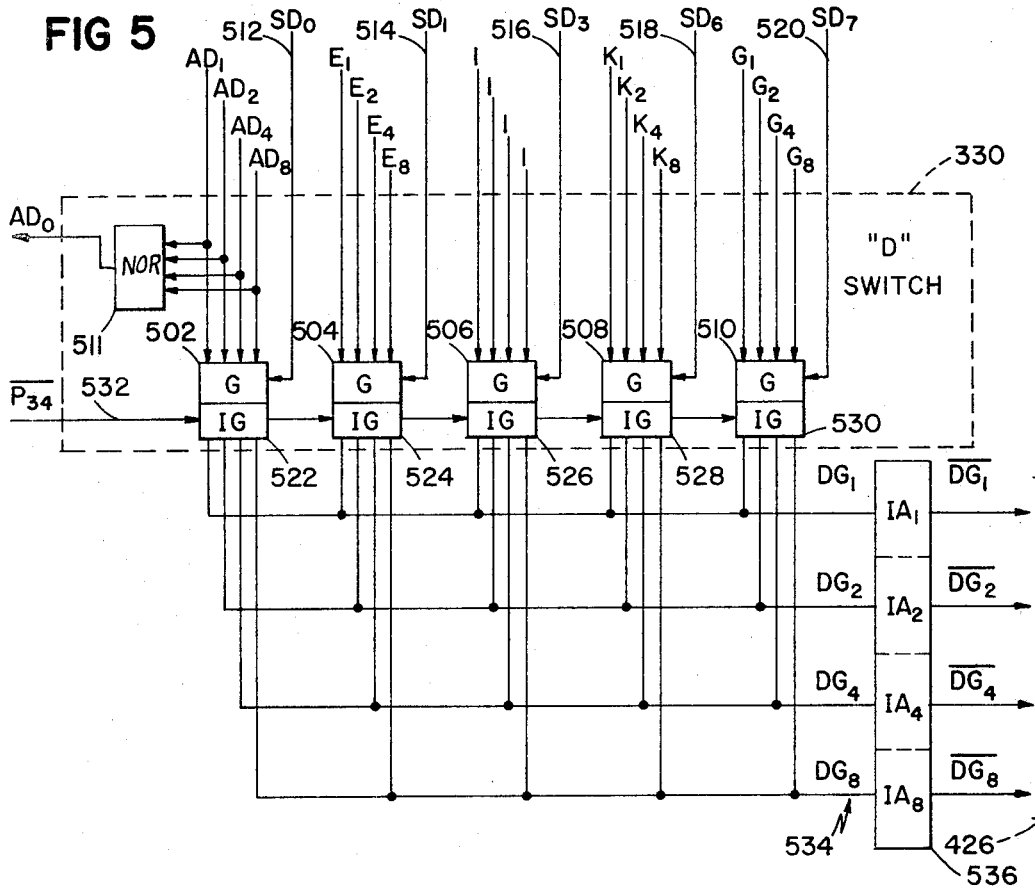
FIG. 5 is a block diagram of the data-input logic of the calculator which controls the input data that is written into the Memory Unit.

FIGURE 5 is a block diagram of the data-input logic which controls the four digit-inhibit signals applied on lines 426 ($\overline{DG_1}$, $\overline{DG_2}$, $\overline{DG_4}$, and $\overline{DG_8}$) which in turn control the four bits of input data that are written into the addressed digit of the memory during the write-drive signal. The D switch 330 determines the source of the four input data bits.

The D switch contains five gates 502, 504, 506, 508, and 510. When gate 502 is enabled by the assertion of the $SD_0$ signal at input 512, the outputs from the Arithmetic Unit ($AD_1$, $AD_2$, $AD_4$, and $AD_8$) are used as the source of the input data to be written into the addressed memory digit. The four inputs from the Arithmetic Unit are combined by NOR gate 511 to determine whether the sum or difference digit generated is or is not a zero. The $AD_0$ signal is asserted if the sum or difference digit is zero, the signal is not asserted if the sum or difference digit is not a zero. When gate 504 is enabled by the assertion of $SD_1$ at input 514, the contents of the E register memory output buffer are rewritten into the addressed digit. When gate 506 is enabled by the assertion of $SD_3$ at input 516, code 15 (1-1-1-1) is used as input data. When gate 508 is enabled by $SD_6$ at input 518, the contents of the four least significant bits of the K register ($K_1$, $K_2$, $K_4$, and $K_8$) provide the input data. When gate 510 is enabled by $SD_7$ at input 520, the contents of the G register provide the input data. If none of the five input signals $SD_0$, $SD_1$, $SD_3$, $SD_6$, or $SD_7$ are asserted, the input data is code 0 (0-0-0-0).

Inhibit gates 522, 524, 526, 528, and 530 ensure that the input data is only permitted to pass at the appropriate portions of the read-write cycle. These gates are disabled by the $\overline{P_{34}}$ signal (line 532) at all times except during the generation of the $P_3$ and $P_4$ clock pulses. While the inhibit gates are disabled, no digit-inhibit signals (lines 426) may be generated. During $P_3$ and $P_4$ time, when the inhibit gates are not disabled, the four bits of input data from the enabled gate 502, 504, 506, 508, or 510 are passed through as input data bits on lines 534 ($DG_1$, $DG_2$, $DG_4$, $DG_8$).

The DG input data bits which are 1's do not produce any inhibit current and so result in the writing of 1's in the corresponding cores of the addressed digit. The D input data bits which are 0's do cause the corresponding inhibit amplifiers 536 ($IA_1$, $IA_2$, $IA_4$, and $IA_8$) to be turned on, thus generating digit-inhibit signals on lines 426 ($\overline{DG_1}$, $\overline{DG_2}$, $\overline{DG_4}$, and $\overline{DG_8}$) which prevent the writing of 1's in the associated cores of the addressed digit, and which cause 0's to be written in those cores.

Figure 6:
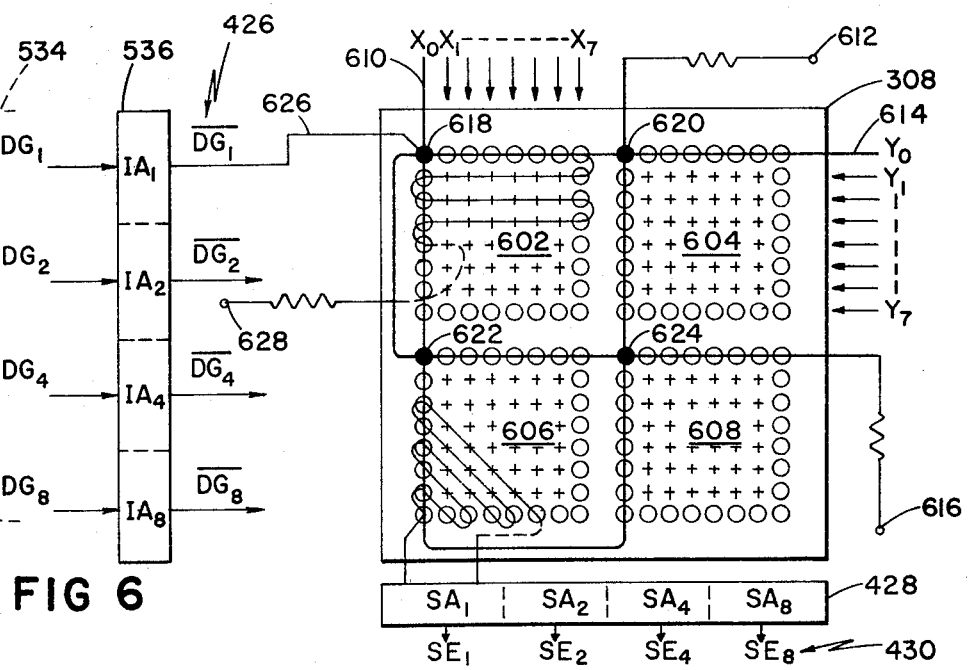
FIG. 6 is a diagrammatic view of the Memory Unit core plane.

FIGURE 6 is a diagrammatic view of the Memory Unit core plane 308, illustrating the geometrical relationship of the component magnetic cores and the associated core windings. The core plane is a square 16 x 16 core matrix made up of four smaller square 8 x 8 core arrays 602, 604, 606, and 608. Each of the eight X-drive core-selection lines ($X_0$ through $X_7$) is shown in the figure as passing through one vertical column of eight cores in each of the four 8 x 8 core arrays. For example, the X-drive core-selection line $X_0$ is shown as passing through (and thus half-selecting) the left-hand column of eight cores in each of the four 8 x 8 arrays. The X-select read and write drive pulses enter $X_0$ at 610, pass through thirty-two (4×8) half-selected cores and exit to a suitable terminating load 612. Similarly, each of the eight Y-drive core-selection lines ($Y_0$ through $Y_7$) is shown in the figure as passing through one horizontal row of eight cores in each of the four 8 x 8 arrays. For example, the Y-drive core-selection line $Y_0$ is shown as passing through (and thus half-selecting) the uppermost row of eight cores in each of the four arrays. The Y-select read and write drive pulses enter at 614, pass through thirty-two (4×8) half-selected cores and exit to a suitable terminating load 616. Note that $X_0$ and $Y_0$, the two core-selection lines that are shown in full in FIG. 6, intersect at one core in each of the four core planes. These four cores, 618, 620, 622, and 624 are the four fully-selected cores making up the single four-bit binary coded decimal digit that is addressed by $X_0$ and $Y_0$. Each of the sixty-four possible combinations of one of the eight X-drive core selection lines ($X_0$ through $X_7$) with one of the eight Y-drive core selection lines ($Y_0$ through $Y_7$) will address one of the sixty-four four-bit digits stored in 16 x 16 core plane 308. Each of these sixty-four digits includes one core from each of the four 8 x 8 core arrays.

The four digit-inhibit signals (lines 426) ($\overline{DG_1}$, $\overline{DG_2}$, $\overline{DG_4}$, and $\overline{DG_8}$) are each applied to a separate inhibit-winding. Each of these four inhibit-windings threads all of the sixty-four cores in one of the four 8 x 8 arrays. For example, the $\overline{DG_1}$ inhibit winding is shown in the figure as threading all sixty-four of the cores in array 602. The $\overline{DG_1}$ digit-inhibit signal enters at line 626, passes back and forth through all eight horizontal rows of cores, and exits to a suitable terminating load 628. Each of the three remaining digit-inhibit signals is passed through a similar inhibit winding threading all sixty-four of the cores in one of the three remaining 8 x 8 core arrays (604, 606, and 608). In this manner each of the four digit-inhibit signals controls the data that is written into one of the four bits of the addressed digit. When a given inhibit signal is activated, no core in the associated array can have a 1 written into it by the X-select and Y-select write-drive pulses. Since all sixty-four cores in the 8 x 8 array are threaded by the inhibit signal it does not matter at which core among the sixty-four the two write-drive pulses happen to intersect. No core in the array is permitted to receive a 1; consequently, a 0 must be written into the selected core.

Core plane 308 contains four separate sense windings. Each of these four sense windings threads all of the sixty-four cores in one of the four 8 x 8 arrays. For example, the single sense winding illustrated in FIG. 6 is shown as passing diagonally back and forth through all sixty-four of the cores in array 606. Similarly, each of the three remaining sense windings threads all sixty-four of the cores in one of the three remaining arrays (602, 604, and 608). Both ends of each sense winding are coupled by suitable means to one of the four sense amplifiers 428 ($SA_1$, $SA_2$, $SA_4$, and $SA_8$).

In this manner each of the four sense windings senses the data that is stored in one of the four bits of the addressed digit. If a given core contains a 1, and is located at the intersection of the pair of X-drive and Y-drive core-selection lines that receive read-drive pulses, then that core changes state and generates an output signal upon the corresponding sense winding. Since all sixty-four cores in the 8 x 8 array are threaded by the sense winding it does not matter at which core the two read-drive pulses happen to intersect. If the selected core contains a 0, no output signal is generated upon the sense winding. However, if the selected core contains a 1, an output signal is applied to the sense winding. From the sense winding, the output signal is coupled to the corresponding sense amplifier 428. That sense amplifier then produces an SE output signal on one of the lines 430.

The result of this arrangement is: (1) that each four-bit digit is individually addressable; (2) that each of the four bits in the addressed digit may be controlled during write operations by one of the four digit-inhibit signals on one of the lines 426; and (3) that during read operations each of the four bits in the addressed digit generates an independent output signal on one of the lines 430.

The data written into the addressed digit during the write-drive pulse is identical to the four input data bits applied over lines 534 ($DG_1$, $DG_2$, $DG_4$, and $DG_8$) and is the complement of the four digit-inhibit signals on lines 426 ($\overline{DG_1}$, $\overline{DG_2}$, $\overline{DG_4}$, and $\overline{DG_8}$). The digit-inhibit signals that are asserted are applied to those bits of the addressed digit which are to be inhibited from receiving 1's during the write operation (i.e., into which 0's are to be written).

The data read out from the addressed digit during the read-drive pulse is the same data that was stored in the four cores of that digit prior to reading. This data is presented at the four sense amplifier outputs (lines 430) ($SE_1$, $SE_2$, $SE_4$, and $SE_8$).

Figure 7:
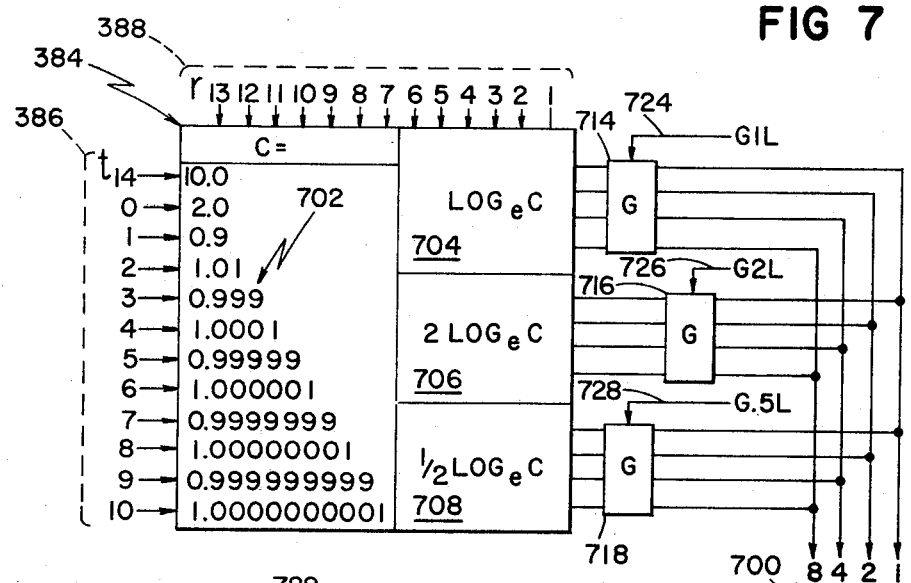
FIG. 7 is a diagrammatic view of the log generator employed in the calculator.

FIGURE 7 is a diagrammatic view of the log generator 384. The log generator comprises fixed memory means, for example diode AND matrices, which store a set of binary coded decimal digits each of which may be individually addressed and read out upon four output lines 700.

The function of the log generator is to store the natural logarithms of a set of twelve constants 702 ($\log_e C$), twice the natural logarithms of the same set of twelve constants (2 $\log_e C$), and half the natural logarithms of the same set of twelve constants (½ $\log_e C$). These three sets of logarithms are stored in binary coded decimal form in three similar fixed memory means, for example, diode AND matrices, 704, 706, and 708 respectively.

The outputs of these three fixed memories are applied to gates 714, 716, and 718, respectively, said gates being enabled by the G1L signal on 724, the G2L signal on 726, and the G.5L signal on line 728, respectively. During any given command, no more than one of these three gate signals is asserted, and no more than one of the three memory means (704, 706, and 708) is permitted to control output signals at output lines 700.

When the G1L signal (line 724) is asserted, the log generator output signals (lines 700) represent the natural logarithms of the twelve C constants 702 ($\log_e C$). When the G2L signal (line 726) is asserted, the log generator output signals represent the natural logarithms of the squares of the same twelve C constants 702 (2 $\log_e C$). When the G.5L signal (line 728) is asserted, the log generator output signals represent the natural logarithms of the square roots of the same twelve C constants 702 (½ $\log_e C$). If none of the three signals G1L, G2L, or G.5L are asserted, the log generator output is code 0 (0-0-0-0).

Operation of the log generator 384 is controlled by the decoded outputs (lines 386) of the four least significant bits of the T counter, and by the decoded outputs (lines 388) of the R counter. The contents of the T counter determine which of the twelve constants is to be used, and the contents of the R counter determine which digit of the logarithm of the selected constant or of its square or square root, as the case may be, depending on the which of the three gate enable signals (on lines 724, 726, and 728, respectively, is asserted) is to be applied to the log generator output lines 700.

Figure 8:
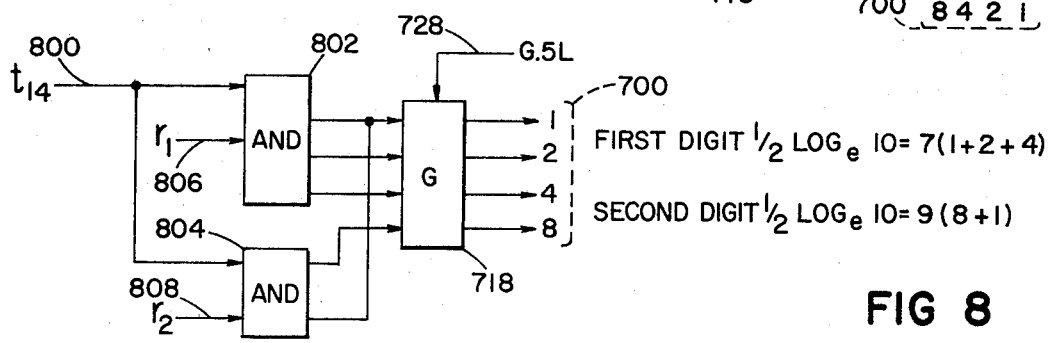
FIG. 8 is a block diagram of two of the component logic networks comprised by the log generator.

FIGURE 8 illustrates a logical means for implementing this result. Assuming that the current command requires the generation of the natural logarithms of the square roots of the C constants (rather than the natural logarithms of the constants themselves or their squares), the G.5L signal (line 728) is asserted, thus enabling gate 718 and permitting the four output signals from the ½ log C fixed memory to appear at the log generator output (lines 700).

The ½ log C fixed memory consists of a plurality of two-input logical AND's, each one of which is connected by suitable means (e.g. diodes) to some set of output lines from among the four output lines of the log generator. The specific set of output lines chosen to be connected to the output of a given logical AND determines the output digit to be generated when both inputs to that logical AND are asserted. FIGURE 8 shows for example two of the many logical AND's comprised by the ½ log C fixed memory.

When the T counter contains 14, the $t_{14}$ signal (line 800) is asserted. The $t_{14}$ signal furnishes one of the two inputs to each of the two logical AND's shown in FIG. 8 (802 and 804, respectively). When the R counter contains 1, the $r_1$ signal (line 806) is asserted, thus causing the output of logical AND 802 to be asserted, and so causing log generator outputs 1, 2, and 4 to be asserted at lines 700. These three outputs represent the binary coded decimal digit 7, the first (least significant) digit of the 13-digit natural logarithm of the square root of 10. (The C constant corresponding to $t_{14}$ is 10; see FIGURE 7, reference numeral 386.)

Similarly, when the R counter contains 2, the $r_2$ signal is asserted on line 808, thus causing the two outputs of logical AND 804 to be asserted, and causing log generator outputs 1 and 8 to be asserted at lines 700. These two outputs represent the binary coded decimal digit 9, the second least significant digit of the 13-digit natural logarithm of the square root of 10.

As the R counter is counted up, additional logical AND's are enabled, and the remaining 11 digits of the 13 digit natural logarithm of the square root of ten are successively generated at log generator output lines 700. Additional sets of logical AND's are enabled by the assertion of signals $t_0$, $t_1$, etc., through $t_{10}$, thus permitting the log generator to produce the natural logarithms of the square roots of the remaining 11 C constants as the T counter is counted up. At each position of the T counter, the R counter must of course again be counted up to control the generation of the successive digits of the associated logarithm. The number of logical AND's required to complete the ½ log C fixed memory is somewhat less than the product of the twelve constants times the thirteen digits of each logarithm (12 x 13=156) because no logical AND is required in order to generate a 0 digit of the output logarithm.

Figure 9:
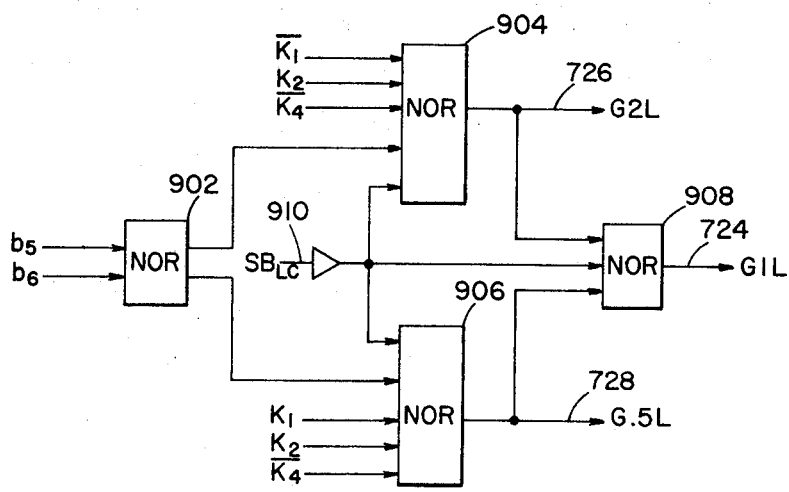
FIG. 9 shows the logic network used to generate the log generator control signals.

FIGURE 9 shows the logical network used to generate the G1L signal at line 724, the G2L signal at line 726, and the G.5L signal at line 728. This network comprises four logical NOR's, 902, 904, 906, and 908. The $SB_{LC}$ signal 910 is a control signal which must be asserted in order for any of the three log generator enable signals (lines 724, 726, and 728) to be asserted. Once the $SB_{LC}$ signal is present, the choice of which of the three enable signals (G1L, G2L, and G.5L) is to be asserted depends upon the state of the B counter (FIGURE 3, reference numeral 395) and upon the contents of the three least significant bits of the K register (FIG. 3, reference numeral 306).

Figure 10:
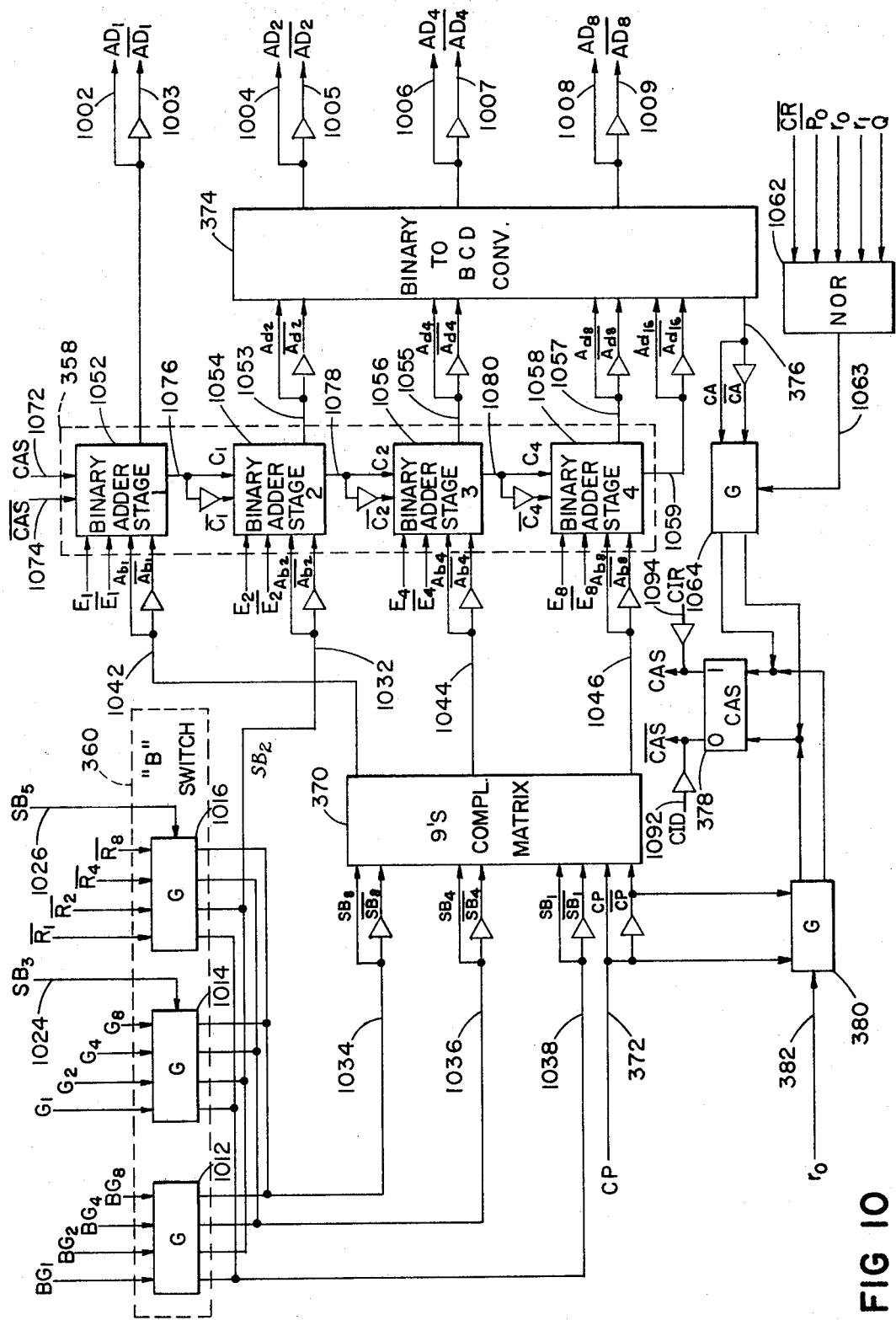
FIG. 10 is a block diagram of the calculator's Arithmetic Unit.

FIGURE 10 is a block diagram of the Arithmetic Unit 336. The basic function of the Arithmetic Unit is to select a binary coded decimal digit from one of three alternate sources and to add such binary digit to, or subtract such binary digit from the binary coded decimal digit stored in the E register 344. An addition is executed when the CP complement signal (372) is not asserted, a subtraction is executed when CP is asserted. The least significant digit of the resulting sum or difference appears in binary coded decimal form at four of the eight output lines (1002, 1004, 1006, and 1008) of the Arithmetic Unit (signals $AD_1$, $AD_2$, $AD_4$, and $AD_8$, respectively). Each of these four outputs is complemented to provide the 1's complement of the sum or difference digit at the remaining four output lines (1003, 1005, 1007, and 1009, respectively).

If the sum or difference digit is greater than nine, there is a carry signal CA generated on line 376. This carry is stored in the carry flip-flop CAS (378) in preparation for the processing of the next digit.

The B switch 360 determines the source of the binary coded decimal digit to be added to or subtracted from the contents of the E register. The B switch contains three gates 1012, 1014, and 1016. When gate 1014 is enabled by the assertion of the $SB_3$ signal at input 1024 the 1-side outputs of the four G register (340) flip-flops ($G_1$, $G_2$, $G_4$, and $G_8$) are used as one of the two operands. When gate 1016 is enabled by the assertion of the $SB_5$ signal at input 1026, the 0-side outputs of the R register flip-flops are used as one of the two operands. When neither $SB_3$ nor $SB_5$ is asserted, the four outputs of the log generator 384 ($BG_1$, $BG_2$, $BG_4$, and $BG_8$, derived from lines 700 in FIG. 7) are used as one of the two operands.

The binary adder 358 contains four stages numbered 1 through 4 from least to most significant (1052, 1054, 1056, and 1058, respectively). Each stage receives three input bits (each bit being used in both complemented and uncomplemented form). One input is derived from the associated bit of the E register, one input is derived from a carry, and one input is derived from the B switch outputs routed through 9's complement matrix 370. Adder stage 1 receives its carry input from the CAS carry flip-flop 378 over lines 1072 and 1074. Adder stage 2 receives its carry input from adder stage 1 over line 1076. Adder stage 3 receives its carry input from adder stage 2 over line 1078. Adder stage 4 receives its carry input from adder stage 3 over line 1080. The 9's complement matrix 370 is only operative when the complement signal CP is asserted on line 372. When CP is not asserted, the 9's complement matrix passes the four outputs of the B switch ($SB_1$, $SB_2$, $SB_4$, and $SB_8$, on lines 1038, 1032, 1036, and 1034, respectively) unchanged into the binary adder 358 ($Ab_1$, $Ab_2$, $Ab_4$, and $Ab_8$, on lines 1042, 1032, 1044, and 1046, respectively). When CP is asserted, the 9's complement matrix generates the 9's complement of the output digit received from the B switch. Where the output digit is some integer $n$ (from 0 through 9), the 9's complement of the output digit has the value $9-n$. The second least significant digit (having weight 2, applied over line 1032) is not passed through the 9's complement matrix because the 9's complement of any digit from 0 through 9 has the same value in the second least significant bit as the original uncomplemented digit.

The binary adder 358 generates five output bits (on lines 1002, 1053, 1055, 1057, and 1059, respectively). The four most significant of these output bits are applied in both complemented and uncomplemented form to the binary to binary coded decimal converter 374. The least significant digit of the adder output then appears in uncomplemented form as output signals $AD_1$, $AD_2$, $AD_4$, and $AD_8$ (on lines 1002, 1004, 1006, and 1008, respectively), and in complemented form as output signals $\overline{AD_1}$, $\overline{AD_2}$, $\overline{AD_4}$, and $\overline{AD_8}$ (on lines 1003, 1005, 1007, and 1009, respectively). If the adder output is greater than 9, there is a second (most significant) digit which is a 1, and which causes the assertion of a CA carry signal on line 376. The CA signal and its complement $\overline{CA}$ are applied to gate 1064. If that gate is enabled by the assertion of the output of logical NOR 1062 on line 1063, then the assertion of the CA carry signal on line 376 causes the CAS carry flip-flop 378 to be set. This permits the storage of the carry for use as in input to the next digit of the sum or difference operation (said input being applied to the first stage of adder 358 over lines 1072 and 1074).

The carry flip-flop CAS is also set by the CP signal (line 372) prior to the processing the first digit of each subtraction operation. The CP signal is passed through gate 380 only during the first digit of the subtraction (when $r_0$ is asserted on line 382). The purpose of this operation is to convert the 9's complement of the subtrahend to the 10's complement. (The 9's complement of a decimal number is converted to the 10's complement by adding 1.)

The CID signal on line 1092 provides a means of automatically setting the CAS flip-flop 378 during various conditions where such a set is required and the CIR signal on line 1094 provides a similar means of resetting the CAS flip-flop.

The over-all function of the Arithmetic Unit logic shown in FIG. 10 is to add the serially-applied multi-digit output operand from the B switch 360 to the serially-applied multi-digit output operand from the E register 344 when CP is not asserted, and to subtract the output operand from the B switch from the output operand from the E register when CP is asserted. The result appears as a sequence of binary coded decimal digits on the four AD lines 1002, 1004, 1006, and 1008. The least significant digit of the result appears first at these outputs, the most significant digit appears last. Complement outputs are produced on the four $\overline{AD}$ lines 1003, 1005, 1007, and 1009.

Figure 11:
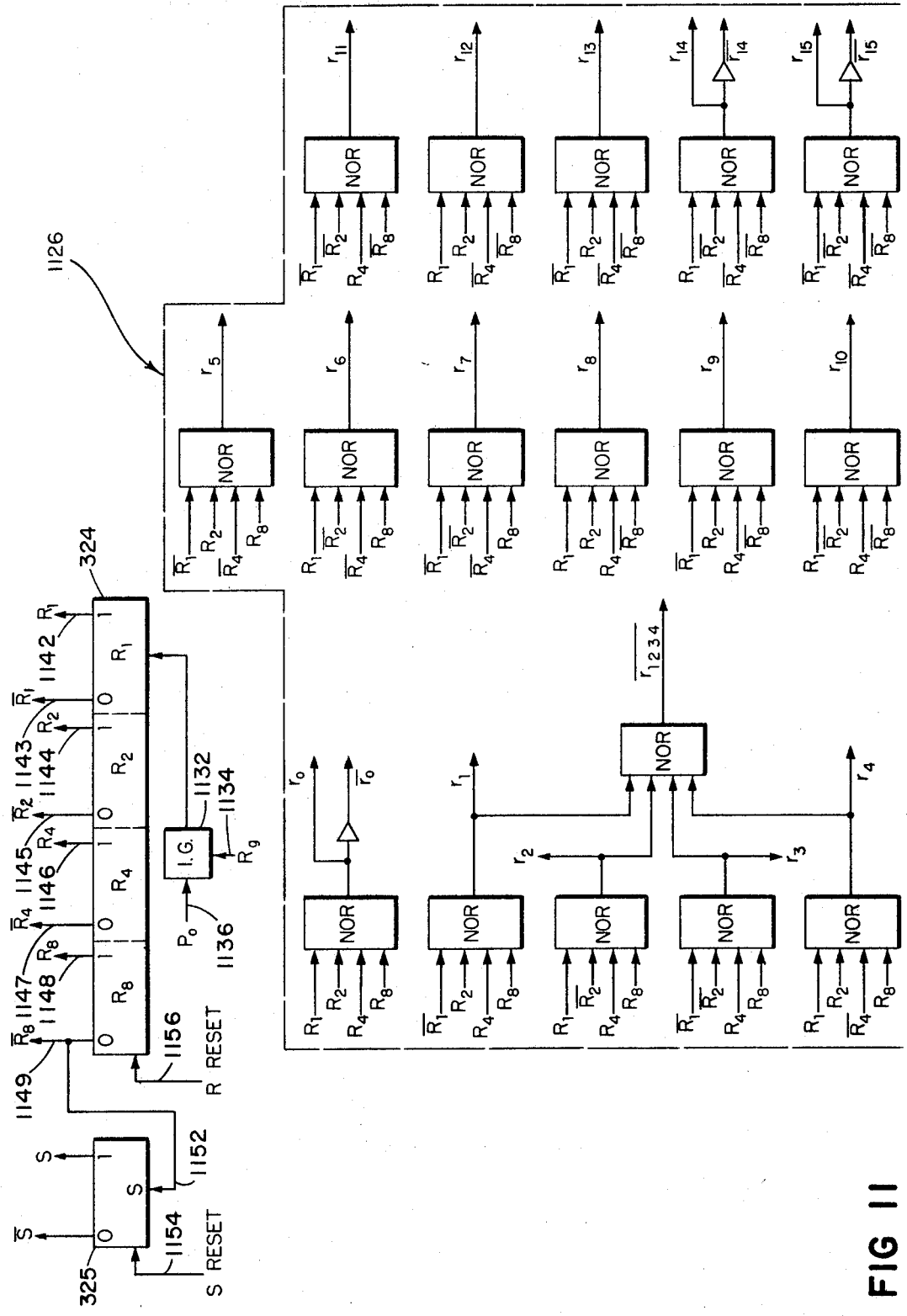
FIG. 11 is a block diagram of the sub-cycle control counter R, the S flip-flop, and the associated decoders employed in the calculator.

FIGURE 11 is a block diagram of the R counter 324, the S flip-flop 325, and the R counter decoders 1126. These elements provide one of the basic means of sub-cycle program control used in the calculator. The R counter itself is a conventional four-bit binary flip-flop counter, $R_1$ being the least significant bit thereof, and $R_8$ being the most significant bit thereof. When bit $R_1$ is set to 1, the $R_1$ output signal is asserted on line 1142. Similarly when bits $R_2$, $R_4$, or $R_8$ contain 1, the $R_2$, $R_4$, and $R_8$ output signals are asserted on lines 1144, 1146, and 1148, respectively. When bit $R_1$ contains 0, the $\overline{R_1}$ complement signal is asserted on line 1143 and when bits $R_2$, $R_4$, and $R_8$ contain 0, the $\overline{R_2}$, $\overline{R_4}$, and $\overline{R_8}$ signals are asserted on lines 1145, 1147, and 1149, respectively.

When inhibit gate 1132 is not disabled by the assertion of inhibit signal $Rg$ on line 1134, each $P_0$ clock pulse increments the R counter by 1. (A $P_0$ clock pulse is generated at the beginning of each memory cycle.) The control of the $Rg$ signal is described in detail in conjunction with FIG. 17 where it is generated. For the present let it be said that there are two modes of operation provided. In one of these modes of operation the $Rg$ signal is never asserted, and consequently the R counter is stepped at every $P_0$ pulse (i.e. at every memory cycle). In the second mode of operation the $Rg$ signal is alternately asserted and negated and consequently the R counter is stepped at every second $P_0$ pulse. This arrangement offers increased flexibility of control in that it becomes possible, when required, to accomplish two separate sub-operations during each state of the R counter.

Each time bit $R_8$ changes state from 1 to 0, a complement signal is applied to the S flip-flop 325 over line 1152. This complement signal causes the S flip-flop to change state and thus permits the control logic to distinguish alternate cycles of the R counter by the state of the S flip-flop. The S flip-flop is reset to 0 by the application of an S reset signal to line 1154. All four of the R counter bits are reset to 0 by the application of an R reset signal to line 1156.

The R decoders 1126 decode the states of the R counter bits by means of a plurality of logical NOR's and inverters. The output signal from a logical NOR is asserted if and only if none of the input signals to the logical NOR are asserted. The output signal from an inverter is asserted if any only if the input signal is not asserted. The resulting "$r$" signals are used throughout the calculator logic. When the R counter contains zero, $r_0$ is asserted; when it contains some number other than zero, $\bar{r}_0$ is asserted; when it contains 1, $r_1$ is asserted, and so on.

Figure 12:
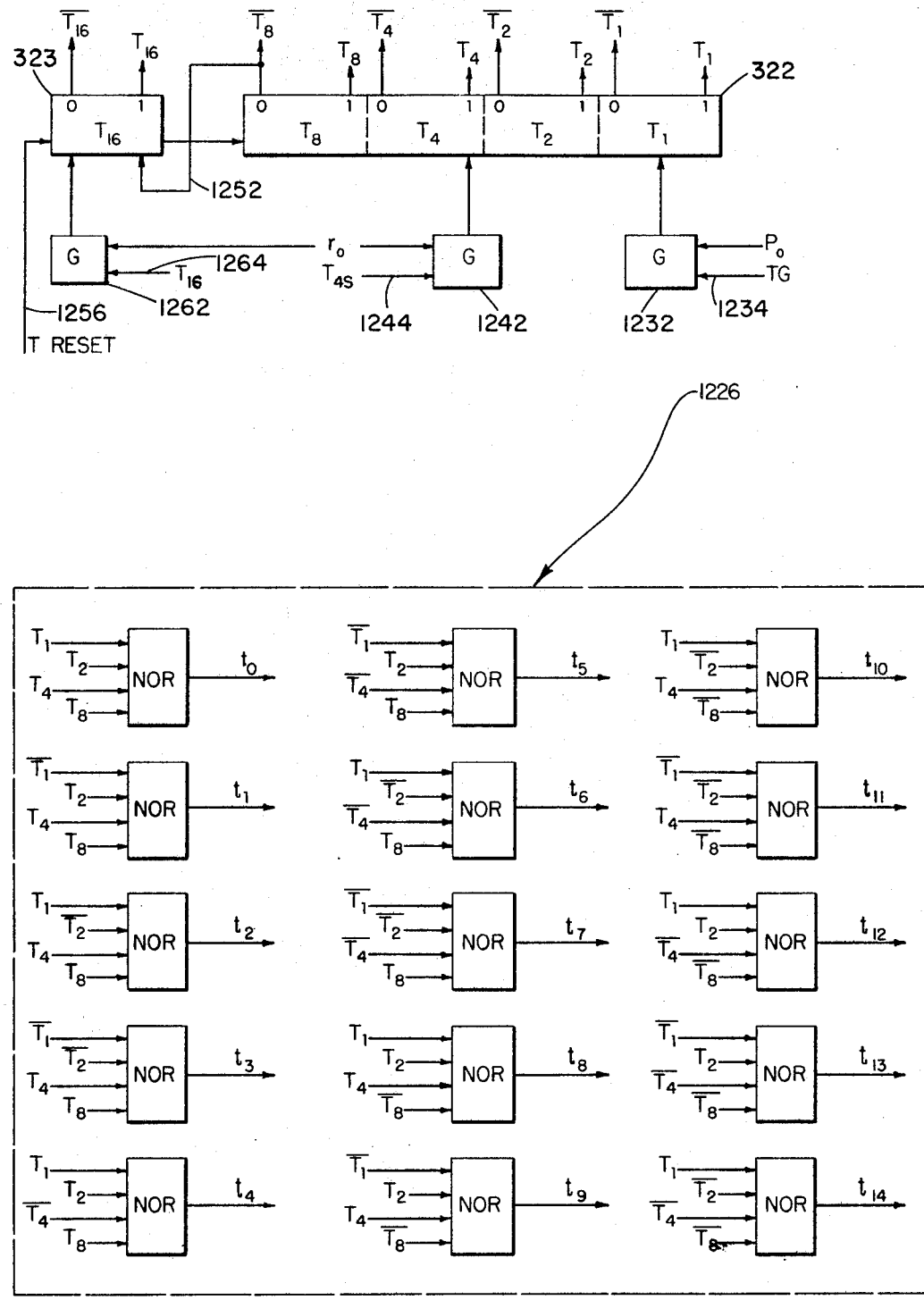
FIG. 12 is a block diagram of the sub-cycle control counter T, the $T_{16}$ flip-flop, and the associated decoders employed in the calculator.

FIGURE 12 is a block diagram of the T counter 322, the $T_{16}$ flip-flop 323, and the T counter decoders 1226. These elements provide the second basic means of sub-cycle control used in the calculator. The T counter itself is a conventional four-bit binary flip-flop counter, $T_1$ being the least significant bit thereof and $T_8$ being the most significant bit thereof.

When gate 1232 is enabled by the assertion of signal TG on line 1234, each $P_0$ clock pulse increments the T counter by 1. When gate 1242 is enabled by the assertion of the $T_{4S}$ signal on line 1244, the $r_0$ signal sets bit $T_4$ of the T counter to 1.

Every time bit $T_8$ changes state from 1 to 0, a set signal is applied to $T_{16}$ flip-flop 323 over line 1252. This set signal causes the $T_{16}$ flip-flop to be set to 1. When the $T_{16}$ flip-flop is in the 1 state, the $T_{16}$ signal enables gate 1262 through line 1264, thereby permitting the $r_0$ signal to reset $T_{16}$ to 0. Both the $T_{16}$ flip-flop 323 and the four T counter bits ($T_1$, $T_2$, $T_4$, and $T_8$) are reset to 0 by the application of a T reset signal to line 1256.

The T decoders 1226 decode the states of the T counter bits by means of a plurality of logical NOR's. The resulting "$t$" signals are used throughout the calculator logic. When the T counter contains zero, $t_0$ is asserted; when it contains 1, $t_1$ is asserted, and so on.

Figure 13:
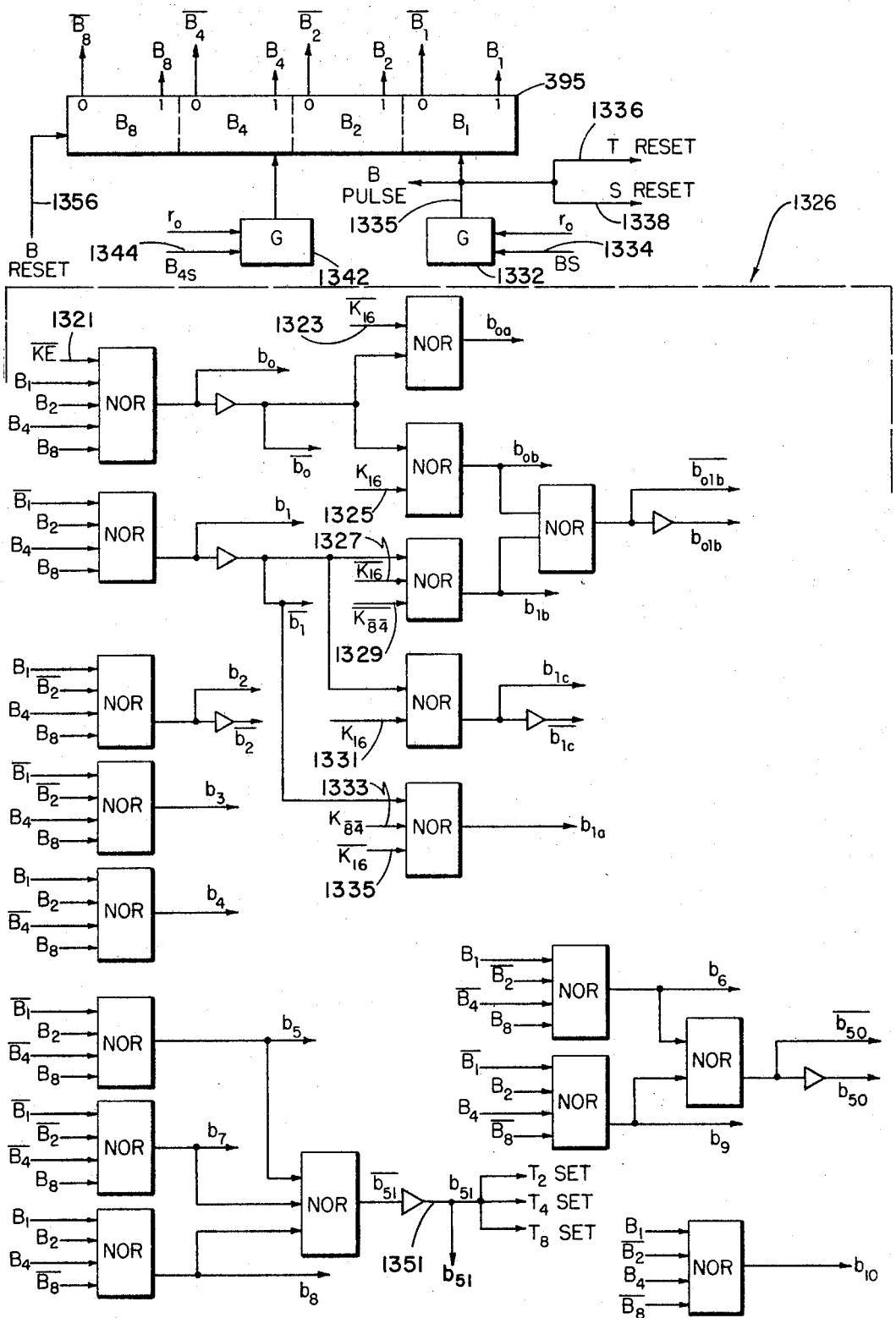
FIG. 13 is a block diagram of the cycle control counter B, and the associated decoders employed in the calculator.

FIGURE 13 is a block diagram of the B counter 395, and the B counter decoders 1326. These elements provide the basic means of major cycle program control used throughout the calculator logic. The B counter itself is a conventional four-bit binary flip-flop counter, $B_1$ being the least significant bit thereof and $B_8$ being the most significant bit thereof.

When gate 1332 is enabled by the assertion of signal BS on line 1334, each $r_0$ signal produces a B pulse on line 1335. The B pulse increments the B counter by 1 and also generates a T reset signal on line 1336 and an S reset signal on line 1338. The T reset signal resets all four bits of the T counter 322 and also resets the $T_{16}$ flip-flop 323. The S reset signal resets the S flip-flop 325. When gate 1342 is enabled by the assertion of the $B_{4S}$ signal on line 1344, the $r_0$ signal sets bit $B_4$ of the B counter to 1. All four of the B counter bits are reset to 0 by the application of a B reset signal to line 1356. The B decoders 1326 decode the states of the B counter and logically combine the B counter states with certain other control signal inputs by means of a plurality of logical NOR's and inverters. The $\overline{KE}$ input signal is asserted on line 1321 when the KE flip-flop 1526 (one of the elements of the start and stop controls 390) is in the zero state. The signals $\overline{K_{16}}$ (at input lines 1323, 1327, and 1335), $K_{16}$ (input lines 1325 and 1331), $\overline{K_{34}}$ (input line 1329), and $K_{34}$ (input line 1333)

are derived from the K register decoders 1626 (which in turn decode the states of the K register 306). The $b_{51}$ output signal (at line 1351) automatically sets bits $T_2$, $T_4$, and $T_8$ of T counter 322 to the 1 state.

Figure 17:
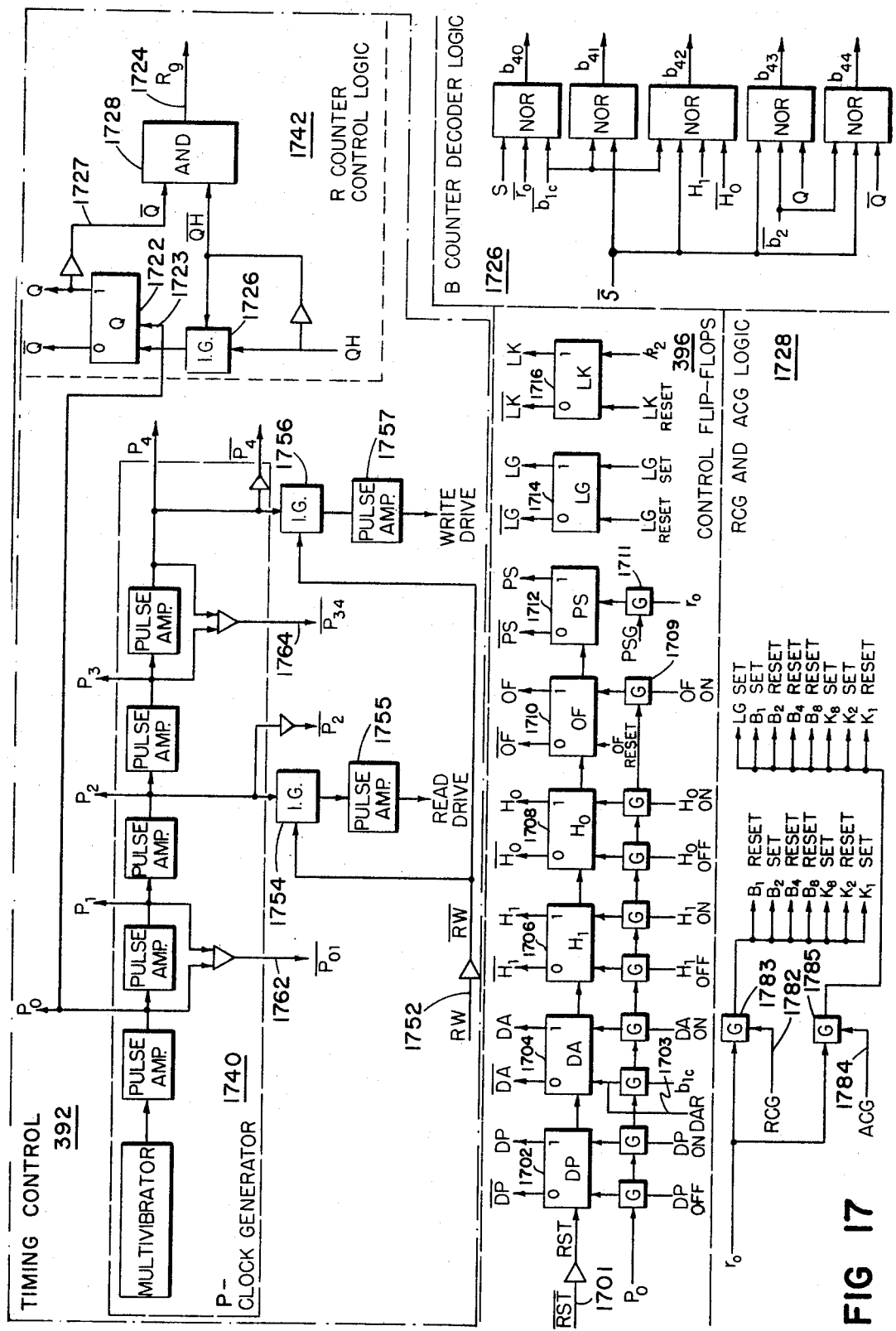
FIG. 17 is a block diagram of several portions of the Control Unit including the timing control, miscellaneous system state control flip-flops, a portion of the B counter decoder logic and the RCG and ACG logic employed in the calculator.
Figure 19:
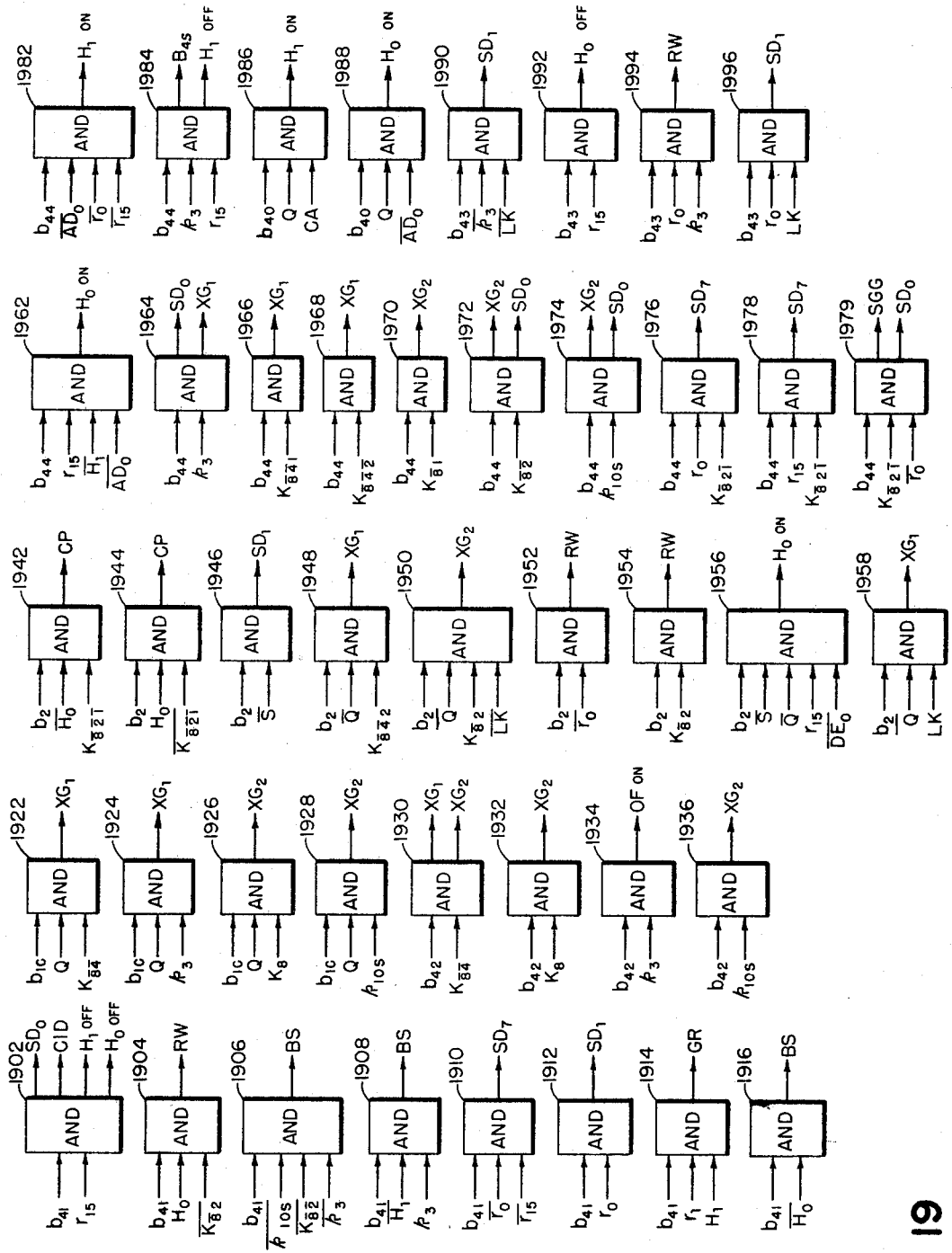
Figure 20:
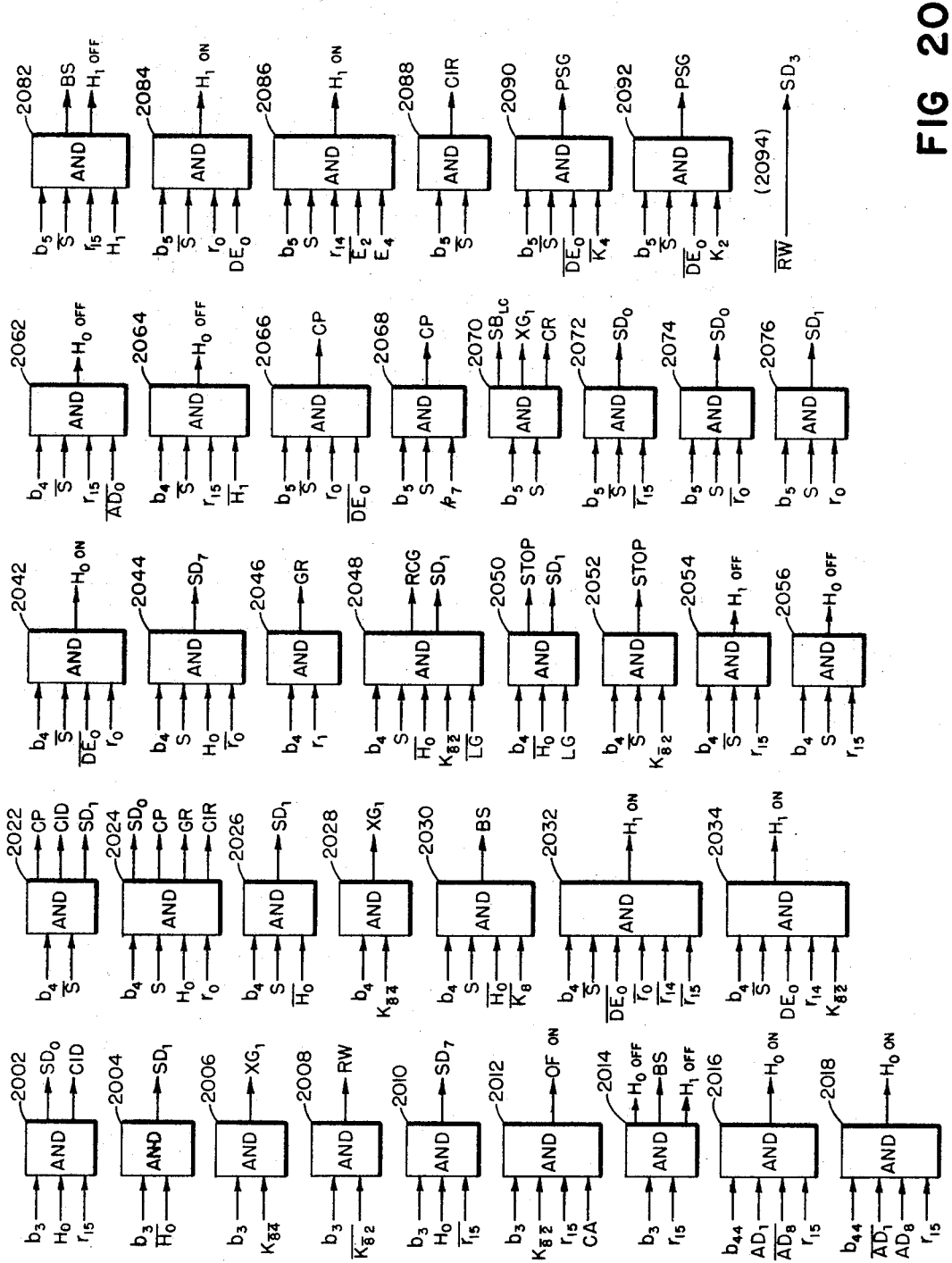
Figure 21:
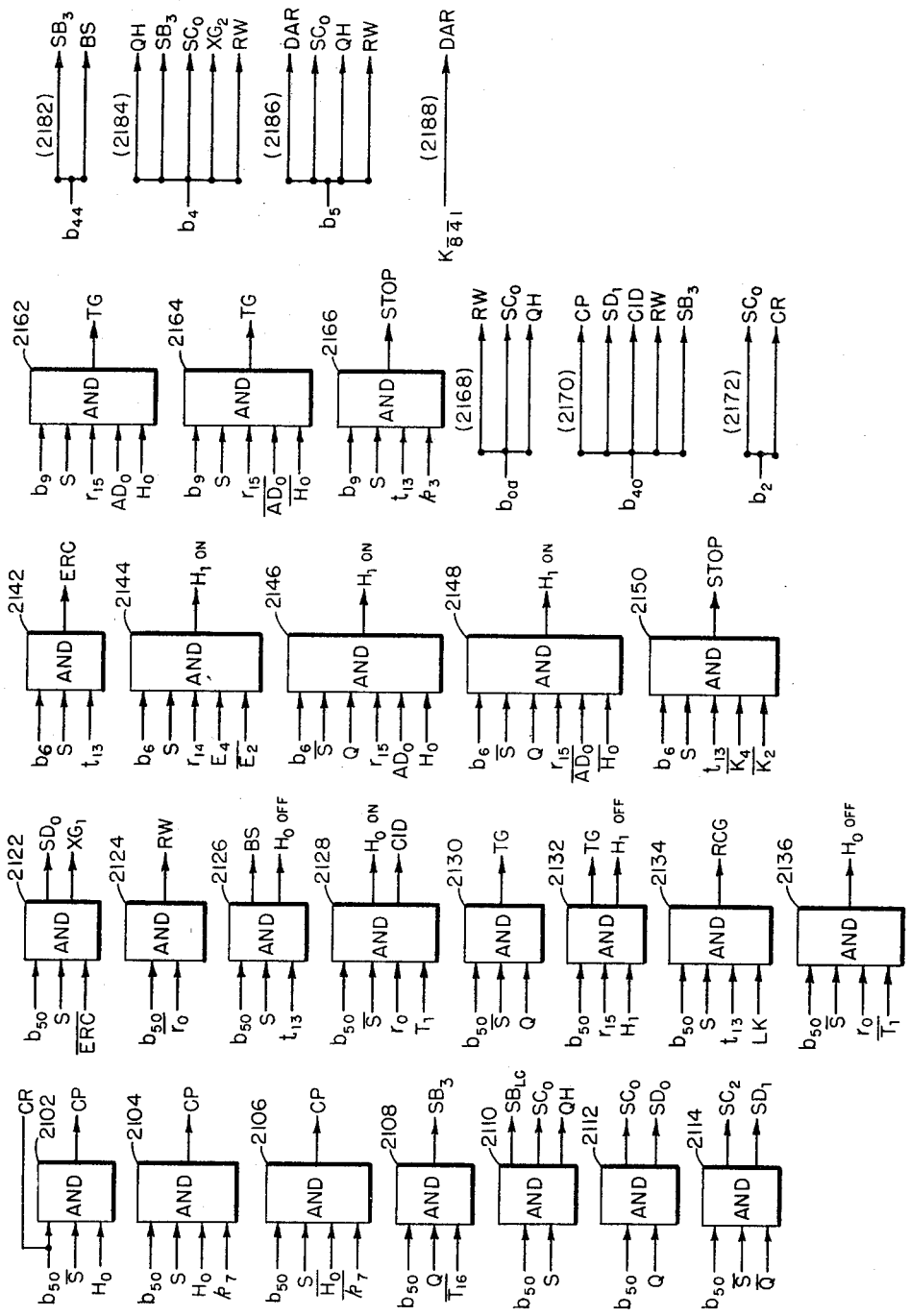
Figure 22:
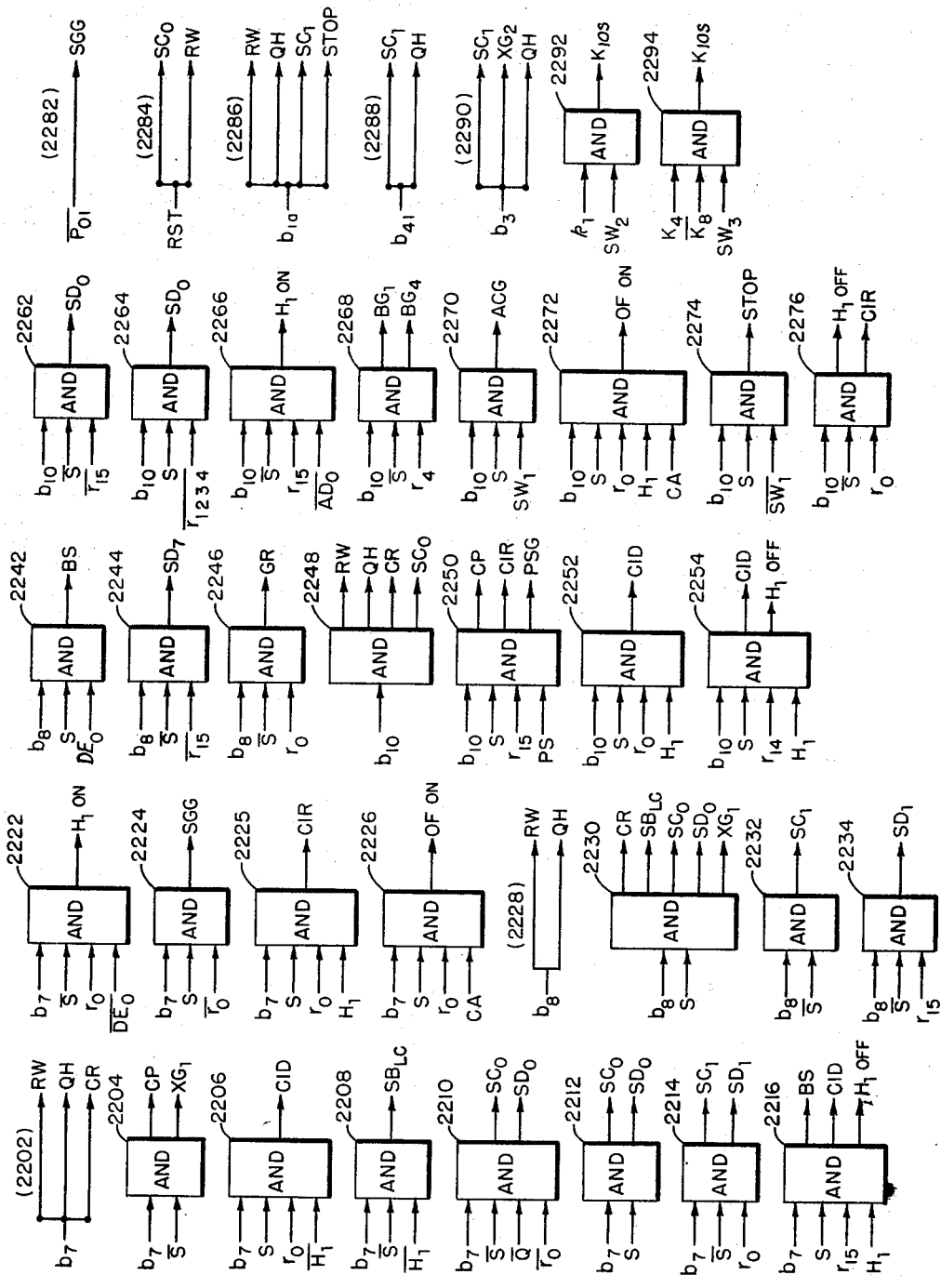

Other elements of the B counter decoders are shown in FIG. 17 at 1726. These other decoder elements employ additional logical NOR's to combine the "$b$" output signals from B decoders 1326 with additional control signals, namely, the S and $\overline{S}$ signals from the S flip-flop 325, the Q and $\overline{Q}$ signals from the Q flip-flop 1722 (the Q flip-flop is an element of the timing control 392), the $\bar{r}_0$ signal from the R decoders 1126, and the $H_1$ and $\bar{H}_0$ signals from condition memory flip-flops $H_1$ and $H_0$ (1706 and 1708, respectively, elements of the control flip-flop group 396). The B counter decoders 1726 generate additional "b" output signals. The "b" output signals from both the B decoders 1326 and the B decoders 1726 are used throughout the calculator logic to control the choice of the major operating cycles of the system and to produce a number of subsidiary control signals.

Figure 14:
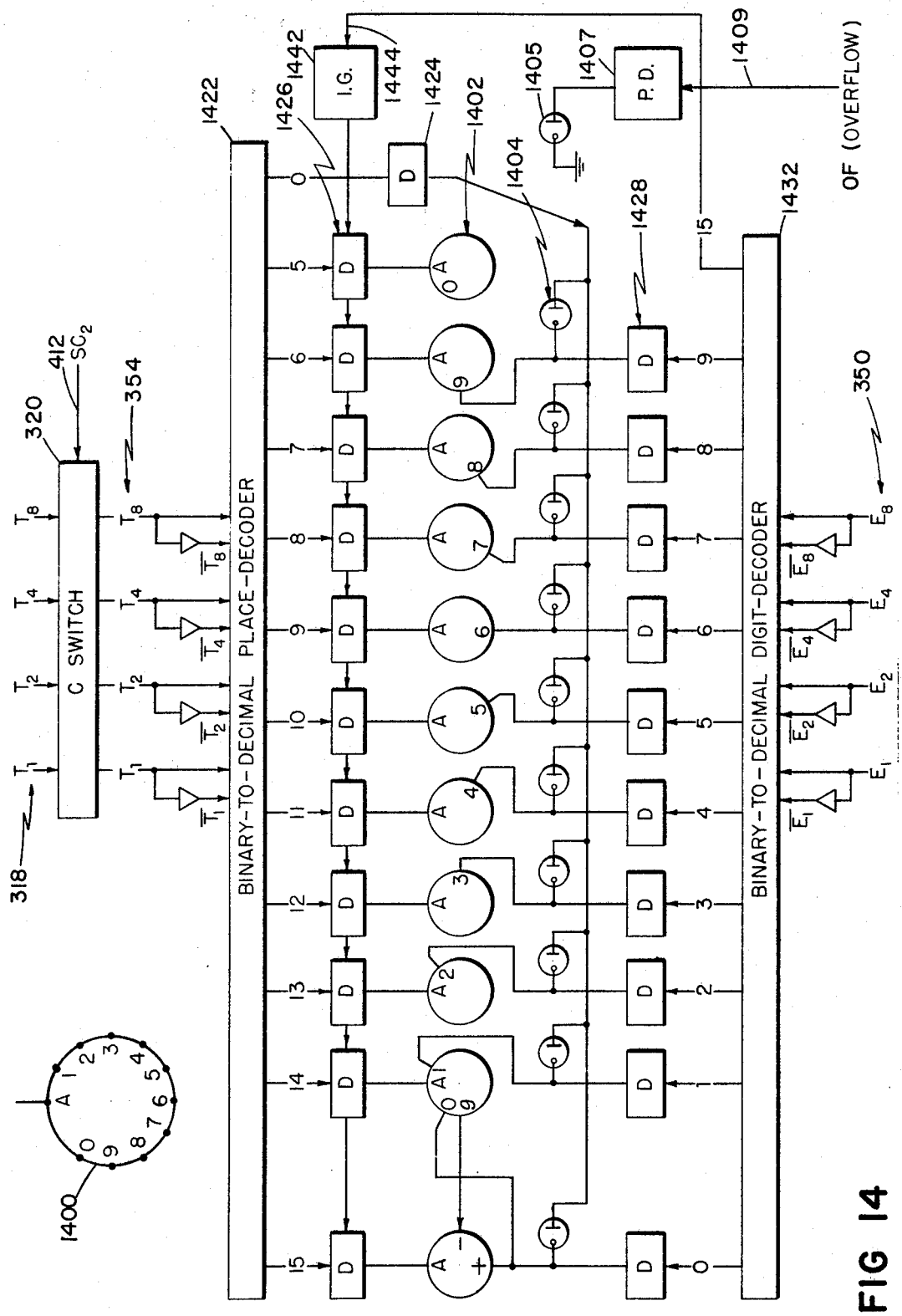
FIG. 14 is a block diagram of the Display Unit.

FIGURE 14 is a block diagram of Display Unit 352. The Display Unit includes eleven gas-filled cold cathode indicator tubes 1402. Ten of these eleven tubes are digit-indicators; each of these contains ten cathodes which represent decimal digits 0 through 9. The eleventh tube is the sign-indicator; this tube contains two cathodes representing the plus and minus signs. Reference numeral 1400 designates a schematic representation of one of the ten digit-indicator tubes; terminal A is the anode; numbered terminals 0 through 9 are the cathodes. (All ten digit-indicator tubes have ten cathodes each as shown at 1400, but for increased clarity at 1402 nine of the ten cathodes are omitted for all but the most significant of the digit-indicator tubes; in that tube seven cathodes are omitted.)

To the left of each of the ten digit-indicator tubes is an associated decimal point indicator comprising a neon tube 1404. There is an additional neon tube indicator 1405 connected to pulsating driver 1407. When signal OF (overflow) is asserted on line 1409, pulsating driver 1407 is enabled, causing overflow indicator 1405 to blink rapidly on and off. This indicates to the operator of the calculator that the true decimal place position differs by some multiple of ten from the indication shown by the illuminated decimal point indicator.

The corresponding cathodes of each of the eleven cold cathode indicator tubes 1402 are jumpered together so that all of the "0" cathodes are energized together, all of the "1" cathodes are energized together, etc. This jumpering is omitted from FIG. 14 for the sake of clarity. The "0" cathodes of the ten digit-indicator tubes are jumpered to the "+" (plus sign) cathode of the sign-indicator tube because the calculator uses code 0 in the sign position (bit 15) to represent a positive number. Similarly, the "9" cathodes of the ten digit-indicator tubes are jumpered to the "−" (minus sign) cathode of the sign-indicator tube because the calculator uses code 9 in the sign position (bit 15) to represent a negative number.

It should be noted that the Display Unit only displays the contents of the Work Register 7, and that the contents of that register are always in true binary-coded decimal form. The remaining three core registers of the calculator (the $A_1$ Left Accumulator 4, the $A_0$ Right Accumulator 5, and the L Log Register 6) store positive numbers in true binary coded decimal form, but store negative numbers in 10's complement form. Such negative numbers are always converted to true binary-coded decimal form while being transferred to the Work Register for display.

Although at any given time the corresponding cathodes of all eleven indicator tubes are energized simultaneously (the choice of which specific set of cathodes is energized depending upon the particular digit-code that is to be displayed at the given time) only one anode is energized at a time. That anode corresponds to the digit-position currently being displayed, so that the only symbol that is actually displayed is that represented by the energized cathode of the indicator tube that also has an energized anode. The anodes are energized sequentially in a right to left scan pattern; first the decimal point indicator is energized, then the least significant digit of the ten-digit display is illuminated, then the next more significant digit, and so on throughout the ten digit-positions of the display; after the most significant digit (bit 14) is displayed the sign digit is displayed; during display mode operation this display sequence repeats itself continuously. Although only one digit position is displayed at a time the scan is so rapid that the full signed and decimal pointed ten-digit decimal number stored in the Work Register appears to be continuously displayed at display aperture 19 (FIG. 1).

The digit position (or decimal point or sign position) being displayed is determined by the contents of the T counter 322. The specific data displayed at a given digit position is determined by the contents of the corresponding digit of the Work Register 7. Each digit of the Work Register is sequentially transferred (also under the control of the digit address specified by the contents of the T counter) into the E register 344. The E register outputs are used to control the Display Unit cathode selection. The T counter contents are used to control the Display Unit anode selection.

The T counter outputs 318 are applied to the Display Unit on lines 354 (via C switch 320 when that switch is enabled by the $SC_2$ signal on line 412). These T counter outputs and their complements are applied to binary-to-decimal place-decoder 1422. One of the twelve outputs of the place decoder is then asserted, the choice corresponding to the binary contents of the T counter 322. The four E register outputs 350 and their complements are applied to binary-to-decimal digit-decoder 1432. One of the eleven outputs of the digit-decoder is then asserted, the choice corresponding to the binary contents of the E register 344.

The "0" output of place-decoder 1422 corresponds to the decimal point position. When this output is asserted, the anodes of all ten decimal point indicators are energized by anode driver 1424. The specific decimal point indicator that is illuminated is determined by the binary coded decimal digit in the 0 digit position of the W register 7 (the same digit then being stored in E register 344 and being applied to the Display Unit on lines 350). Only one of the eleven outputs of digit-decoder 1432 is asserted, the choice depending upon the binary contents of the E register. Each of the ten digit-decoder outputs 0 through 9 enables an associated cathode driver 1428 which in turn causes one of the ten decimal point indicators to be illuminated. If the code 0 digit-decoder output is asserted, then the decimal point indicator to the left of the most significant of the ten display digits is illuminated; if the code 1 output is asserted, the decimal point indicator to the left of the next most significant digit is illuminated, and so on. If the code 15 digit-decoder output is asserted, no decimal point indicator is illuminated.

The remaining eleven outputs of place decoder 1422 each enable an associated anode driver 1426 which in turn energizes one of the eleven cold cathode indicator tubes 1402. The place-decoder output 15 (asserted when T counter 322 contains 15) causes the anode of the sign-indicator tube to be energized. Place-decoder outputs 14 through 5 energize the anodes of the ten decimal digit indicators; output 14 corresponds to the most significant digit position, and output 5 corresponds to the least significant digit position.

When the E register 344 contains code 15, the code 15 output of digit-decoder 1432 is asserted on line 1444, thus causing inhibit gate 1442 to disable all of the anode drivers 1426, and so preventing any symbol from being displayed at the digit or sign position determined by the current contents of T counter 322. (The 15 code stored in any digit of the W register 7 indicates that no data is stored in the digit containing said code.)

The display logic described above causes the calculator to function in the following manner during display mode operation. As the T counter 322 is repetitively counted up, the Display Unit 352 successively presents in visible form at aperture 19 (FIG. 1) the decimal point of the number in the W register 7 ($T=0$), then the least significant decimal digit of W that is to be displayed (the digit in position 5 of the W register; $T=5$; during display mode the T counter is stepped directly from 0 to 5 without counting through the intermediate states; this is because the four least significant digits of W are not displayed) then the next more significant decimal digit of W ($T=6$) and so on through the most significant digit of W ($T=14$). Finally, the sign of the W register contents is displayed in the sign position at the extreme left of the display ($T=15$). These operations are repeated in a continuous cycle so long as the calculator is operating in display mode.

Figure 15:
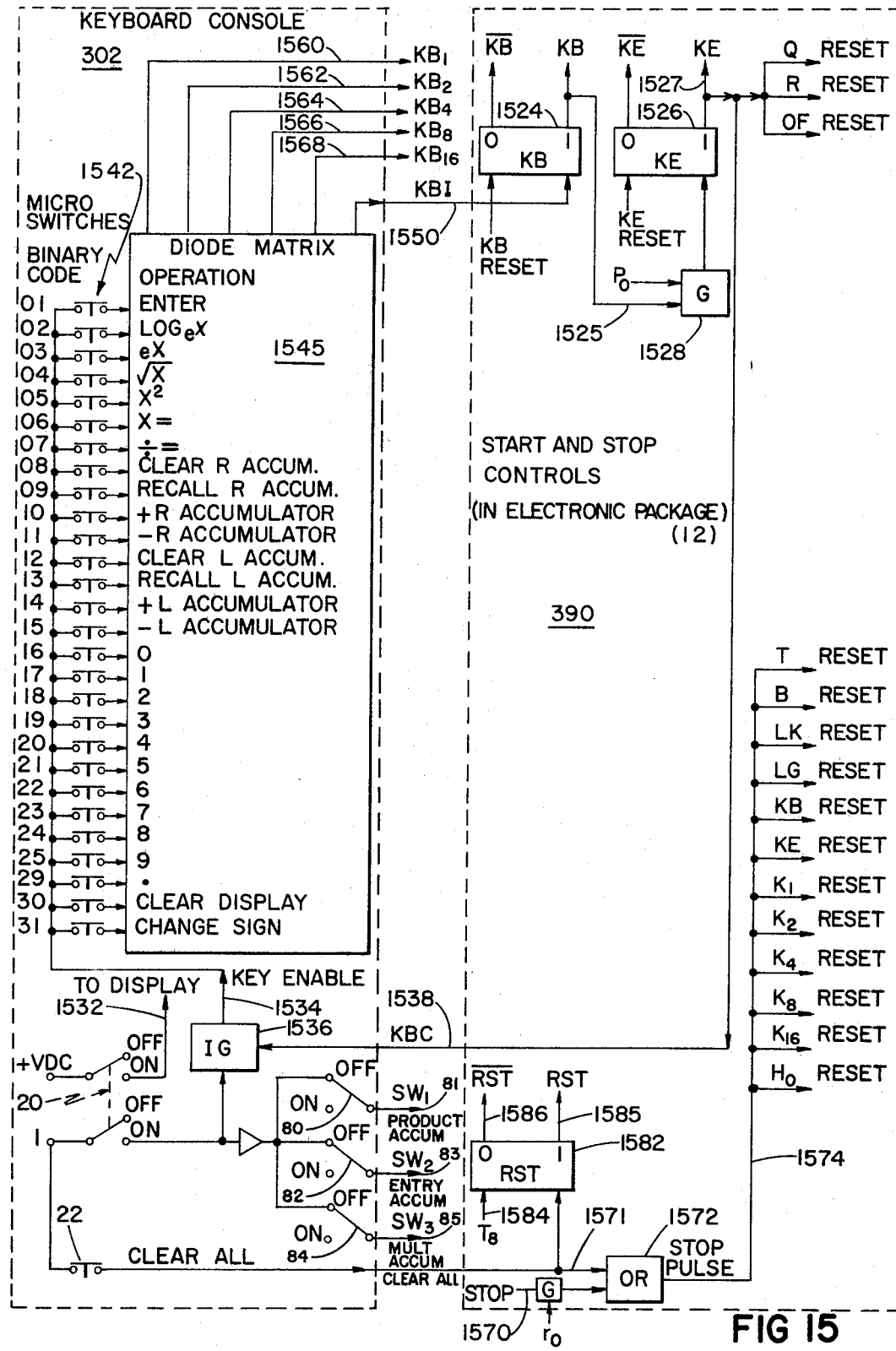
FIG. 15 is a block diagram of the Keyboard Console switching circuits and of the start and stop controls employed in the calculator.

FIGURE 15 is a block diagram of the Keyboard Console switching circuits 302 and the start and stop controls 390. When the keyboard ON switch 20 is turned on power is applied to the Display Unit 352 over line 1532 and a Key Enable signal is applied to the keyboard micro switches 1542 over line 1534. Inhibit gate 1536 prevents the Key Enable signal from reaching the micro switches whenever the KBC signal is asserted on line 1538. Operation of the keyboard ON switch negates the accumulation signals $SW_1$ (Product Accumulation), $SW_2$ (Entry Accumulation), and $SW_3$ (Multiplier Accumulation) unless the associated accumulation switches PROD ACCUM, ENTRY ACCUM, and MULT ACCUM (80, 82, and 84 respectively) are operated. When these switches are operated, the associated accumulation signals are applied to the calculator control logic over lines 81, 83, and 85 respectively.

All calculator commands are initiated by operating one of the keyboard-key micro switches 1542. Indexing of numerical data (and decimal points) is also controlled by these keyboard-keys. When any one of the micro switches 1542 is closed by pressing the corresponding keyboard-key, the KBI signal is asserted on line 1550, and some combination of the five KB signals ($KB_1$, $KB_2$, $KB_4$, $KB_8$, and $KB_{16}$) is asserted on lines 1560, 1562, 1564, 1566, and 1568, respectively. The specific combination of KB signals asserted corresponds to the binary code of the key that is operated, and causes said code to be stored in the 5-bit K register 306.

The KBI signal sets the KB flip-flop 1524 in the start and stop controls 390. The KB flip-flop 1524 and the KE flip-flop 1526 together make up a synchronizing network for synchronizing keyboard operations (which may occur at random times) to the internal clock cycle of the calculator. As soon as the KB flip-flop is set by KBI, a KB signal is applied to gate 1528 over line 1525. This signal enables gate 1528, thereby permitting the next $P_0$ clock pulse that occurs to set the KE flip-flop 1526. The resulting KE signal is applied to line 1527 causing the reset of the R counter 322, the reset of the Q flip-flop 1722 (in the timing control 392), and the reset of the OF flip-flop 1710 in the control flip-flop group 396).

Also, the KE signal is used to produce the KBC signal which is then applied to inhibit gate 1536 over line 1538. This removes the Key Enable signal from line 1534 and thus prevents the generation of any further keyboard command signals so long as KE remains set. Because of this start-circuit logic, any contact bounce which may occur in the micro switches 1542 is prevented from producing spurious commands.

At the conclusion of each command a stop signal is asserted at line 1570, thus permitting logical OR 1572 to apply a stop pulse to line 1574 at the $r_0$ signal. The stop pulse resets the K register 306, the T counter 322, and B counter 395, the LK flip-flop 1716, the LG flip-flop 1714, and the $H_0$ flip-flop 1708 (LK, LG, and $H_0$ are in control flip-flop group 396). The stop pulse also resets the KB flip-flop 1524, and the KE flip-flop 1526, thus removing KBC inhibit signal from inhibit gate 1536, and enabling the keyboard-key micro switches for the indexing of further commands or data.

Operation of the CLEAR ALL key 22 causes a clear all signal to be asserted at line 1571, thus permitting logical OR 1572 to apply a stop pulse to line 1574 with the same effect described above. The stop signal is asserted at line 1570 at the conclusion of each command; this provides an automatic stop pulse with the resulting system reset operations. The clear all signal produces the same stop pulse and the same system reset, but the generation of this signal is not automatic. It occurs only when the CLEAR ALL key 22 is manually operated at the keyboard. The CLEAR ALL key should be operated when the calculator is first turned on to ensure that the system logic is in the proper initial state. Thereafter each command provides an automatic stop signal at its completion to prepare the calculator for the next command which may be indexed.

The clear all signal has one further function not shared by the stop signal. Clear all sets the RST flip-flop 1582 to the 1 state. The RST flip-flop is reset when the T counter 322 reaches the count of 8. The RST and $\overline{RST}$ outputs (lines 1585 and 1586 respectively) perform various functions throughout the calculator logic.

Figure 16:
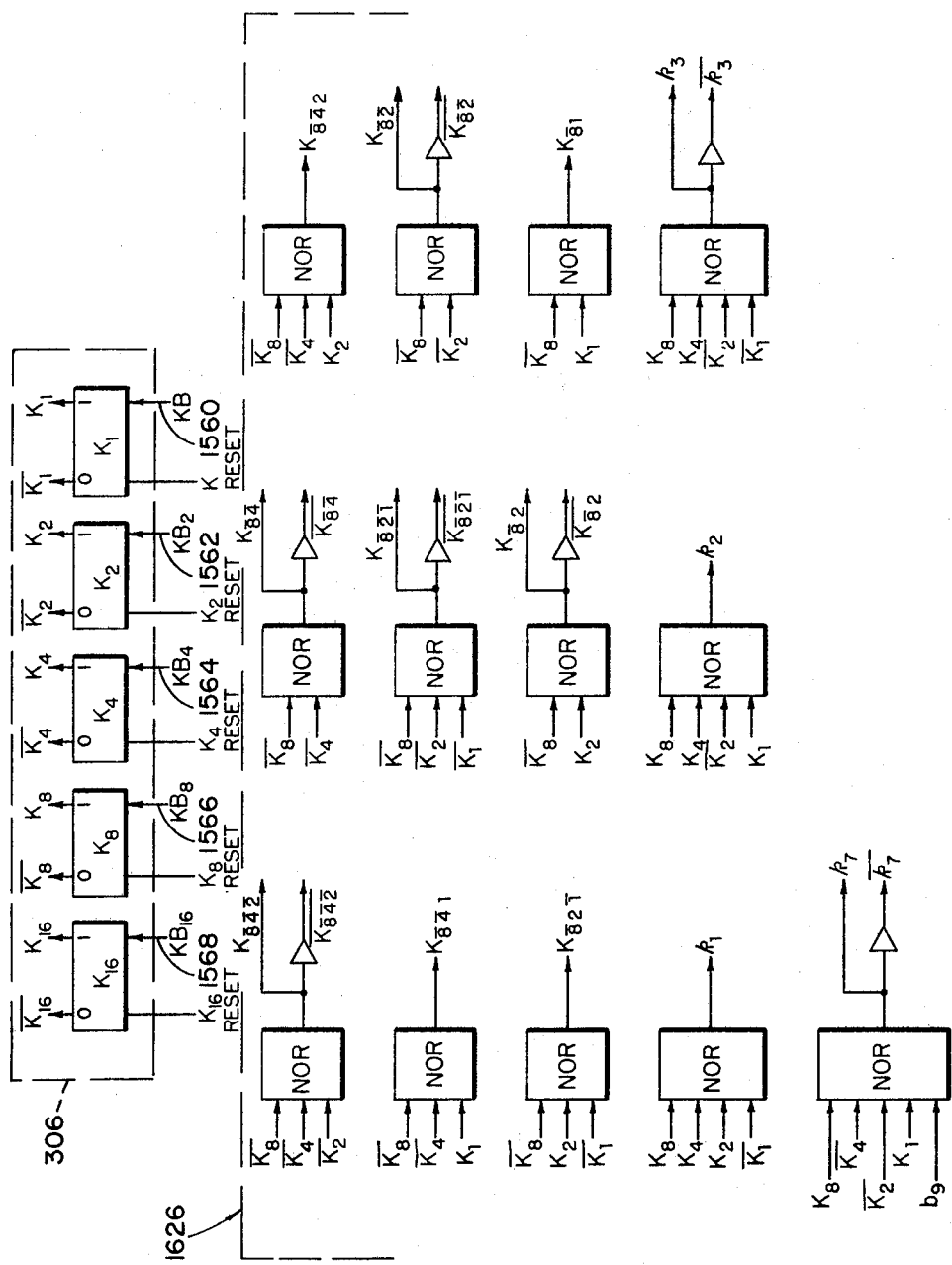
FIG. 16 is a block diagram of the input buffer K register and of the associated decoders employed in the calculator.

FIGURE 16 is a block diagram of the K register 306 and the K register decoders 1626. The K register provides buffer storage for input data and commands from the Keyboard Console switching circuits 302. The K register decoders provide the means of converting such input commands to suitable control signals.

The K register itself comprises a set of five conventional flip-flops $K_1$ being the least significant bit thereof, and $K_{16}$ being the most significant bit thereof. Each of the five K register flip-flops is set by the corresponding KB signal from the keyboard (applied over lines 1560, 1562, 1564, 1566, and 1568 respectively). Each K register flip-flop is reset by an associated reset signal produced by the stop pulse on line 1574.

The four least significant bits of the K register ($K_1$, $K_2$, $K_4$, and $K_8$) receive the binary codes corresponding to the indexing of the decimal digits 0 through 9. (See FIG. 15, reference numeral 1542.) The corresponding 1-side outputs of these four flip-flops are applied to D switch 330 via lines 331. They thus provide one of the five alternate sources of data that may be written into the addressed digit of the addressed Memory Unit register $A_1$, $A_0$, L, or W (4, 5, 6 and 7 respectively).

The K register decoders decode the states of the K register bits by means of a plurality of logical NORs and inverters. The resulting "K" and "k" signals are used throughout the calculator logic.

FIGURE 17 is a block diagram of several portions of the Control Unit 304. Shown therein is the timing control 392, miscellaneous system-state control flip-flops 396, a portion of the B counter decoder logic 1726, and the RCG and ACG logic 1728.

The timing control 392 comprises the P clock generator 1740 and the R counter control logic 1742. The P clock generator contains a multivibrator which drives five sequentially connected pulse amplifiers. At each cycle of the multivibrator the pulse amplifiers produce a sequenced train of clock pulses designated in order of occurrence $P_0$, $P_1$, $P_2$, $P_3$, and $P_4$. These pulses provide the basic time reference for the calculator memory cycle and are used throughout the calculator logic to initiate and control various time-sequenced operations. For example: the R counter 324 and the T counter 322 are both stepped at $P_0$ time; the register memory output buffer 344 is cleared to receive new data at $P_1$ time; the read-out of data from core into the E register occurs at $P_2$ time; the digit-inhibit signals are first applied to the Memory Unit at $P_3$ time; the actual writing of data into core occurs at $P_4$ time.

When the RW signal is asserted at line 1752, inhibit gate 1754 ceases to be disabled. This permits the $\overline{P_2}$ pulse to drive pulse amplifier 1755 and thereby to produce a read drive pulse at $P_2$ time (applied to the Memory Unit on line 418). Similarly, the RW signal permits inhibit gate 1756 to pass the $\overline{P_4}$ pulse through to pulse amplifier 1757, thereby producing a write drive pulse at $P_4$ time (applied to the Memory Unit on line 420).

The clock generator also produces several composite timing functions. The $\overline{P_{01}}$ signal is asserted on line 1762 at all times except during $P_0$ time and during $P_1$ time.

Similarly the $\overline{P_{34}}$ signal is asserted on line 1764 at all times except during $P_3$ time and $P_4$ time.

The R counter control logic 1742 exists solely to produce the $Rg$ signal at line 1724. When $Rg$ is asserted, the R counter 324 is not permitted to step. Two modes of R counter operation are available, the choice between these two modes is determined by the state of control signal QH. When QH is asserted, $\overline{QH}$ is not asserted, and inhibit gate 1726 permits the QH signal to reset the Q flip-flop and to hold Q in the 0 state. Signal $\overline{Q}$ is then asserted on line 1727, but because $\overline{QH}$ is not asserted, the $Rg$ output of logical AND 1728 is not asserted, and the R counter is permitted to step at each $P_0$ pulse.

When QH is not asserted, $\overline{QH}$ is asserted, and inhibit gate 1726 is disabled. The Q flip-flop can therefore be complemented by each $P_0$ pulse that is applied to line 1723. While Q is in the 0 state, $\overline{Q}$ is asserted on line 1727, and (because $\overline{QH}$ is also asserted) the $Rg$ output of logical AND 1728 is asserted. Consequently, the R counter is not permitted to step. While the Q flip-flop is in the 1 state, $\overline{Q}$ is not asserted, $Rg$ is not asserted, and the R counter is permitted to step. The result of this arrangement is that the R counter is stepped on every $P_0$ pulse when QH is asserted, and on every other $P_0$ pulse when QH is not asserted.

The system state control flip-flops 396 perform a great variety of control functions which can best be described in the context of the various modes of operation during which they are employed. These eight flip-flops are basically condition memories which permit the calculator to branch in its operating sequences in accordance with functions previously performed and in accordance with tests made.

The LK flip-flop 1716 is set by the assertion of the $k_2$ signal and reset by the LK reset signal. The LG flip-flop 1714 is set by LG set, and reset by LG reset. The PS flip-flop 1712 is complemented by the $r_0$ signal whenever gate 1711 is enabled by the PSG signal. The PS flip-flop is reset to 0 when the $\overline{RST}$ signal is asserted on line 1701. The OF flip-flop 1710 is reset by the OF reset signal and is also reset when $\overline{RST}$ is asserted on line 1701; it is set by the $P_0$ clock whenever gate 1709 is enabled by the OF "ON" signal. The four remaining control flip-flops DP, DA, $H_1$ and $H_0$ (1702, 1704, 1706, and 1708) have similar control conditions. Each of these four flip-flops is reset by the assertion of $\overline{RST}$ on line 1701, and each of them is set or reset by the corresponding "ON" and "OFF" signals at the $P_0$ clock. The DA flip-flop differs from the other three in that it may be reset by the DAR signal alone on line 1703 as well as by the $b_{1c}$ control signal at the $P_0$ clock.

The B counter decoder logic 1726 has been previously described in conjunction with the description of the B counter (FIG. 13).

The RCG and ACG logic 1728 provides means of using the RCG signal or the ACG signal to shunt the calculator logic from one major mode of operation to another. When the RCG signal is asserted on line 1782, gate 1783 is enabled. This permits the $r_0$ signal to set the B counter to two ($b_2$ mode of operation), to set K register flip-flops $K_8$ and $K_1$, and to reset K register flip-flop $K_2$. When the ACG signal is asserted on line 1784, gate 1785 is enabled. This permits the $r_0$ signal to set the B counter to one, to set $K_8$ and $K_2$, and to reset $K_1$.

FIGURES 18, 19, 20, 21, and 22 show a plurality of logical ANDs making up the bulk of the control logic 398. The output signal from a logical AND is asserted if and only if all of the input signals to the logical AND are asserted. Some of the logical ANDs shown have multiple outputs (see, for example FIG. 18, 1868). For such multiple output ANDs, all the outputs are asserted (if and only if all of the inputs to the AND are asserted) or else none of the outputs are asserted (if and only if at least one of the inputs to the AND is not asserted).

FIGURES 18 through 22 also show certain other inputs which become outputs without passing through any logic function (e.g. FIG. 18, reference numeral 1874—input "$b_{1b}$" is jumpered directly to output "STOP"). In such cases the output signal or signals (see FIG. 21, reference numeral 2186) are asserted if and only if the corresponding input signal is asserted.

Table 3 below summarizes some of the most frequently used control conditions that recur throughout the operating cycles of the calculator. Note particularly the "no signal" conditions of the B switch, the C switch, and the D switch. These no signal conditions are of vital importance in many of the system operating cycles.

The foregoing description has treated the operation of all of the physical components of the calculator (e.g. the Memory Unit 308, the Arithmetic Unit 336, the Display Unit 352, the Keyboard Console switching circuits 302, the Timing Control 392, the B switch 360, the C switch 320, the D switch 330, the Log Generator 384, the K Register 306, the R counter 324, the S flip-flop 325, the T counter 322, the $T_{16}$ flip-flop 323, the B counter 395, the start and stop controls 390, the miscellaneous control flip-flops 396, the E Register 344, the G register 340, and the decoders and control logic networks 398).

The interaction of these physical components to produce the various operating sequences of the calculator is illustrated in FIGURES 23 through 47. FIGURES 23 through 28 each show flow charts of one of the more simple calculator operations. The first four of these introductory flow charts are cross referenced to the physical components of the calculator in the following text. From FIG. 27 on, all cross-referencing is done by means of reference numerals on the flow charts themselves.

The more complex operations of the calculator all utilize the major system cycles or operating modes ("$b$ modes") in various permutations. FIGURES 29 through 38 are flow charts of the ten major $b$ modes of the calculator. FIGURES 39 through 47 are simple "macro" flow charts showing how the calculator combines the $b$ modes to produce each of the more complicated operations.

Figure 23:
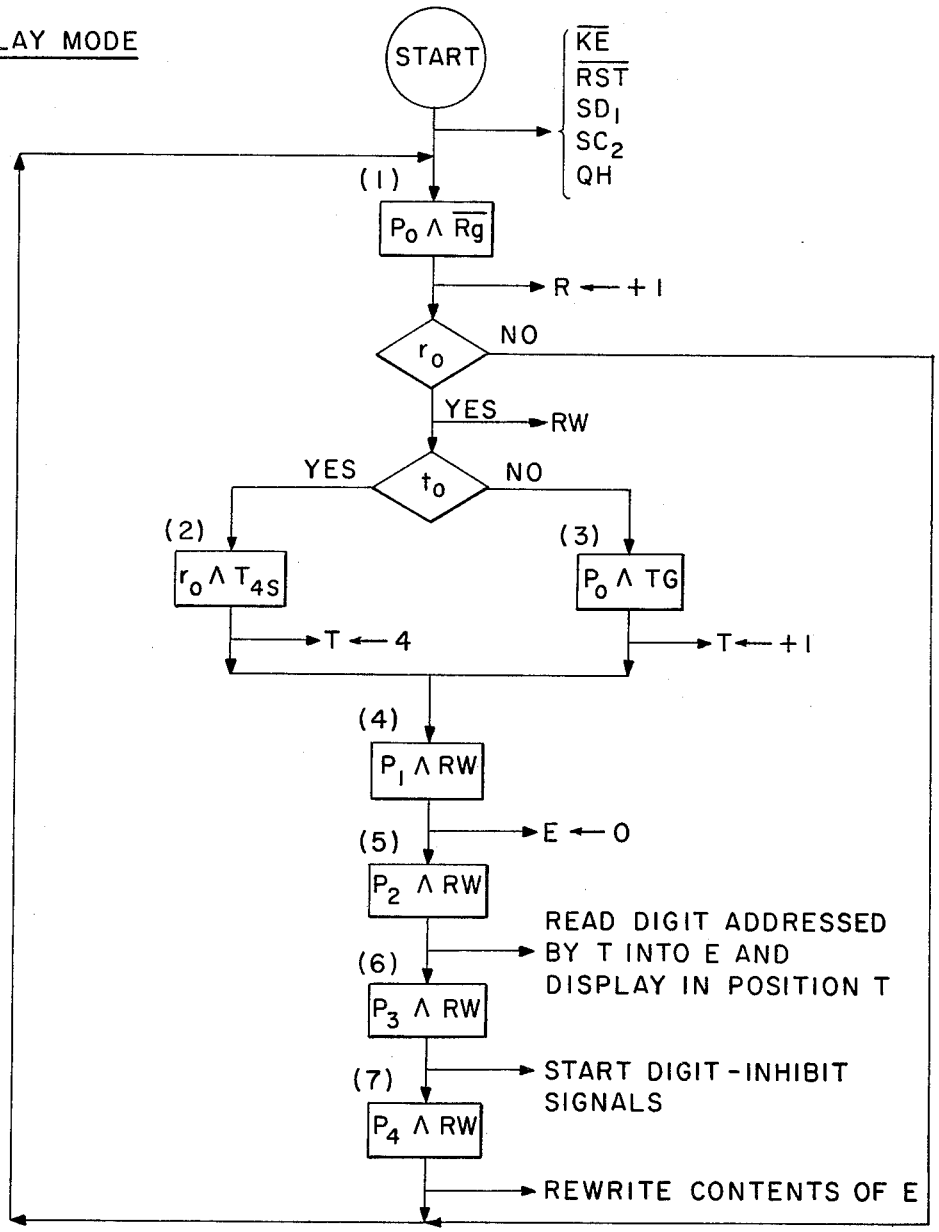

FIGURE 23 is a flow chart of the display mode in which the calculator is displaying the contents of the W register continuously. The initial conditions of the display operation are shown immediately beneath the "START" circle. The $\overline{KE}$ signal is asserted because no keyboard key has been operated, and consequently the KE flip-flop 1526 is in the zero state. The RST flip-flop 1582 is also in the zero state. The logical AND 1802 (shown in FIG. 18) combines $\overline{KE}$ and $\overline{RST}$ to produce the $SD_1$ signal, the $SC_2$ signal, and the QH signal. The $SD_1$ signal causes the D switch 330 to select the contents of the E register 344, thus rewriting whatever is read out of the W register into E. The $SC_2$ signal causes the C switch to select the contents of T counter 322 for the digit address. The QH signal holds the Q flip-flop 1722 in the zero state, and prevents the assertion of the $Rg$ signal on line 1724, thus ensuring that the R counter 324 is stepped at each $P_0$ clock pulse. This effect of $Rg$ is shown schematically at the first "operation box" of the flow chart (the inverted "V" is used as a logical symbol for the AND function). The operation box (1) and the following "consequence arrow" can be read as follows: "When a $P_0$ pulse occurs, and $\overline{Rg}$ is asserted then the R counter is incremented by one count ($R \leftarrow +1$)."

Because $\overline{KE}$ is asserted during display mode, the logical AND 1804 causes the RW signal to be applied to line 1752 whenever the $r_0$ signal occurs (i.e. during the 0 state of the R counter 324). This permits reading and writing during every sixteenth P clock cycle. This is shown schematically in the first diamond shaped "decision box" (the one containing "$r_0$"). If $r_0$ is asserted ("yes") then the RW consequence arrow follows. If $r_0$ is not asserted ("no") then no further operations occur and the sequence of operations loops back to the next $P_0$ pulse which again ncrements R by one count and returns to the $r_0$ decision box.

Assuming that $r_0$ is asserted, the T counter 322 is stepped. The amount by which the T counter is stepped depends upon whether or not the $t_0$ signal is asserted (i.e. upon whether or not the T counter contains 0). If the T counter does not contain 0 ("no"), then the same $P_0$ pulse that stepped the R counter to zero causes the T counter to be incremented by 1. This is shown at operation box (3). The TG signal is generated by AND 1808 while the R counter still contains 15. The same $P_0$ pulse that advances the R counter from 15 to 0 thus adds one to the T counter contents. If the T counter does contain 0, then AND 1806 causes the $T_{4S}$ signal to be asserted, and the $P_0$ pulse that steps the R counter to 0 also increments the T counter by 4 (this is to permit skipping the four least significant decimal digits of the W register 7, which are not displayed).

The remaining operation boxes of the display mode are concerned with the actual memory cycle. Operation box 4 shows that the E register 344 is cleared at $P_1$ time when RW is asserted. Operation box 5 shows that at $P_2$ time the digit addressed by the contents of the T counter is read out into the E register and displayed at display unit 352 in the digit position determined by the contents of the T counter. (When T contains 0, the decimal point is displayed in the position determined by the 0-position digit of the W register stored in the E register.) Operation box 6 shows the beginning of the digit-inhibit signals which prepare the Memory Unit for the rewriting of the contents of the E register. (Note that the E register contents are always rewritten during display mode because of the assertion of the $SD_1$ signal at the output of AND 1802.) Operation box 7 shows that the contents of E are actually rewritten in the same digit position of the W register from which they were read out into E at $P_4$ time.

The display mode then returns to the starting point above operation box 1 and repeats the entire cycle described until some keyboard control is operated to take the calculator out of display mode. The contents of the W register are thus continuously displayed in aperture 19 (FIG. 1) so long as the calculator remains in display mode.

TABLE III

| Physical Component | Control Signal | Consequence |
|---|---|---|
| B Switch (Operand) | $SP_3$ | G register. $G_1$, $G_2$ $G_4$, $G_8$ used as operand. |
| | $SB_5$ | R register complement outputs $\bar{R}_1$, $\bar{R}_2$ $\bar{R}_4$ $\bar{R}_8$ used as operand. |
| | No Signal | Log generator outputs $BG_1$ $BG_2$ $BG_4$ $BG_8$ used as operand. If log generator not enabled ($\overline{SB}_{LC}$; see Fig. 9 reference 910) then operand=0. |
| C Switch (Address) | $SC_0$ | R digit address (right to left R scan) |
| | $SC_1$ | R digit address (left to right R scan) |
| | $SC_2$ | T address (right to left T scan) |
| | No signal | 0 digit address (decimal point position). |
| D Switch (Data) | $SD_0$ | Arithmetic Unit Outputs $AD_1$ $AD_2$ $AD_4$ $AD_8$ written into addressed digit. |
| | $SD_1$ | E register $E_1$ $E_2$ $E_4$ $E_8$. |
| | $SD_3$ | Code 15 (1-1-1-1). |
| | $SD_6$ | K register $K_1$ $K_2$ $K_4$ $K_8$. |
| | $SD_7$ | G register $G_1$ $G_2$ $G_4$ $G_8$. |
| | No signal | Code 0 (0-0-0-0). |
| R counter | $P_0 \wedge \overline{Rg}$ | R←+1. |
| T Counter | $P_0 \wedge TG$ | T←+1. |
| | $r_0 \wedge T_{4S}$ | T←+4. |
| B Counter | $r_0 \wedge BS$ | B←+1. |
| | $r_0 \wedge B_{4S}$ | B←+4. |

Figure 24:
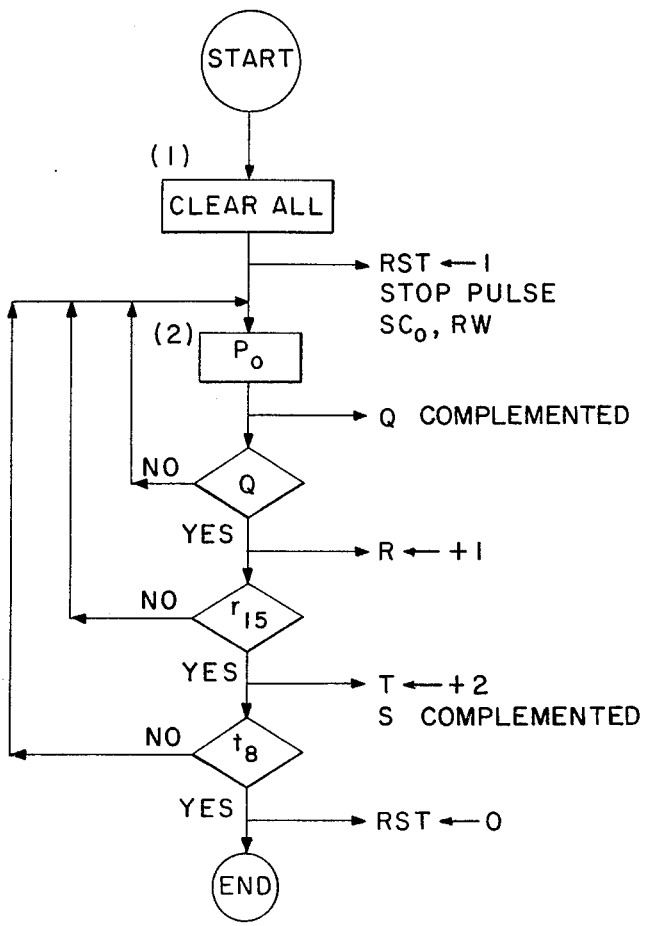

FIGURE 24 is a flow chart of the clear all operation which clears all 64 digits of the Memory Unit core registers. The clear all operation is initiated by the operation of the CLEAR ALL key 22 at the Keyboard Console. This results in the assertion of the clear all signal on line 1571. The clear all signal sets the RST flip-flop to the 1 state and generates a stop pulse on line 1574. The RST signal in turn produces (at 2284) the $SC_0$ and RW signals.

The $SC_0$ signal causes the calculator to use the R digit address (i.e. to scan from right to left as the R counter is incremented). The absence of any SD signal causes 0's to be written in each addressed digit. Because QH is not asserted, the Q flip-flop is complemented at each $P_0$ clock. This is shown at operation box 2. The state of Q determines the state of the $XG_1$ register address signal (at 1810). The state of S determines the state of the $XG_2$ register address signal (at 1812). The R counter is incremented only at those $P_0$ clocks during which Q contains 1. When the R counter reaches the count of fifteen, the TG signal is asserted (1808) and the T counter is incremented twice, once at each of the two $P_0$ clocks which occur while the R counter is in the fifteen state. The same $P_0$ clock that advances the R counter from the fifteen state back to the zero state also complements the S flip-flop. When the T counter finally reaches the count of eight, the RST flip-flop is reset to 0 and the clear all operation terminates returning the calculator to display mode. (Both $SC_0$ and RW cease when RST is reset.)

In the course of the clear all operation the R counter is counted up to fifteen, four times. Two of the four core registers are completely cleared during each cycle of the R counter (the two core registers addressed by the current state of S in conjunction with the two possible states of Q). Thus the complete clear all operation clears all four core registers twice by the time the T counter reaches eight.

Figure 25:
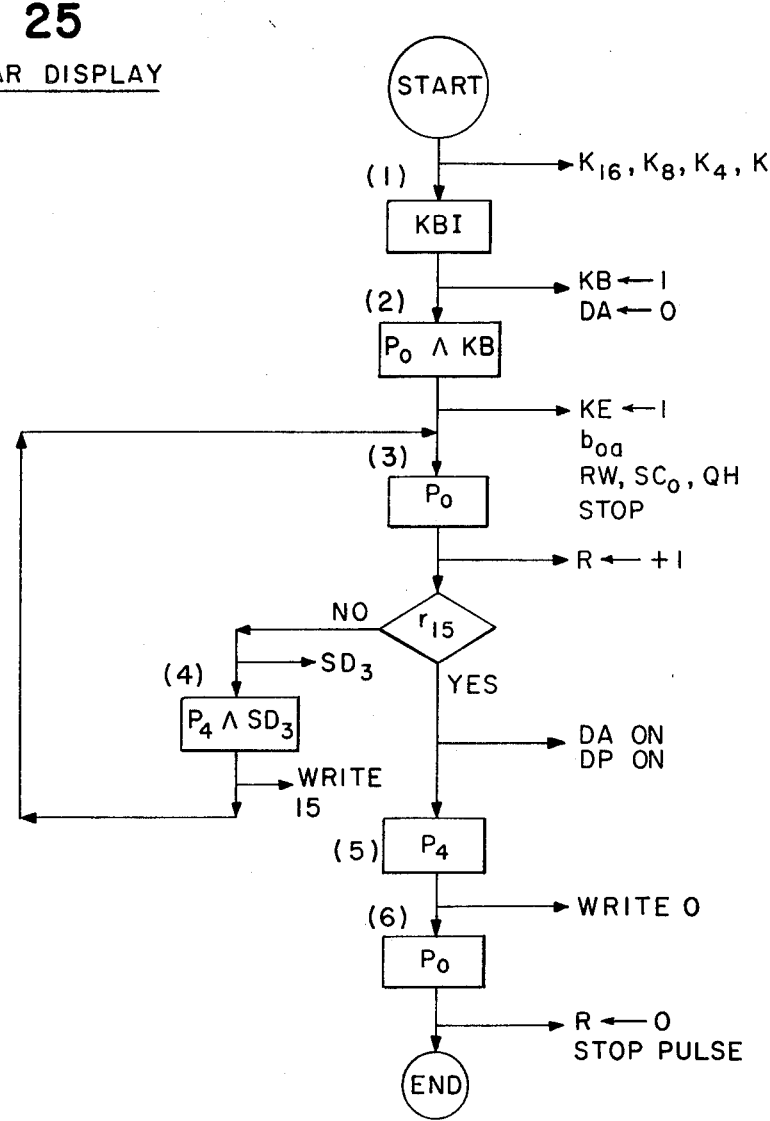

FIGURE 25 is a flow chart of the clear display operation which clears the W register (to code-15 digits with a + sign bit). The operation is initiated by operation of the CLEAR DISPLAY key 30. The resulting state of the K register is shown immediately below the "START." The KBI signal causes the KB flip-flop 1524 to be set and the DA flip-flop to be reset (operation box 1). At the first $P_0$ clock following the set of KB, the KE flip-flop 1526 is set (operation box 2) thus stepping the calculator into $b_{0a}$ mode of operation (1321). The $b_{0a}$ signal in turn produces RW, $SC_0$, QH (2168) and STOP (1836). Because of QH, the R counter is incremented at each $P_0$ pulse (operation box 3). If the R counter does not yet contain fifteen ($r_{15}$ decision box "no"), the $SD_3$ signal is asserted (1834) causing code 15 to be written into the addressed digit position (signifying no data present). When the R counter finally reaches the count of fifteen (at the sign bit) $SD_3$ is no longer asserted but the DA ON and DP ON signals are asserted (1830 and 1832 respectively) permitting the DA and DP flip-flops (1704 and 1702 respectively) to be set at $P_0$. The next $P_4$ pulse (operation box 5) causes a 0 to be written into the sign bit (resulting in the display of a + sign). The final $P_0$ pulse resets the R counter to 0, resulting in the generation of a stop pulse on line 1574.

Figure 26:
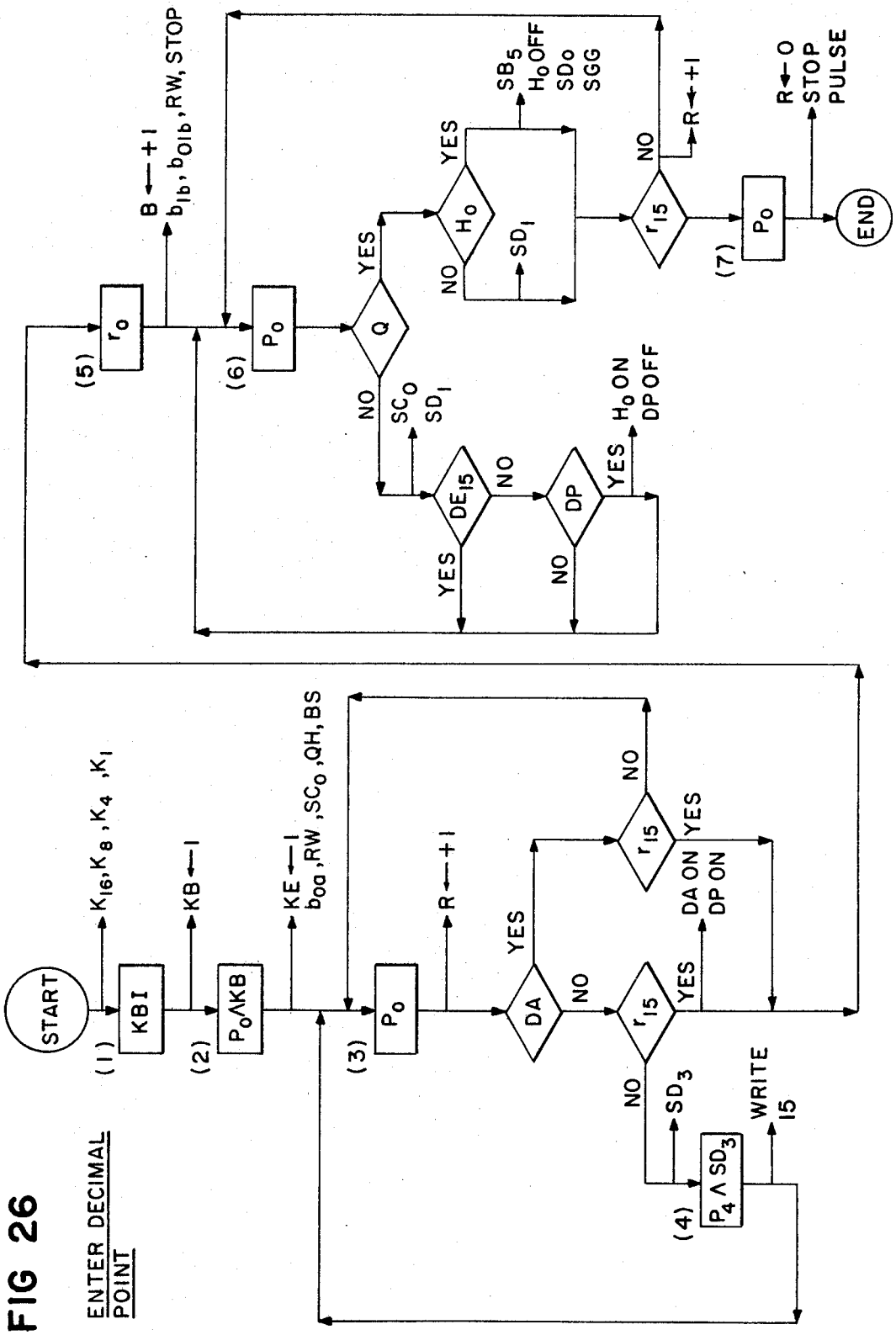

FIGURE 26 is a flow chart of the enter decimal point operation which enters a decimal point after the last (least significant) digit that has been entered in the W register. This operation is initiated by operation of the decimal point key 26. The resulting state of the K register is shown immediately below "START." This operation requires two cycles of the R counter. During the first count-up of R the W register is cleared if there has been no previous clear ($DA=0$). During the second count-up of R the calculator searches for the first non-blank position (not code 15), and there enters the decimal point if no decimal point has previously been entered.

The set of the KE flip-flop 1526 steps the calculator into $b_{0a}$ mode of operation. The $b_{0a}$ signal in turn produces RW, $SC_0$, and QH (2168) and also produces the BS signal (1828). (The BS signal permits the calculator to advance to the next b mode at the first subsequent $r_0$ signal.)

The first test made is at the DA decision box below operation box 3. If DA is set, this indicates that a prior clear has occurred and that there is no need to clear during the first count-up of the R counter. If DA contains 0, the calculator follows the DA "no" path. The $SD_3$ signal (1834) causes code 15 to be written into each digit address. When $r_{15}$ is finally reached, the DA ON and DP ON are asserted (1830 and 1832 respectively), permitting the DA and DP flip-flops to be set at $P_0$.

When the R counter is advanced from state fifteen to state zero, the $r_0$ signal is asserted and the B counter is incremented to the one state (operation box 5). This advances the calculator into $b_{1b}$, $b_{01b}$ mode. The RW signal (1862) and the STOP signal (1874) are then asserted. The RW signal permits reading and writing, the STOP signal permits the generation of a stop pulse and exit to display mode at the conclusion of the enter decimal point operation (i.e. at the next $r_0$ signal).

Q is initially in the zero state, because QH was asserted during the previous $b_{0a}$ mode. Since QH is no longer asserted, the Q flip-flop changes state at each $P_0$ clock. On those $P_0$ clocks when Q contains 0 ("no"), the operation follows the left branch of the sequence beneath the Q decision box; on those $P_0$ clocks when Q contains 1 ("yes") the operation follows the right branch and the R counter is incremented. So long as the $H_0$ flip-flop 1708 is in the zero state $SD_1$ is asserted (1862), and the calculator rewrites the same data that was read out of the addressed digit of the W register.

During the left branch of the operation sequence (on alternate $P_0$ clocks) the calculator first tests $DE_{15}$ until it is "no" (indicating that some data has been reached, i.e. that some digit that is not code 15 has been read out of the addressed digit of W). At that point the calculator tests the state of the DP flip-flop 1702. If no decimal point has yet been written DP is in the one state ("yes"). The HO ON signal and the DP OFF signal are then asserted (1866), and the $H_0$ and DP flip-flops (1708 and 1702 respectively) are set to 1. The next $P_0$ pulse then carries the operation through both the right branch of the Q decision box and the right branch of the $H_0$ decision box where $SB_5$, $H_0$ OFF, $SD_0$, and SGG are all asserted (1868).

The $SB_5$ signal causes the 0-side outputs ($\overline{R}$) of the R counter to be applied to the Arithmetic Unit inputs as an operand. This operand represents the proper code for the decimal point position corresponding to the present contents of the R counter (decimal point positions are counted from left to right, rather than from right to left). The SGG signal prevents the current memory cycle from reading out any data into the E register (because the contents of E are automatically summed with the $\overline{R}$ operand, it is necessary to ensure that E remain cleared to avoid altering the $\overline{R}$ decimal point position digit). The $SD_0$ signal causes the Arithmetic Unit AD output signals to be used as the source of input data to be written into the addressed digit of W.

Because no SC signal is asserted, the digit address chosen for writing in the decimal point code is the correct 0 position (the decimal point position). The $H_0$ OFF signal causes the $H_0$ flip-flop to be reset to zero at the next $P_0$ clock. During any remaining counts of the R register, the $H_0$ "no" path is followed, and the $SD_1$ signal is asserted, causing the existing data to be rewritten in the W digits addressed by the contents of R. When the R counter reaches the fifteen state the next $P_0$ pulse (operation box 7) advances R to the zero state, thus causing the $r_0$ signal to be asserted and thereby producing the stop pulse that returns the calculator to display mode.

Figure 27:
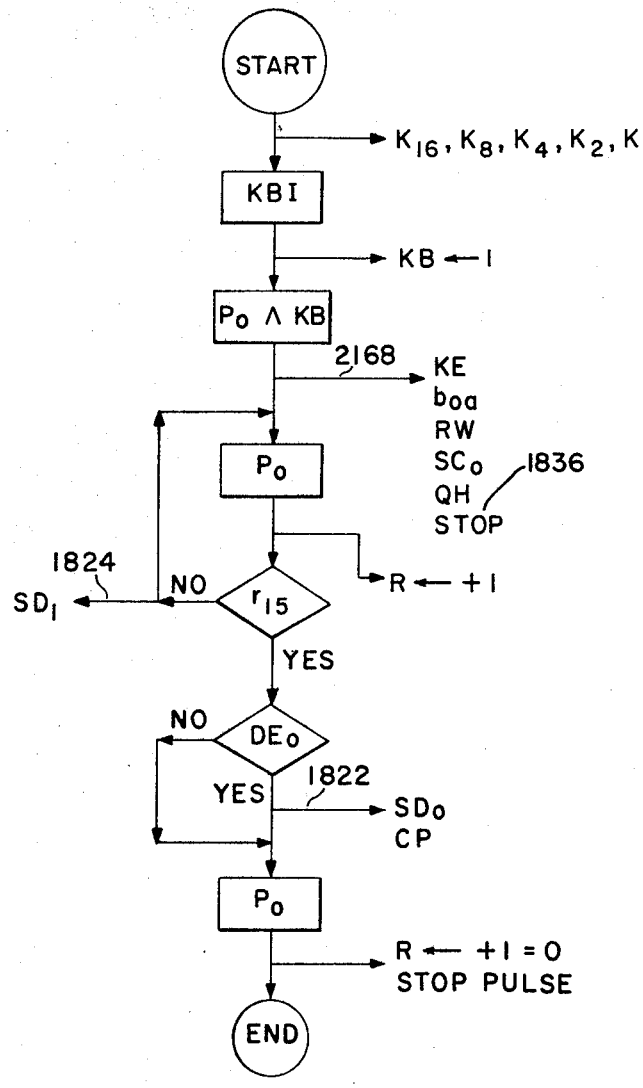

FIGURE 27 is a flow chart of the change sign operation which changes the sign of the number in the W register. This operation is initiated by the operation of the change sign key 28. The circuits generating the more important control conditions are cross-referenced by reference numerals at appropriate points of this flow chart and the following flow charts of the application.

Because $SC_0$ is asserted, this operation uses an R address. The assertion of QH implies that R is incremented at each $P_0$ clock. The operation commences with an initial loop that searches for the sign position ($r_{15}$). When the sign is located $DE_0$ is tested. If $DE_0$ is not asserted "no" the present sign is minus. Because no SD signal is asserted, a 0 is written into the sign position, thus changing the sign to plus. If $DE_0$ is asserted, the present sign is plus. The assertion of $SD_0$ then causes the output of the Arithmetic Unit to be written into the sign bit. Because CP is also asserted and because the input operand to the Arithmetic Unit is zero (no $SB_{LC}$ signal and log generator not turned on), the output of the Arithmetic Unit is nine and a minus is written into the sign digit.

Figure 28:
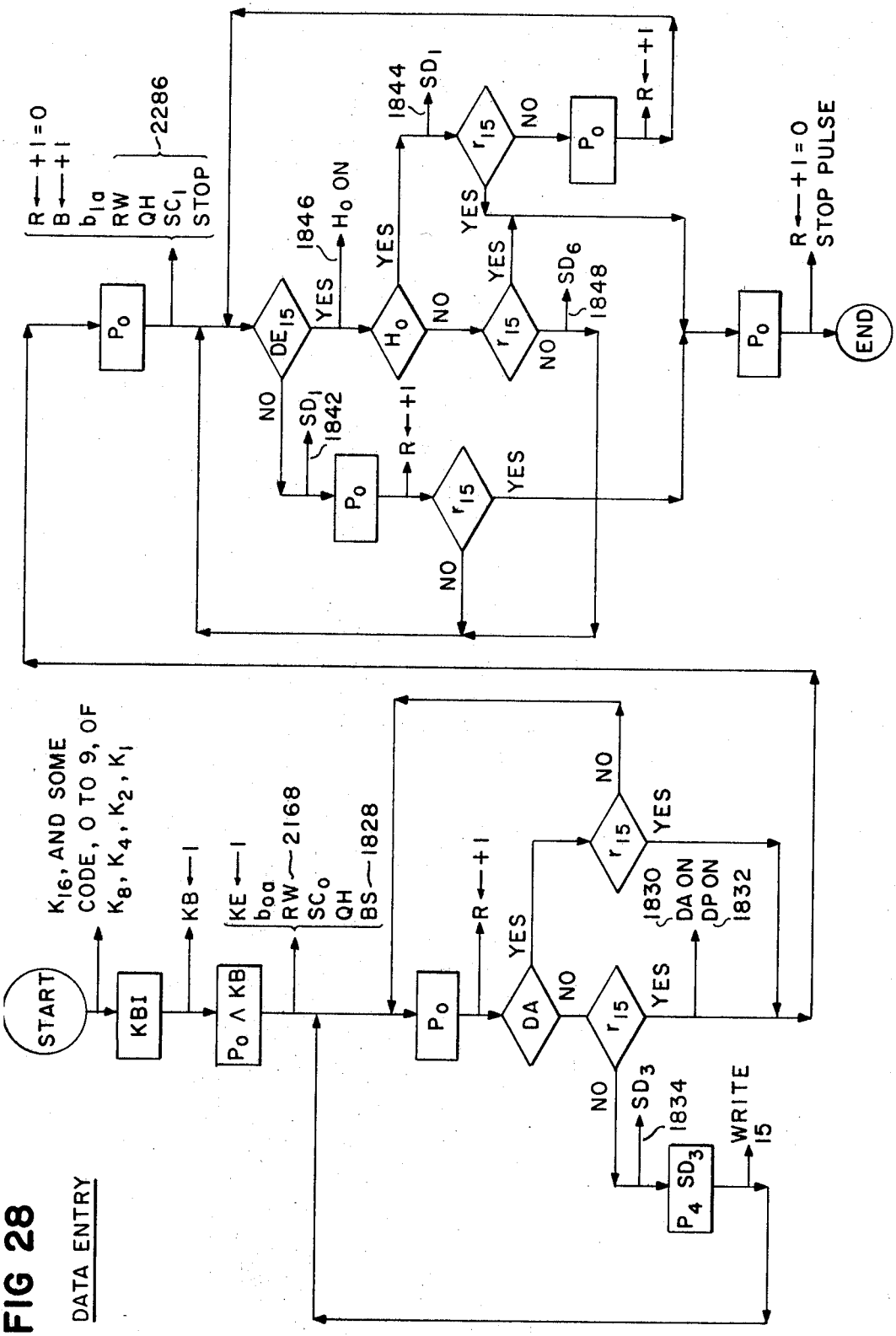

FIGURE 28 is a block diagram of the data entry operation which enters a numerical digit into the W register. The initial $b_{0a}$ portion of the operation is identical to the decimal point operation previously described. The second portion of the operation utilizes the $b_{1a}$ mode of operation. Because $SC_1$ is set, the scan is from left to right ($\overline{R}$ address). The function of the $b_{1a}$ mode is to search for the first empty spot in which to write the digit indexed at the keyboard. The $DE_{15}$ test is used for this purpose. If $DE_{15}$ is not true, $SD_1$ is asserted, and the existing data is rewritten. When $DE_{15}$ is asserted, indicating a blank position in which the data may be written, the $H_0$ ON signal is asserted, but $H_0$ is not set immediately, rather it is set at the following $P_0$ clock. The next test is for $r_{15}$. If $r_{15}$ is not asserted $SD_6$ causes the input data from the keyboard to be written into the current digit address. Any subsequent digits are rewritten because of the assertion of $SD_1$. When $r_{15}$ is finally asserted, the next $P_0$ clock advances the R counter to the zero state, generating a stop pulse and returning the system to display mode.

The preceding flow charts have shown complete calculator operations in a single flow chart. The more complex operations of the calculator each use some permutation of the basic system cycles ("b modes"). FIGURES 29 through 38 show the ten basic b modes of the system. The remaining flow charts, FIGURES 39 through 47 are macro flow charts showing how these basic b modes are combined to produce the more complex operations of the calculator.

FIGURE 29 is a flow chart of the $b_{0b}$ mode. This mode uses any non-$K_{16}$ command code. The R counter is counted up only once and the scan is from right to left. A zero is entered in each blank digit position and a decimal point is entered before the first non-zero digit that is encountered by the scan. If the decimal point position is ten or over, an overflow is generated, indicating that the position that is displayed differs from the true decimal point position by some multiple of ten. The Q flip-flop is initially off, so $SC_0$ is asserted. When $DE_{15}$ tests yes, no SD signal is asserted, so a zero is written into the addressed digit. When Q is set $H_0$ is tested. If $H_0$ is not set, the operation rewrites. When first data is reached, the $SD_1$ signal is asserted, DP is tested and if DP is set, indicating that a decimal point may be entered (that none has previously been entered), then $H_0$ is set and DP is reset. The $SD_0$, SGG, and $SB_5$ signals then cause the decimal point to be written in the proper position.

At $r_{15}$ the system exits from the $b_{0b}$ mode, the particular exit chosen (to $b_1$ mode or $b_4$ mode) depending on the K code of the current operation.

FIGURE 30 is the flow chart of the $b_{1c}$ mode (decimal point alignment). The function of this b mode is to align the Work Register with one of the other three core registers. The S "no" branch of the operation transfers the decimal point of the W register into the E register, advances said decimal point into the G register, and transfers the decimal point of the register being compared with W into E. Next, the contents of G are subtracted from the contents of E. If the result is not equal to zero, then $H_0$ is set (1988). If G is less than E, $H_1$ is also set (1986) then the operation loops back through the $r_0$ no branch until reaching $r_{15}$ when the operation proceeds to the S "yes" branch and enters the decimal point alignment operation.

The critical decisions of the shifting are determined as follows: If $H_0$ is 1, some register must be shifted. If $H_0$ is not one, no shift is required. If $b_{42}$ is asserted, the register to be shifted is not the W register. Tests are then made to determine which register is to be shifted. If $b_{42}$ is not asserted, the register to be shifted is W. ($H_1$ is one of the constituent signals of the $b_{42}$ signal.) The $SD_7$ signal performs the actual shift. Data is read out into E, advanced into G, and then rewritten into memory thus producing a one-place shift. When $r_{15}$ is finally asserted, by means of $SD_0$ and CID a one is added to the decimal point position. $H_1$ and $H_0$ are then turned off in preparation for the next operation. The whole instruction is repeated until $H_0$ is "no" at which point the BS signal is generated at 1908 and the operation exits to the next major operating mode.

FIGURE 31 is a flow chart of the $b_2$ mode. The initial portion of the operation provides a register address. During the S "no" branch, the sign of W is determined. If W is negative $H_0$ is turned on. When S is set, the main portion of the operation is entered. The function of this portion of the operation is to add, subtract, clear or recall depending on the K code.

The initial decision box at $H_0$ tests whether the operation is adding or subtracting and the sign of the W register and thus determines whether or not the CP signal is to be asserted. When Q is set, the operands are stored in E and G respectively. The $SD_0$ (1964) actually causes the numbers to be summed. If there is a carry $H_0$ is turned on (1962). In the case of add and subtract operations $k_3$ is not asserted, and the exit is through D. During the clear operation when Q and S are set $SD_0$ is not generated and 0 is rewritten. During recall operations the $$K\overline{s_2 1}$$

signal is present. The critical signal during this operation is 1979. The SGG signal is then asserted, $SD_0$ gives the sum of E and G and G contains the accumulator that is being recalled. For both clear and recall operations the exit is at point D. During the $e^x$ operation in which the $b_2$ mode is used, $k_3$ is asserted, and the exit is through J.

FIGURE 32 is a flow chart of the $b_3$ mode which is used entirely for add and subtract. If $H_0$ is set, the contents of $A_0$ or $A_1$ are shifted right one place by means of $SD_7$ (2010), and at $r_{15}$ a one is added to the decimal point at 2002.

FIGURE 33 is a flow chart of the $b_4$ mode which is used during add and subtract to clear non-significant digits from the accumulators (any zero to the left of the decimal point). The initial portion of the operation determines the choice of accumulator. During the "no" branch of S, if the decimal point is non-zero a check is made for a zero to the left of the decimal point. At $r_0$, $DE_0$ is checked. If "no," indicating that there is a number to be cleared, $H_0$ ON (2042) is generated. At $r_{14}$ if $DE_0$ is yes, and if in add or subtract, then $H_1$ is set (2034). The combination of $H_1$ and $H_0$ on produce a condition that permits a non-significant digit to be shifted out. During S "yes" $H_0$ is the critical test point. If it contains a 1, a zero is removed. The zero is actually removed by shifting right to left. The actual shift occurs at $SD_7$ (2044). One is subtracted from the decimal point at 2024. This procedure is repeated until the termination of the operation; at point C for add and subtract to produce a recall. In the case of a recall or a clear, the operation terminates at END. During entry and multiplier accumulation the exit is at F.

FIGURE 34 is a flow chart of $b_5$ mode, the first step of a number to logarithm conversion process. The $b_5$ mode extracts the decimal point from the number. At S "no" branch, the decimal point is checked to determine whether it is zero, if it is not, one is subtracted from it.

On the S "yes" branch, the logarithm of ten is added to the L register. This routine is repeated until the exit at H.

Figure 35A:
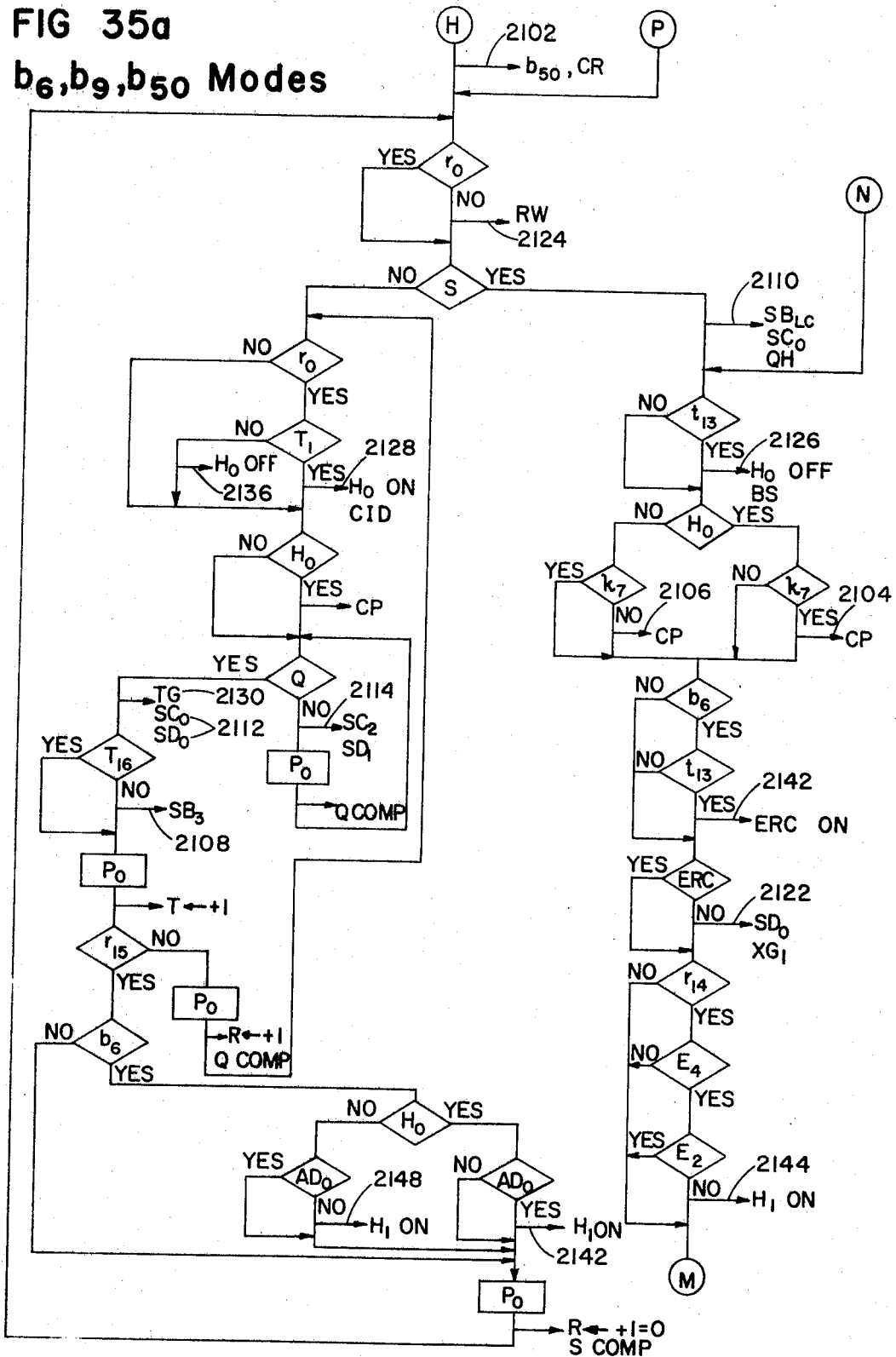
Figure 35B:
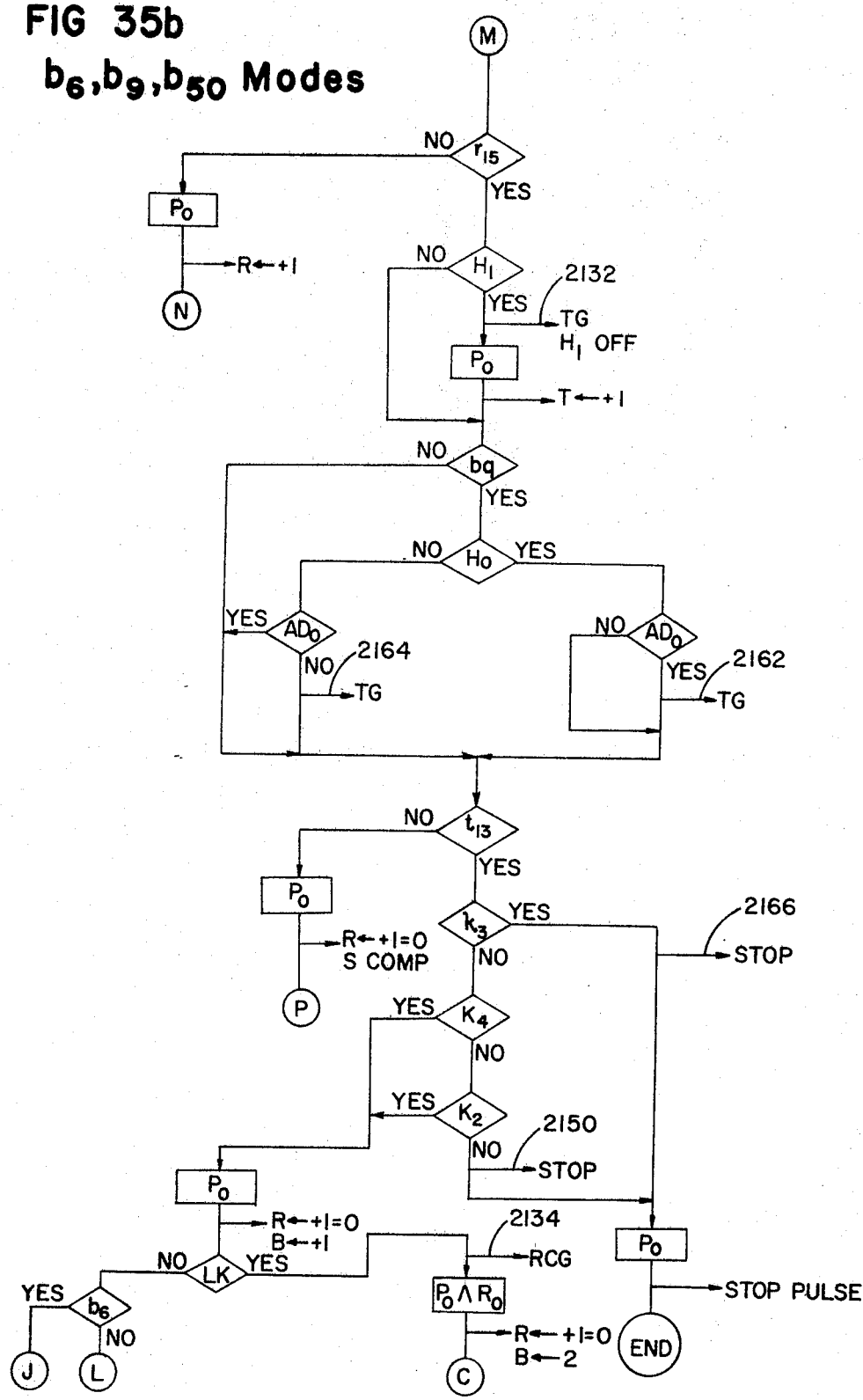
Figure 43:
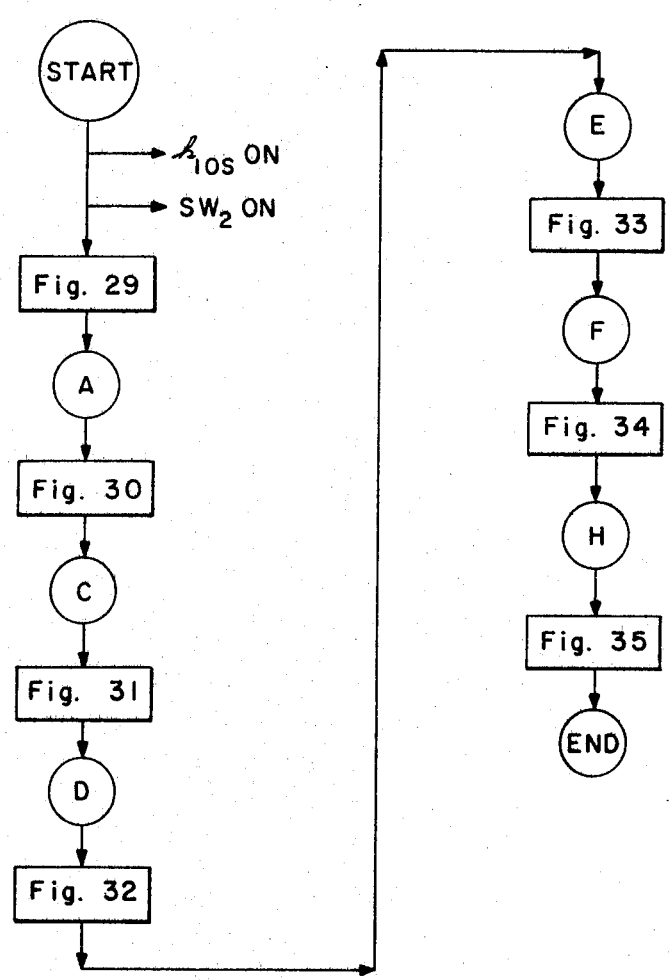
Figure 44:
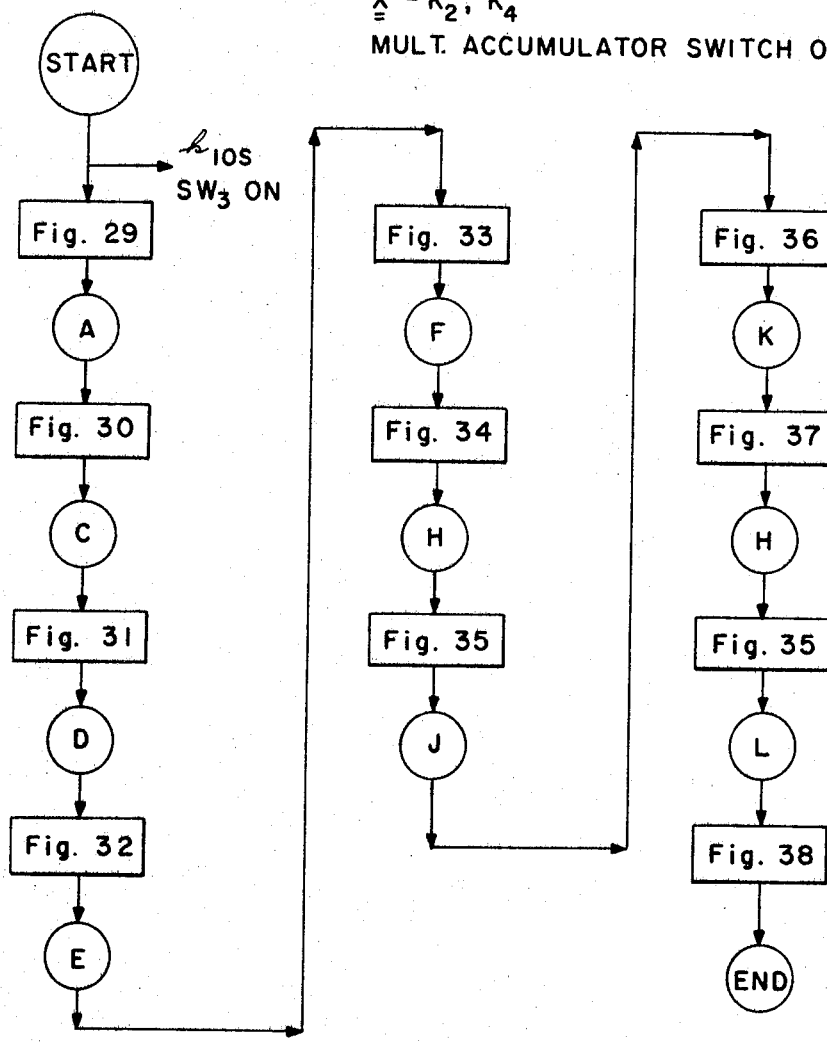
Figure 45:
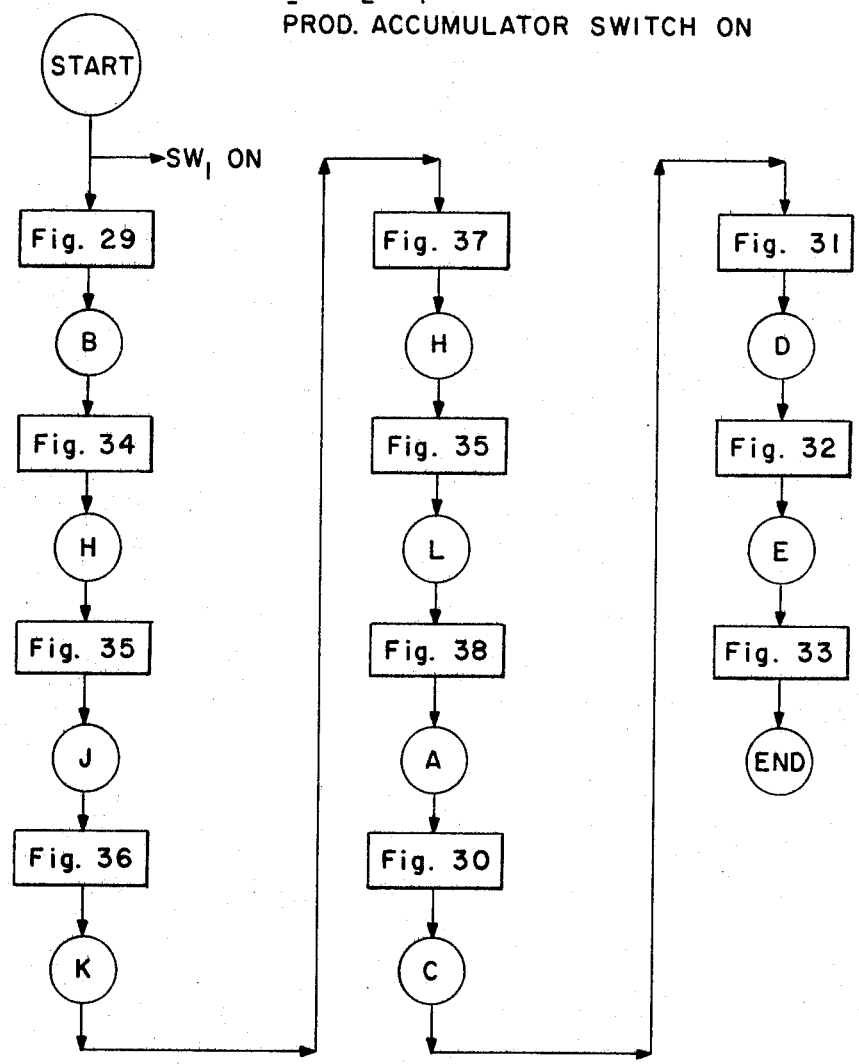
Figure 46:
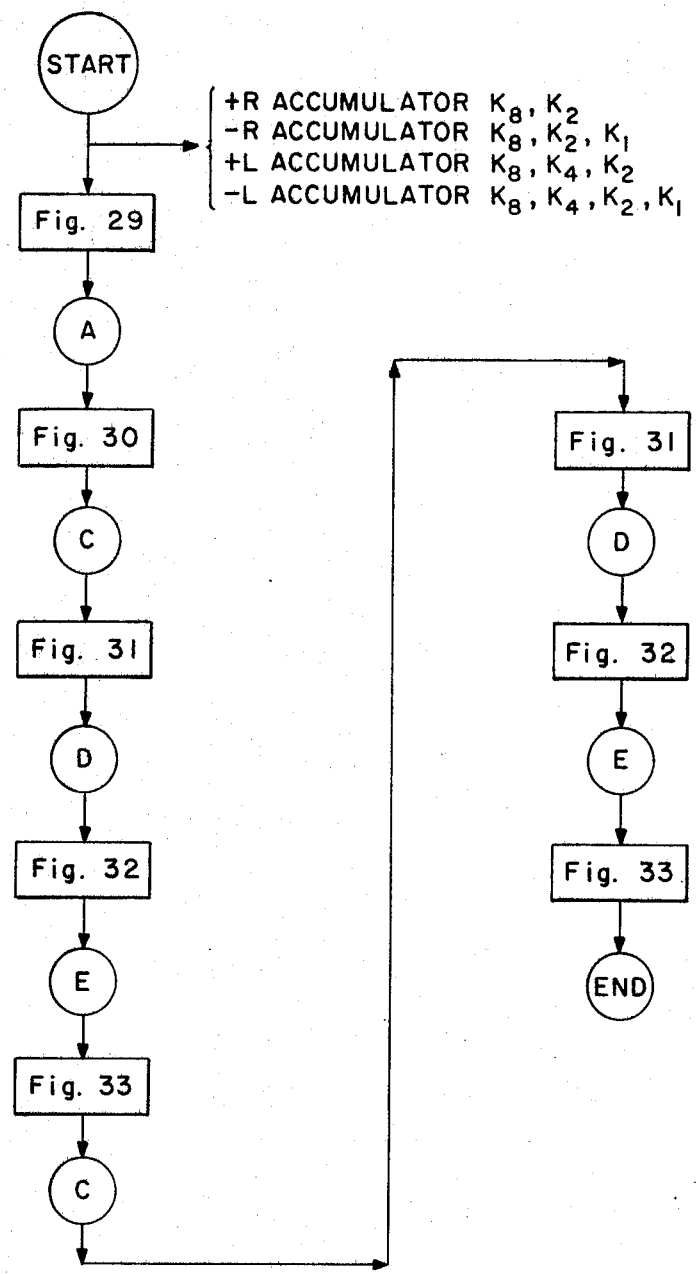
Figure 47:
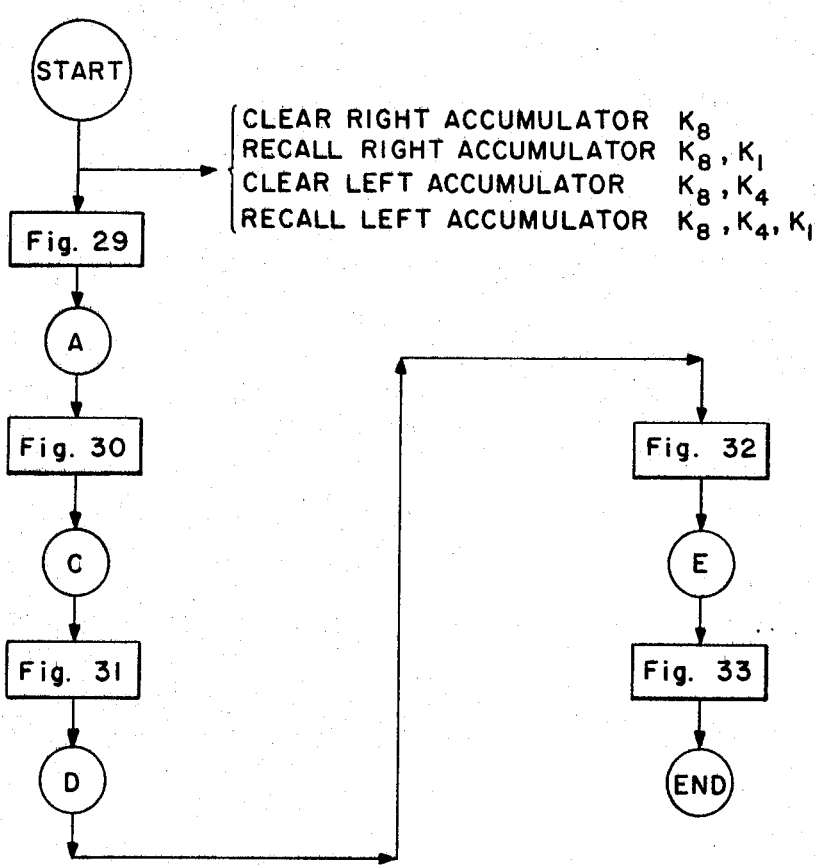

FIGURE 35 is a flow chart of the $b_6$, $b_9$, $b_{50}$ modes. On the S "no" branch, the W register is multiplied by a constant. On the S "yes" branch, the L register is correspondingly adjusted to divide by the same constant. The constants can be either greater or less than one. (The corresponding logarithms can be either greater or less than zero.)

If the function is $e^x$, $k_3$ is present and the exit is at END. If the function is $\log_e X$, the exit is at C. If the mode of operation is $b_6$, the exit is at J, if not $b_6$, the exit is L.

FIGURE 36 is a flow chart of $b_7$ mode which subtracts the logarithm of ten from the log register and adds 1 to the decimal point. This is repeated until the log becomes negative. At this time, the operation exits. This operation is the first portion of the log generation operation. The S "no" branch subtracts the log of 10 from the log register. The S "yes" branch adds 1 to the decimal point. At the time of exit, at $r_{15}$ time, a 1 is put into the sign position for use in the $b_8$ mode of operation.

FIGURE 37 is a flow chart of the $b_8$ mode which is the opposite of $b_7$. The S "no" branch shifts the contents of the W Register one place to the right, thus having the effect of dividing the contents of the W Register by ten. The S "yes" side adds the logarithm of ten to the L register. This is continued until the logarithm becomes positive.

FIGURE 38 is a flow chart of the $b_{10}$ mode. The principal purpose of this mode is round-off. The S "no" branch adds five to the $R_4$ position, thus providing a round-off function. The S "yes" branch clears positions 1, 2, 3 and 4 to zero (2264). If SW1 is not asserted, the operation ends. If SW1 is on (indicating the requirement of product accumulation) then the exit is at A. This exit leaves the K code in the "+ left accumulator" condition. This provides automatic adding of the result to the product accumulator.

The remaining FIGURES 39 through 47 are macro flow charts showing the manner in which the b modes described above are combined to produce the various operations that may be initiated from the calculator keyboard 1.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:
1. A calculator comprising:
   a keyboard unit having keys representing numerical values from 0 through 9 and additional keys representing instructions,
   logic responsive to the operation of each key to produce a numerical or instruction code unique to that key,
   a memory unit having a plurality of storage registers each having individually addressable stages for storing numerical values from 0 through 9, said plurality of storage registers including two independently controllable accumulator registers,
   a display unit arranged to visually display the contents of one of said storage registers,
   an arithmetic unit for performing addition and subtraction upon operands ranging in value from 0 through 9,
   a store of logarithmic constant values and associated means for addressing and reading out of said store selected ones of said constant values, and
   a control unit including a source of clock pulses, a cycle control, and subsidiary control elements, said control unit controlling the operation of said memory unit, said arithmetic unit, and said store of logarithmic constant values in response to said instruction codes provided by keys of said keyboard unit.

2. The calculator as claimed in claim 1 further comprising a manually operable product accumulation control and means actuated thereby for accumulating in one of said accumulator registers the sum of the products of successive multiplication operations.

3. The calculator as claimed in claim 2 further comprising a manually operable operand accumulation control and means actuated thereby for accumulating in the other of said accumulator registers the sum of a sequence of operands entered for successive multiplication operations.

4. The calculator as claimed in claim 1 wherein said display unit displays the contents of one of said storage registers by sequentially sensing successive stages thereof and producing visual indications determined by the contents of said successive stages in corresponding display positions.

5. The calculator as claimed in claim 1 wherein said storage registers comprise magnetic storage elements.

6. The calculator as claimed in claim 5 wherein a plurality of said magnetic storage registers are formed in a single plane of binary magnetic storage elements having first and second sets of address-selection windings so arranged that a read or write pulse on any given first-set winding and a similar pulse on any given second-set winding together address a stage consisting of four binary elements.

7. The calculator as claimed in claim 1 wherein said storage registers each includes a first additional addressable stage for storing a numerical value representative of decimal point position and a second additional addressable stage for storing a value representative of sign, and said display unit is arranged to visually display a decimal point indication in the position represented by said numerical value and to visually display a sign indication corresponding to said value representative of sign.

8. The calculator as claimed in claim 1 wherein said storage registers each include more than two low-order addressable stages not displayed by said display unit, and further comprising means for using the contents of said low-order stages in computation to obtain added accuracy.

9. The calculator as claimed in claim 1 wherein said memory unit includes a first output buffer register connected to receive the readout from the addressed storage register stage, a second output buffer connected to receive the contents of said first output buffer, and an input selector to select the source of input data written into said addressed stage from a group of alternative sources including: numerical codes from the keyboard logic, the contents of said first buffer register, the contents of said second buffer register, the output of said arithmetic unit.

10. The calculator of claim 9 wherein said group of alternative sources further includes a fixed code indicative of the absence of data from said addressed stage.

11. The calculator of claim 9 wherein the contents of said first buffer register determines the visual indication produced by said display unit.

12. The calculator of claim 9 wherein the contents of said first buffer register provide one input operand to said arithmetic unit.

13. The calculator of claim 1 wherein said arithmetic unit includes an input selector capable of selecting one input operand from a group of alternative sources including: an output buffer of said memory unit, said logarithmic constant store, a control unit counter.

14. The calculator of claim 1 wherein said control unit comprises a source of clock pulses, a cycle control counter, first and second sub-cycle counters, counter control logic arranged to increment and reset said counters at predetermined clock times, counter decoding logic connected to produce control signals dependent upon the states of said counters, and logic networks connected to produce additional control signals dependent upon the states of said counters and upon said instruction codes.

15. The calculator of claim 14 wherein said memory unit includes an address selector to select the source of the intra-register portion of the current memory address from a group of alternative sources including said first and second sub-cycle counters.

16. The calculator of claim 14 wherein outputs from one of said sub-cycle counters are applied to said store of logarithmic constant values to address specific constants and outputs from the other of said sub-cycle counters are applied to said store of logarithmic constant values to address specific digits of said specific constants.

17. The calculator of claim 14 wherein outputs from one of said sub-cycle counters are applied to said display unit to determine the location at which current memory unit output data is to be displayed.

18. The calculator of claim 14 and further including means for synchronizing the incrementing of said cycle control counter with a predetermined state change of one of said sub-cycle control counters.

19. The calculator of claim 1 wherein said arithmetic unit includes a binary adder-subtractor for combining two binary coded decimal operands each ranging in value from 0 through 9 by addition or subtraction and further means for converting the resulting binary result to binary coded decimal form.

20. The calculator of claim 1 wherein said store of logarithmic constant values includes stored constants representing the natural logarithms of ten and of two.

21. The calculator of claim 1 wherein said store of logarithmic constant values includes stored constants representing twice the natural logarithm of a set of predetermined numerical values and further stored constants representing half the natural logarithm of a set of predetermined numerical values.

22. A calculator comprising:
a work register,
first and second accumulator registers,
manually operable means for entering numerical values into said work register,
a display unit connected to display the contents of said work register,
a first manually operable addition control element and means actuated thereby for adding the contents of said work register to the contents of said first accumulator register and for storing the resulting sum in said work register and in said first accumulator register,
a second manually operable addition control element and means actuated thereby for adding the contents of said work register to the contents of said second accumulator register and for storing the resulting sum in said work register and in said second accumulator register,
a first manually operable subtraction control element and means actuated thereby for subtracting the contents of said work register from the contents of said first accumulator register and for storing the resulting difference in said work register and in said first accumulator register,
a second manually operable subtraction control element and means actuated thereby for subtracting the contents of said work register from the contents of said second accumulator register and for storing the resulting difference in said work register and in said second accumulator register, first and second manually operable accumulator clear control elements and means actuated thereby for clearing said first and said second accumulator registers respectively,
a manually operable clear display control element and means actuated thereby for clearing said work register.

23. The calculator of claim 22 further comprising a manually operable change sign element and means actuated thereby for changing the sign of the work register contents.

24. A calculator comprising:
a keyboard unit having keys representing numerical values from 0 through 9 and additional keys representing instructions,
two independently controllable accumulator registers,
a manually operable actuation control for causing said calculator to execute mathematical manipulations upon two operands,
a manually operable result accumulation control for causing said calculator to accumulate in one of said two accumulator registers the sum of the results of a series of said mathematical manipulations,
at least one manually operable operand accumulation control for causing said calculator to accumulate in the other of said accumulator registers the sum of a set of operands including at least one of said two operands from each of a series of said mathematical manipulations.

25. A calculator comprising:
a work register,
a store of logarithmic constant values,
manually operable means for entering numerical values in said work register,
a display unit connected to display the contents of said work register,
a manually operable logarithmic control element and means actuated thereby for accumulating on the basis of constants from said store, the logarithm of the number in said work register, and for displaying said logarithm in said work register.

26. The calculator of claim 25 further comprising:
a manually operable anti-logarithmic control element and means actuated thereby for generating, on the basis of constants from said store, the anti-logarithm of the number in said work register and for displaying said anti-logarithm in said work register.

27. A calculator comprising:
a work register,
a log register,
a store of logarithmic constant values,
manually operable means for entering numerical values in said work register,
a display unit connected to display the contents of said work register,
a manually operable entry control element and means actuated thereby for incrementing, on the basis of constants from said store, the contents of said log register by the logarithm of the number in said work register,
a manually operable multiply control element and means actuated thereby for incrementing, on the basis of constants from said store, the contents of said log register by the logarithm of the number in said work register, for generating, on the basis of constants from said store, the anti-logarithm of the resulting sum, and for displaying said anti-logarithm in said work register.

28. The calculator of claim 27 further comprising:
a manually operable divide control element and means actuated thereby for decrementing, on the basic of constants from said store, the contents of said log register by the logarithm of the number in said work register, for generating, on the basis of constants from said store, the anti-logarithm of the resulting difference, and for displaying said anti-logarithm in said work register.

29. The calculator of claim 27 further comprising:
a manually operable logarithmic control element and means actuated thereby for accumulating in said log register, on the basis of constants from said store, the logarithm of the number in said work register, and for transferring said logarithm into said work register.

30. The calculator of claim 27 further comprising:
a manually operated anti-logarithmic control element and means actuated thereby for transferring the contents of said work register into said log register, for generating, on the basis of constants from said store, the anti-logarithm thereof, for transferring said anti-logarithm into said work register.

31. The calculator of claim 27 further comprising:
a manually operable square-root control element and means actuated thereby for transferring the contents of said work register into said log register, for generating, on the basis of constants from said store, one-half the logarithm thereof, for further generating, on the basis of constants from said store, the anti-logarithm of said one half the logarithm thereof, and for displaying said anti-logarithm in said work register.

32. The calculator of claim 27 further comprising:
a manually operable square control element and means actuated thereby for transferring the contents of said work register into said log register, for generating, on the basis of constants from said store, twice the logarithm thereof, for further generating, on the basis of constants from said store, the anti-logarithm of said twice the logarithm thereof, and for displaying said anti-logarithm in said work register.

33. A calculator comprising:
a work register having a plurality of stages for storing numerical data,
a display unit connected to display the contents of said work register,
a data entry control responsive to the entry of data in the most significant stage of said work register to place a unique non-data indication in each subsequent stage of said work register and responsive to the next entered signal to sense the stages of said work register serially and enter the signal in the first sensed stage that stores said unique indication.

34. The calculator of claim 33 further comprising an additional stage of said work register for storing a numerical value representative of decimal point position, a manually operable decimal point entry control, and decimal point entry control logic including means responsive to said decimal point entry control to transfer into said additional stage the numerical value corresponding to the decimal point position preceding the first stage of said work register containing said unique non-data indication, and means responsive to the contents of said additional stage to cause the display of a decimal point indication at the display position represented by said contents.

35. A calculator comprising an arithmetic unit including a store of logarithmic constant values, a plurality of storage registers including a storage register adapted to accumulate a logarithmic value on the basis of constants from said logarithmic store, manually operable data entry means comprising a plurality of keys, each key generating a set of input signals unique to that key, a main control device having a plurality of operative states, means responsive to a first state of said main control device controlling the entry of data into said arithmetic unit in response to said input signals of the data type, means responsive to a second state of said main control device controlling the operation of said arithmetic unit to perform a data manipulation in response to said input signals of the operation type, means responsive to a third operative state of said main control device for controlling the generation of a logarithmic value in said registers, and means responsive to a fourth operative state of said main control device for controlling the generation of an anti-logarithm on the basis of the contents of said logarithmic register.

36. A calculator comprising an arithmetic unit including a work register, a log register, and first and second accumulator registers,
manually operable signal entry means including a plurality of data entry keys, a plurality of operation entry keys, and a decoder coupled to said data entry keys and said operation entry keys for generating a plurality of signals as a function of each operated key, a source of clock pulses, a cycle control counter having a plurality of operative states, a first operative state controlling the entry of data into said arithmetic unit in response to decoder signals generated by operation of a data entry key, and a second state controlling operation of said arithmetic unit to perform a data manipulation in response to decoder signals generated in response to operation of an operation entry key, a plurality of sub-cycle counters, control logic coupled between said arithmetic unit and said sub-cycle counters comprising a multiplicity of diode AND logic units responsive to signals generated by said clock, said decoder, and said counters for performing an operation specified by an operation entry key on data entered into said arithmetic unit in response to operation of a data entry key, at least one of said operation entry keys specifying a mathematical manipulation, and manually operable control for modifying a sequence of operations of said cycle control counter to cause a recycling operation of cycle control counter to accumulate in one of said accumulator registers, results of a series of operations specified by a selected one of said operation entry keys performed on data signals generated by selected ones of said data entry keys utilizing said work register and the other accumulator register.

37. The calculator as claimed in claim 36 wherein said arithmetic unit registers are composed of magnetic core elements arranged in a single core plane, and further including a common buffer register and a control responsive to said sub-cycle counters for selecting a register for transfer of data, and further including a log generator circuit for storing a multiplicity of constants as a function of a logarithmic value, a particular constant being selected in response to an output of one of sub-cycle counters, and a delay unit coupled to said common buffer register for displaying the contents of one of the registers of said arithmetic unit, and wherein said control logic includes logic operative in response to signals from said decoder, said clock, said cycle control counter, and said sub-cycle counters to modify a number stored in said work register in response to operation of said data entry keys for displaying in said display unit the reciprocal of the number stored in said work register in response to operation of a single operation entry key.

References Cited

UNITED STATES PATENTS

| | | | |
|---|---|---|---|
| 3,099,742 | 7/1963 | Byrne | 235—164 X |
| 3,129,418 | 4/1964 | De la Tour | 340—345 |
| 3,270,318 | 8/1966 | Strawbridge | 340—146.1 |
| 3,315,069 | 4/1967 | Bohm | 235—156 X |
| 3,402,285 | 9/1968 | An Wang | 235—164 X |

MALCOLM A. MORRISON, Primary Examiner

C. E. ATKINSON, Assistant Examiner

U.S. Cl. X.R.

235—158, 159, 164, 168